US008041769B2

(12) United States Patent
Shraim et al.

(10) Patent No.: US 8,041,769 B2
(45) Date of Patent: Oct. 18, 2011

(54) GENERATING PHISH MESSAGES

(75) Inventors: Ihab Shraim, Germantown, MD (US); Mark Shull, Chevy Chase, MD (US)

(73) Assignee: Markmonitor Inc., Boise, ID (US)

( * ) Notice: Subject to any disclaimer, the term of this patent is extended or adjusted under 35 U.S.C. 154(b) by 1398 days.

(21) Appl. No.: 10/996,568

(22) Filed: Nov. 23, 2004

(65) Prior Publication Data

US 2007/0294352 A1    Dec. 20, 2007

Related U.S. Application Data

(63) Continuation-in-part of application No. 10/709,398, filed on May 2, 2004.

(60) Provisional application No. 60/615,973, filed on Oct. 4, 2004, provisional application No. 60/610,716, filed on Sep. 17, 2004, provisional application No. 60/610,715, filed on Sep. 17, 2004.

(51) Int. Cl.
*G06F 15/16* (2006.01)

(52) U.S. Cl. ........................................................ 709/206

(58) Field of Classification Search .................... 709/206
See application file for complete search history.

(56) References Cited

U.S. PATENT DOCUMENTS

| | | | |
|---|---|---|---|
| 5,892,903 A | | 4/1999 | Klaus |
| 5,898,836 A | | 4/1999 | Freivald et al. |
| 5,930,479 A | * | 7/1999 | Hall .............................. 709/238 |
| 5,978,842 A | | 11/1999 | Noble et al. |
| 5,999,932 A | | 12/1999 | Paul |
| 6,032,260 A | | 2/2000 | Sasmazel et al. |
| 6,052,709 A | * | 4/2000 | Paul .............................. 709/202 |
| 6,055,508 A | | 4/2000 | Naor et al. |
| 6,092,194 A | | 7/2000 | Touboul |
| 6,366,933 B1 | | 4/2002 | Ball et al. |

(Continued)

FOREIGN PATENT DOCUMENTS

WO    WO 2004/055632 A2    7/2004

(Continued)

OTHER PUBLICATIONS

ZoEmail, How ZoEmail Works, ZoEmail vs. Other Anti-Spam Options, ZoEmail Features, publicly available as of Dec. 14, 2003 as evidenced by Internet Archive WayBack Machine, retrieved from http://web.archive.org/web/*/http://www.zoemail.net, pp. 1-12.*

(Continued)

*Primary Examiner* — Kevin Bates
*Assistant Examiner* — Oleg Survillo
(74) *Attorney, Agent, or Firm* — Kilpatrick Townsend & Stockton LLP

(57) ABSTRACT

Various embodiments of the invention provide solutions (including inter alia, systems, methods and software) for dealing with online fraud. In particular, various embodiments of the invention provide ways to incite unsolicited email messages (such as spam messages, phish messages, etc.). In accordance with some embodiments, a bait email address may be planted in a particular location on the Internet. In particular embodiments, the location of the planted email address may be tracked in order to determine which locations are relatively more likely to generate unsolicited email messages. In other embodiments, domains likely to host the bait email addresses receiving unsolicited messages may be obtained. In some cases, unsolicited messages may be analyzed and/or otherwise processed to determine whether the messages are possibly associated with a fraudulent activity. Such analysis may lead to the investigation of one or more web sites and/or to the initiation of a response against a fraudulent activity.

21 Claims, 17 Drawing Sheets

U.S. PATENT DOCUMENTS

| | | |
|---|---|---|
| 6,421,768 B1 | 7/2002 | Purpura |
| 6,432,115 B1 | 8/2002 | Mollenauer et al. |
| 6,484,203 B1 | 11/2002 | Porras et al. |
| 6,516,416 B2 | 2/2003 | Gregg et al. |
| 6,606,659 B1 | 8/2003 | Hegli et al. |
| 6,650,890 B1 | 11/2003 | Irlam et al. |
| 6,654,787 B1 | 11/2003 | Aronson et al. |
| 6,658,393 B1 | 12/2003 | Basch et al. |
| 6,732,278 B2 | 5/2004 | Baird et al. |
| 6,745,248 B1 | 6/2004 | Gardos et al. |
| 6,772,334 B1 | 8/2004 | Glawitsch |
| 6,990,590 B2 | 1/2006 | Hanson et al. |
| 6,993,588 B2 | 1/2006 | Davis et al. |
| 7,028,040 B1 | 4/2006 | Butler et al. |
| 7,072,944 B2 | 7/2006 | Lalonde et al. |
| 7,076,463 B1 | 7/2006 | Boies et al. |
| 7,076,801 B2 | 7/2006 | Gong et al. |
| 7,080,041 B2 | 7/2006 | Nagel |
| 7,092,992 B1 | 8/2006 | Yu |
| 7,096,498 B2 | 8/2006 | Judge |
| 7,096,500 B2 | 8/2006 | Roberts et al. |
| 7,114,177 B2 | 9/2006 | Rosenberg et al. |
| 7,149,778 B1 * | 12/2006 | Patel et al. ............ 709/206 |
| 7,155,608 B1 * | 12/2006 | Malik et al. ............ 713/170 |
| 7,191,210 B2 | 3/2007 | Grossman |
| 7,213,260 B2 | 5/2007 | Judge |
| 7,225,466 B2 | 5/2007 | Judge |
| 7,231,659 B2 | 6/2007 | Trilli et al. |
| 7,233,942 B2 | 6/2007 | Nye |
| 7,249,175 B1 | 7/2007 | Donaldson |
| 7,272,853 B2 | 9/2007 | Goodman et al. |
| 7,310,660 B1 | 12/2007 | White |
| 7,333,956 B2 | 2/2008 | Malcolm |
| 7,334,254 B1 | 2/2008 | Boydstun et al. |
| 7,343,626 B1 | 3/2008 | Gallagher |
| 7,359,948 B2 * | 4/2008 | Ralston et al. ............ 709/206 |
| 7,360,025 B1 | 4/2008 | O'Connell et al. |
| 7,373,429 B2 | 5/2008 | Furukawa et al. |
| 7,457,823 B2 | 11/2008 | Shraim et al. |
| 7,461,257 B2 | 12/2008 | Olkin et al. |
| 7,526,730 B1 | 4/2009 | Cahill |
| 7,552,466 B2 | 6/2009 | Rosenberg et al. |
| 7,620,690 B1 * | 11/2009 | Castelli ............ 709/206 |
| 7,870,608 B2 | 1/2011 | Shraim et al. |
| 2001/0044820 A1 | 11/2001 | Scott |
| 2002/0026478 A1 | 2/2002 | Rodgers et al. |
| 2002/0087885 A1 | 7/2002 | Peled et al. |
| 2002/0099649 A1 | 7/2002 | Lee et al. |
| 2002/0124172 A1 | 9/2002 | Manahan |
| 2002/0129013 A1 | 9/2002 | Thomas |
| 2002/0133721 A1 | 9/2002 | Adjaoute |
| 2002/0169971 A1 | 11/2002 | Asano et al. |
| 2003/0023878 A1 | 1/2003 | Rosenberg et al. |
| 2003/0050964 A1 | 3/2003 | Debaty et al. |
| 2003/0056116 A1 | 3/2003 | Bunker et al. |
| 2003/0097409 A1 | 5/2003 | Tsai |
| 2003/0101357 A1 | 5/2003 | Ronen et al. |
| 2003/0105973 A1 | 6/2003 | Liang et al. |
| 2003/0110293 A1 | 6/2003 | Friedman et al. |
| 2003/0126119 A1 | 7/2003 | Lin |
| 2003/0131260 A1 | 7/2003 | Hanson et al. |
| 2003/0133450 A1 | 7/2003 | Baum |
| 2003/0172167 A1 | 9/2003 | Judge |
| 2003/0172291 A1 | 9/2003 | Judge et al. |
| 2003/0172292 A1 | 9/2003 | Judge |
| 2003/0172294 A1 | 9/2003 | Judge |
| 2003/0208624 A1 | 11/2003 | Grossman |
| 2003/0225841 A1 | 12/2003 | Song et al. |
| 2003/0225850 A1 * | 12/2003 | Teague ............ 709/207 |
| 2004/0003248 A1 | 1/2004 | Arkhipov |
| 2004/0034695 A1 | 2/2004 | Touch et al. |
| 2004/0044912 A1 | 3/2004 | Connary et al. |
| 2004/0054917 A1 | 3/2004 | Obrecht et al. |
| 2004/0064335 A1 | 4/2004 | Yang |
| 2004/0064736 A1 | 4/2004 | Obrecht et al. |
| 2004/0068542 A1 | 4/2004 | Lalonde et al. |
| 2004/0078422 A1 | 4/2004 | Toomey |
| 2004/0078564 A1 | 4/2004 | Abdulhayoglu |
| 2004/0098607 A1 | 5/2004 | Alagna et al. |
| 2004/0117377 A1 | 6/2004 | Moser et al. |
| 2004/0122939 A1 | 6/2004 | Perkins |
| 2004/0123157 A1 | 6/2004 | Alagna et al. |
| 2004/0143670 A1 | 7/2004 | Roychowdhury et al. |
| 2004/0148506 A1 | 7/2004 | Prince |
| 2004/0187023 A1 | 9/2004 | Alagna et al. |
| 2004/0254848 A1 | 12/2004 | Golan et al. |
| 2005/0015447 A1 * | 1/2005 | Kocheisen et al. ............ 709/206 |
| 2005/0015626 A1 * | 1/2005 | Chasin ............ 713/201 |
| 2005/0021853 A1 | 1/2005 | Parekh et al. |
| 2005/0027879 A1 * | 2/2005 | Karp ............ 709/238 |
| 2005/0027983 A1 | 2/2005 | Klawon |
| 2005/0038756 A1 | 2/2005 | Nagel |
| 2005/0055569 A1 | 3/2005 | Shipp |
| 2005/0060263 A1 | 3/2005 | Golan et al. |
| 2005/0060643 A1 | 3/2005 | Glass et al. |
| 2005/0071748 A1 | 3/2005 | Shipp |
| 2005/0071766 A1 | 3/2005 | Brill et al. |
| 2005/0076222 A1 | 4/2005 | Olkin et al. |
| 2005/0091227 A1 | 4/2005 | McCollum |
| 2005/0097320 A1 | 5/2005 | Golan et al. |
| 2005/0108569 A1 | 5/2005 | Bantz et al. |
| 2005/0114453 A1 * | 5/2005 | Hardt ............ 709/206 |
| 2005/0149507 A1 | 7/2005 | Nye |
| 2005/0154601 A1 | 7/2005 | Halpern et al. |
| 2005/0188079 A1 | 8/2005 | Motsinger et al. |
| 2005/0188080 A1 | 8/2005 | Motsinger et al. |
| 2005/0188221 A1 | 8/2005 | Motsinger et al. |
| 2005/0188222 A1 | 8/2005 | Motsinger et al. |
| 2005/0198099 A1 | 9/2005 | Motsinger et al. |
| 2005/0198160 A1 | 9/2005 | Shannon et al. |
| 2005/0210107 A1 * | 9/2005 | Mora ............ 709/206 |
| 2005/0222900 A1 | 10/2005 | Fuloria et al. |
| 2005/0234922 A1 | 10/2005 | Parekh et al. |
| 2005/0251539 A1 | 11/2005 | Parekh et al. |
| 2005/0257261 A1 | 11/2005 | Shraim et al. |
| 2005/0262209 A1 | 11/2005 | Yu |
| 2005/0289148 A1 | 12/2005 | Dorner et al. |
| 2006/0020812 A1 | 1/2006 | Steinberg et al. |
| 2006/0021031 A1 | 1/2006 | Leahy et al. |
| 2006/0031315 A1 | 2/2006 | Fenton et al. |
| 2006/0041508 A1 | 2/2006 | Pham et al. |
| 2006/0041621 A1 * | 2/2006 | Libbey ............ 709/206 |
| 2006/0047766 A1 | 3/2006 | Spadea |
| 2006/0064374 A1 | 3/2006 | Helsper et al. |
| 2006/0068755 A1 | 3/2006 | Shraim et al. |
| 2006/0070126 A1 | 3/2006 | Grynberg |
| 2006/0075030 A1 | 4/2006 | van Riel |
| 2006/0080735 A1 | 4/2006 | Brinson et al. |
| 2006/0101120 A1 | 5/2006 | Helsper et al. |
| 2006/0101334 A1 | 5/2006 | Liao et al. |
| 2006/0123105 A1 | 6/2006 | Parekh et al. |
| 2006/0123464 A1 | 6/2006 | Goodman et al. |
| 2006/0123478 A1 | 6/2006 | Rehfuss et al. |
| 2006/0129644 A1 | 6/2006 | Owen et al. |
| 2006/0136294 A1 | 6/2006 | Linden et al. |
| 2006/0149580 A1 | 7/2006 | Helsper et al. |
| 2006/0168006 A1 | 7/2006 | Shannon et al. |
| 2006/0168041 A1 | 7/2006 | Mishra et al. |
| 2006/0168066 A1 | 7/2006 | Helsper et al. |
| 2006/0174341 A1 | 8/2006 | Judge |
| 2006/0190718 A1 | 8/2006 | Singh et al. |
| 2006/0206572 A1 | 9/2006 | Lalonde et al. |
| 2006/0224752 A1 | 10/2006 | Parekh et al. |
| 2006/0230272 A1 | 10/2006 | Lawrence et al. |
| 2006/0230279 A1 | 10/2006 | Morris |
| 2006/0251068 A1 | 11/2006 | Judge et al. |
| 2006/0253447 A1 | 11/2006 | Judge |
| 2006/0253584 A1 | 11/2006 | Dixon et al. |
| 2006/0265747 A1 | 11/2006 | Judge |
| 2007/0005967 A1 | 1/2007 | Mister et al. |
| 2007/0028301 A1 | 2/2007 | Shull et al. |
| 2007/0073630 A1 | 3/2007 | Greene et al. |
| 2007/0083670 A1 | 4/2007 | Kelley et al. |
| 2007/0101423 A1 * | 5/2007 | Oliver et al. ............ 726/22 |
| 2007/0107053 A1 | 5/2007 | Shraim et al. |
| 2007/0124270 A1 | 5/2007 | Page |
| 2007/0128899 A1 | 6/2007 | Mayer |

| | | | |
|---|---|---|---|
| 2007/0150374 A1 | 6/2007 | Grossman | |
| 2007/0208856 A1* | 9/2007 | Rounthwaite et al. | 709/225 |
| 2007/0255821 A1 | 11/2007 | Ge et al. | |
| 2007/0294762 A1 | 12/2007 | Shraim et al. | |
| 2007/0300286 A1 | 12/2007 | Judge | |
| 2008/0005342 A1* | 1/2008 | Schneider | 709/230 |
| 2008/0052359 A1 | 2/2008 | Golan et al. | |
| 2008/0091946 A1* | 4/2008 | Paulsen et al. | 713/170 |
| 2008/0141342 A1 | 6/2008 | Curnyn | |
| 2008/0199006 A1 | 8/2008 | Gandolph et al. | |
| 2008/0288790 A1 | 11/2008 | Wilson | |
| 2008/0306835 A1* | 12/2008 | Agura et al. | 705/26 |
| 2009/0100185 A1 | 4/2009 | Sheha et al. | |
| 2010/0228759 A1 | 9/2010 | Thomas | |

FOREIGN PATENT DOCUMENTS

| | | |
|---|---|---|
| WO | WO 2005/048522 A1 | 5/2005 |
| WO | WO 2005/098630 A1 | 10/2005 |

OTHER PUBLICATIONS

ZoEmail, Lightning QuickStart Guide, ZoEmail User Guide, publicly available as of Jan. 25, 2004 as evidenced by Internet Archive WayBack Machine, retrieved from http://web.archive.org/web/*/http://www.zoemail.com/help.htm, pp. 1-37.*

ZoEmail, Flash Demo, publicly available as of Feb. 27, 2004 as evidenced by Internet Archive WayBack Machine, retrieved from http://web.archive.org/web/*/http://www.zoemail.com/demo.htm, pp. 1-3.*

Project Honey Pot, Frequently Asked Questions (FAQ), publicly available as of Aug. 4, 2004 as evidenced by Internet Archive WayBack Machine, retrieved from http://web.archive.org/web/*/http://www.projecthoneypot.org/faq.php.*

Prince, et al., Understanding How Spammers Steal Your E-mail Address: An Analysis of the First Six Months of Data from Project Honey Pot, 2005, retrieved from http://www.ceas.cc/papers-2005/163.pdf on Jan. 25, 2009, 7 pages total.*

Seigneur, et al., PR3 Email Honeypot, Sep. 12, 2003, retrieved from https://www.cs.tcd.ie/publications/tech-reports/reports.03/TCD-CS-2003-39.pdf on Jan. 25, 2009, 12 pages total.*

U.S. Appl. No. 60/273,826, filed Mar. 8, 2001, File History, 41 pages.
U.S. Appl. No. 60/273,835, filed Mar. 8, 2001, File History, 21 pages.
U.S. Appl. No. 60/273,836, filed Mar. 8, 2001, File History, 70 pages.
U.S. Appl. No. 60/282,142, filed Apr. 9, 2001, File History, 74 pages.
U.S. Appl. No. 60/433,345, filed Dec. 13, 2002, File History, 15 pages.
U.S. Appl. No. 60/502,296, filed Sep. 12, 2003, File History, 16 pages.
U.S. Appl. No. 60/502,297, filed Sep. 12, 2003, File History, 9 pages.

Microsoft Phishing Filter, "Phising Filter Frequently Asked Questions" https://phishingfilter.microsoft.com/faq.aspx, 2007, 7 pages.

419Eater (Retrieved from http://web.archive.org/web/20031206063258/419eater.com/html/baiting.htm, publication date: Dec 6, 2003.

Androutsopoulos et al., "Learning to Filter Spam E-Mail: A Comparison of a Naïve Bayesian and a Memory-Based Approach", Proceedings of the 4th European Conference on Principles and Practice of Knowledge Discovery in Databases (PKDD 2000), Workshop on Machine Learning and Textual Information Access, 2000, pp. 1-13.

Anonymous, "Lessons Learned by Consumers, Financial Sector Firms, and Government Agencies During the Recent Rise of Phishing Attacks", Financial and Banking Information Infrastructure Committee and the Financial Services Sector Coordinating Council, May 2004.

Chou, N., R. Ledesma, Y. Teraguchi and J.C. Mitchell "Client-Side Defense Against Web-Based Identity Theft", Proceedings of the 11th Annual Network and Distributed System Security Symposium (NDSS 04), Feb. 2004.

Dhamija, R. and J.D. Tygar "Phish and HIPs: Human Interactive Proofs to Detect Phishing Attacks", in 'Human Interactive Proofs', Baird, H.S. and D.P. Lopresti, Eds., LNCS 3517, May 3, 2005, pp. 127-141.

Emigh, A. "Online Identity Theft: Phishing Technology, Chokepoints and Countermeasures", ITTC Report on Online Theft Technology and Countermeasures, Oct. 2, 2005.

Federal Deposit Insurance Corporation "Putting an End to Account-Hijacking Identiy Theft", Division of Supervision and Consumer Protection, Technology Supervision Branch, Dec. 14, 2004.

Garfinkel, S. and L.F. Cranor "What is Phishing (Or, How to Fight Phishing at the User-Interface Level)", O'Reilly Network, downloaded from www.oreillynet.com/lpt/a/6274, Oct. 25, 2005.

Glenbrook Partners "Phishing", downloaded from www.payments.com, Feb. 23, 2004.

G-Lock Software "Advanced Administrative Tools Reference Guide", 2003.

Graham, P., "Filters that fight back", Published Aug. 2003.

Graham, P. "Better Bayesian Filtering", downloaded from www.paulgraham.com/better.html, Jan. 2003.

Graham, P., "A Plan for Spam", downloaded from www.paulgraham.com/spam.htl, Aug. 2002.

Hansell "Technology; Online Swindlers, Called 'Phishers,' Lure the Unwary", New York Times, Mar. 24, 2004.

Jon Lebowsky; Shout Shamalamal; Jul. 8, 1997; the Austin Chronicle; pp. 1-5 retrieved from http://weeklywire.com/ww/07-08-97/austin_screens_feature1.html.

K. Moore; Simple Mail Transfer Protocol (SMTP) Service Extension for Delivery Status Notification (DSNs); Jan. 2003; Network Working Group; pp. 1-33.

Kirda, E. and C. Kruegel "Protecting Users Against Phishing Attacks with AntiPhish", Proceedings of the 29th Annual International Computer Science and Applications Conference (COMPSAC'05), Jul. 26-28, 2005, pp. 517-524.

Kohn, D. "How Scores are Assigned", downloaded from wiki.apache.org/spamassassin, Jul. 13, 2004.

Legon "'Phishing' Scams Reel in Your Identity", CNN.com, Jan. 26, 2004.

Levy, E. "Criminals Become Tech Savvy", IEEE Security & Privacy, vol. 2, No. 2, Mar.-Apr. 2004, pp. 65-68.

Mason, J. "Filtering Spam with SpamAssassin", downloaded from spamassassin.org, Proceedings of the HEANet Annual Conference, 2002.

Mertz, D., "Spam Filtering Techniques", downloaded from www.ibm.com/developerworks/linux/library, Sep. 1, 2002.

Ollmann, G. "The Phishing Guide: Understanding & Preventing Phishing Attacks", NGSSoftware Insight Security Research, downloaded from www.ngsconsulting.com, Sep. 2004.

Seltzer, L. "Spotting Phish and Phighting Back", eWeek Enterprise News & Reviews, downloaded from www.eweek.com, Aug. 2, 2004.

Sergeant, M. "Internet Level Spam Detection and SpamAssassin 2.50", downloaded from spoamassassin.org, Proceedings of the Spam Conference, 2003.

Spamback (Retreived from http://web.archive.org/web/20010422081736/http://cexx.org/snicker/spamback.htm, Publication date: Apr. 22, 2001.

Stern, H. "Fast SpamAssassin Score Learning Tool", downloaded from spamassassin.apache.org, Jan. 8, 2004.

Tally, G., R. Thomas and T. Van Vleck "Anti-Phishing: Best Practices for Institutions and Consumers", McAfee Research, Mar. 2004.

Tally, G., R. Thomas and T. Van Vleck "Anti-Phishing: Best Practices for Institutions and Consumers", McAfee Research, Technical Report #04-004, Sep. 2004.

Thompson, B. "How to Avoid the Phishing Bug", BBC News, Jan. 23, 2004.

US Department of Justice "Special Report on 'Phishing'", Criminal Division, Mar. 2004.

US Federal Bureau of Investigation "FBI Says Web 'Spoofing' Scams are a Growing Problem", press release, Jul. 21, 2003.

U.S. Appl. No. 10/709,398, Non-Final Office Action dated Mar. 13, 2008.

U.S. Appl. No. 10/996,566, Final Office Action dated Jun. 25, 2009, 28 pgs.

U.S. Appl. No. 10/996,566, Non-Final Office Action dated Nov. 25, 2008, 13 pgs.

U.S. Appl. No. 10/996,566, Restriction Requirement dated Jun. 18, 2008.

U.S. Appl. No. 10/996,567, Office Action dated Aug. 5, 2008.
U.S. Appl. No. 10/996,567, Office Action dated Feb. 6, 2009, 26 pgs.
U.S. Appl. No. 10/996,567, Restriction Requirement dated Mar. 7, 2008, 7 pgs.
U.S. Appl. No. 10/996,646, Non-Final Office Action dated Jun. 3, 2008, 20 pgs.
U.S. Appl. No. 10/996,646, Office Action dated Dec. 23, 2008, 22 pgs.
U.S. Appl. No. 10/996,990, Non Final Office Action dated Sep. 15, 2008, 50 pages.
U.S. Appl. No. 10/996,991; Office Action dated Jan. 7, 2009, 24 pgs.
U.S. Appl. No. 10/996,993, Restriction Requirement dated Apr. 27, 2009, 6 pgs.
U.S. Appl. No. 10/996,993, filed Nov. 23, 2004, Non-Final Office Action dated Jun. 19, 2008.
U.S. Appl. No. 10/997,626, filed Nov. 23, 2004, Final Office Action dated Jan. 31, 2008.
U.S. Appl. No. 10/997,626, Notice of Allowance dated Aug. 22, 2008.
U.S. Appl. No. 10/997,626, Non-Final Office Action dated Jun. 20, 2007, 102 pgs.
U.S. Appl. No. 11/237,642, Office Action dated Aug. 1, 2008, 40 pgs.
U.S. Appl. No. 11/428,072, Advisory Action dated Feb. 9, 2009, 3 pgs.
U.S. Appl. No. 11/428,072, Final Office Action dated Nov. 24, 2008, 12 pgs.
U.S. Appl. No. 11/428,072, filed Jun. 30, 2006, Non-Final Office Action dated May 29, 2008.
Yang, Y., L. Brown and E. Lewis "eCommerce Trust via the Proposed W3 Trust Model", Proceedings of the Post Graduate ADFA Conference for Computer Science, Jul. 14, 2001.
Youl, T. "Phishing Scams: Understanding the Latest Trends", white paper, FraudWatch International, Jun. 2004.
Zawodny, J., "Spam the Spammers", Published Jul. 11, 2002.
Zhang, Y., J. Hong and L. Cranor "CANTINA: A Content-Based Approach to Detecting Phishing Websites", Proceedings of the WWW 2007 Conference, Security, Privacy, Reliability and Ethics Track, May 8-12, 2007, pp. 639-648.
Hiner, J., "Sam Spade: The Swiss Army Knife of Network Analysis", downloaded from www.techrepublic.com, Dec. 20, 2000, 13 pages.
May, C. et al., "Advanced Information Assurance Handbook", CERT/CC Training and Education Center, document No. CMU/SEI-2004-HB-001, Mar. 2004, pp. 243-253.
Pasley, T., "Using Sam Spade", SANS Institute InfoSec Reading Room, 2003, 18 pages.
Sam Spade "Internet Protocol Addressing and the Domain Name System", downloaded from www.samspade.org, Feb. 1, 2003, 11 pages.
Sam Spade "Sam Spade Features", downloaded from www.samspade.org, Feb. 11, 2002, 4 pages.
Sam Spade "Sam Spade Tools", downloaded from www.samspade.org, Feb. 12, 2004, 6 pages.
U.S. Appl. No. 10/709,398, Final Office Action dated Sep. 2, 2009, 35 pages.
U.S. Appl. No. 10/996,566, Notice of Allowance dated Sep. 7, 2010, 9 pgs.
U.S. Appl. No. 10/996,566, Non-Final Office Action dated Dec. 7, 2009, 12 pgs.
U.S. Appl. No. 10/996,567, Office Action dated Oct. 13, 2010, 17 pgs.
U.S. Appl. No. 10/996,567, Final Office Action dated Nov. 24, 2009, 15 pgs.
U.S. Appl. No. 10/996,646, Non-Final Office Action dated Nov. 12, 2009, 17 pgs.
U.S. Appl. No. 10/996,991, Final Office Action dated Nov. 12, 2009, 15 pgs.
U.S. Appl. No. 10/996,993, Non-Final Office Action dated Mar. 22, 2010, 9 pgs.
U.S. Appl. No. 11/428,072, Final Office Action dated Mar. 15, 2010, 14 pgs.
U.S. Appl. No. 11/428,072, Non-Final Office Action dated Sep. 29, 2009, 14 pgs.
U.S. Appl. No. 11/539,357, Non-Final Office Action dated Oct. 16, 2009, 17 pgs.
U.S. Appl. No. 11/550,142, Non-Final Office Action dated Nov. 9, 2009, 30 pgs.
U.S. Appl. No. 12/263,791, Final Office Action dated Dec. 2, 2010, 53 pgs.
U.S. Appl. No. 12/263,791, Non-Final Office Action dated Apr. 29, 2010, 70 pgs.

* cited by examiner

GENERATING PHISH MESSAGES

CROSS REFERENCE TO RELATED APPLICATIONS

This application is a continuation-in-part of, and claims the benefit of, U.S. patent application Ser. No. 10/709,398 filed May 2, 2004 by Shraim et al. and entitled "Online Fraud Solution," the entire disclosure of which is incorporated herein by reference for all purposes. This application also claims the benefit of the following provisional applications, the entire disclosures of which are incorporated herein by reference for all purposes: U.S. Prov. App. No. 60/615,973, filed Oct. 4, 2004 by Shraim et al. and entitled "Online Fraud Solution"; U.S. Prov. App. No. 60/610,716, filed Sep. 17, 2004 by Shull and entitled "Methods and Systems for Preventing Online Fraud"; and U.S. Prov. App. No. 60/610,715, filed Sep. 17, 2004 by Shull et al. and entitled "Customer-Based Detection of Online Fraud."

This application is also related to the following commonly-owned, copending applications, each of which is filed on a date even herewith and is incorporated by reference herein for all purposes: U.S. patent application Ser. No. 10/996,991, filed Nov. 23, 2004 by Shraim et al. and entitled "Online Fraud Solution"; U.S. patent application Ser. No. 10/996,567, filed Nov. 23, 2004 by Shraim et al. and entitled "Enhanced Responses to Online Fraud"; U.S. patent application Ser. No. 10/996,990, filed Nov. 23, 2004 by Shraim et al., and entitled "Customer-Based Detection of Online Fraud"; U.S. patent application Ser. No. 10/996,566, filed Nov. 23, 2004 by Shraim et al., and entitled "Early Detection of Online Fraud"; U.S. patent application Ser. No. 10/996,646, filed Nov. 23, 2004 by Shraim et al. and entitled "Enhanced Responses to Online Fraud"; U.S. patent application Ser. No. 10/996,993, filed Nov. 23, 2004 by Shraim et al. and entitled "Advanced Responses to Online Fraud"; and U.S. patent application Ser. No. 10/997,626, filed Nov. 23, 2004 by Shraim et al. and entitled "Methods and Systems for Analyzing Data Related to Possible Online Fraud".

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates computer systems, and more particularly to systems, methods and software for detecting, preventing, responding to and/or otherwise dealing with online fraud.

Electronic mail ("email") has become a staple of modern communications. Unfortunately, however, anyone who uses email on a regular basis is familiar with the vast quantities of "spam" (unsolicited email) sent to nearly every email addressee from various advertisers. Although somewhat analogous to traditional paper "junk mail," spam is unique in that, for virtually no cost, a purveyor of spam ("spammer") can easily and quickly generate and transmit copious amounts of spam. Further, limitations in the Internet-standard simple mail transport protocol ("SMTP") allow spammers to transmit spam with relative anonymity and, therefore, with correspondingly little accountability. Consequently, even though spam annoys the vast majority of recipients and, thus, generates few successful sales opportunities for the spammer relative to the amount of spam transmitted, the spam "industry" is burgeoning: Given their ability to inexpensively and quickly transmit enormous quantities of spam, spammers can make a handsome profit even from the relatively low response rate to the spam advertising.

By their nature, spammers continually search for new recipients (victims) to which to send spam. The spam "industry," therefore has launched a derivative industry of "harvesters," who scour the Internet and other sources to generate lists of valid email addresses, which they then sell to the spammers. (Obviously, since these activities go hand-in-hand, many spammers act as harvesters for themselves or their fellow spammers). Harvesters use a variety of techniques for obtaining email address lists, and often develop automated search programs (commonly referred to as "robots" or "web-crawlers") that continually skulk about the Internet searching for new email addresses. For example, harvesters obtain email addresses from Internet (and other) news groups, chat rooms, and directory service (e.g., white pages) sites, as well as message boards, mailing lists, and web pages, on which users commonly provide email addresses for feedback, etc.

The success of spam as a marketing technique has begun to result in the use of spam to perpetrate "phishing" operations. A phishing operation can be defined as any type of social engineering attack (typically relying the illegitimate use of a brand name) to induce a consumer to take an action that he/she otherwise would not take. Phishing scams can operate by bribery, flattery, deceit, cajoling and through other methods. Phishing operations often involve mass contact of consumers (for example, by "spam" email messages, text messages, VoIP calls, instant messages, etc. as well as through other devices) and generally direct contacted consumers to a response site, which often is a web site but can also be a telephone number, etc.

One fairly common example of a phishing scam is a spam email message advertising a well-known software application or package (which in fact was pirated or otherwise obtained illegitimately) at a greatly reduced price, and directing respondents to a web site where the software can be purchased. Upon visiting the site, consumers would (or should) know that the advertised price is grossly unrealistic and probably indicates some time of illegitimacy, such as black- or gray-market goods. Some consumers, however, either out of ignorance or willful blindness, will accept the phisher's assurances that the software is legitimate and therefore will purchase the illegitimate software, completing the phishing scam.

Another common phishing operation is known as a "spoofing" scam. This practice involves inserting a false email address in the "From" or "Reply-to" headers of an email message, thereby misleading the recipient into believing that the email originated from a relatively trusted source. Spoofed emails often appear to be from well-known Internet service providers ("ISPs") (such as, for example, America Online™ and The Microsoft Network™), or other high-profile entities with easily-identifiable email addresses (including, for example IBM™, Microsoft™, General Motors™ and E-Bay™, as well as various financial institutions, online retailers and the like). This spoofing is unacceptable to these entities for many reasons, not the least because it causes customer confusion, destroys the value of a well-cultivated online presence, creates general mistrust of the spoofed brands and largely dilutes the value of a reputable entity's online communications and transactions.

Further, in many cases, spammers and/or spoofers have developed avenues of disseminating information amongst their "industry," including a variety of online for a such as message boards, chat rooms, newsgroups, and the like. At such locations, spammers often discuss strategies for more effective spamming/spoofing, new spoof sites, etc., as well as trade and/or advertise lists of harvested addresses. By using these resources, spammers and/or spoofers can focus on the most effective spamming/spoofing techniques, learn from and/or copy the spoofed web sites of others, and the like. Such resources also allow a new spammer or spoofer to quickly pick up effective spamming and/or spoofing techniques.

Perhaps most alarmingly, spam (and spoofed spam in particular) has increasingly been used to promote fraudulent activity such as phishing attacks, including identity theft, unauthorized credit card transactions and/or account withdrawals, and the like. This technique involves masquerading as a trusted business in order to induce an unsuspecting consumer to provide confidential personal information, often in response to a purported request to update account information, confirm an online transaction, etc. Merely by way of example, a spoofer may send a spoof email purporting to be from the recipient's bank and requesting (ironically) that the recipient "confirm" her identity by providing confidential information by reply email or by logging on to a fraudulent web site. Similarly, a common spoofed message requests that the recipient log on to a well-known e-commerce site and "update" credit card information stored by that site.

Spam messages (and in particular those that are part of a phishing scheme) often include a uniform resource locator ("URL") linking to the web site of the phisher. The web site may, for example, be a response point for the sale of illegitimate goods. In other cases, the URL may be configured to appear to be associated with the web site of a spoofed sender, but may actually redirects the recipient to a spoofed web site (i.e., a web site that imitates or is designed to look like the web site of the spoofed source of the email). Upon visiting the spoofed web site, the recipient may be presented with a form that requests information such as the recipient's address, phone number, social security number, bank account number, credit card number, mother's maiden name, etc. The recipient, believing that she is communicating with a trusted company, may provide some or all of this information, which then is at the spammer's disposal to use for any of a variety of illegitimate purposes. (In some cases, the link may be configured to present a legitimate web site, with an illegitimate and/or spoofed popup window presented over the legitimate web site with instructions to provide personal information, etc., which will be collected by the phisher)

Thus, phishing scams and other illegitimate online activities have flourished. While such activity is indisputably both illegal and immoral, the relative anonymity of the phishers, as well as the international nature of the Internet, hinders effective legal prosecution for these activities. Merely by way of example, the server associated with a fraudulent web site may be located in a country from which prosecution/extradition is highly unlikely. Moreover, these fraudulent web sites are often highly transient, existing on a given server or ISP for a short time (perhaps only a matter of days or even hours) before the phisher moves on to a new server or ISP. Compounding the enforcement problem is the fact that many of the servers hosting fraudulent web sites are legitimate servers that have been compromised (or "hacked") by the phisher or his associates, with the owner/operator of the server having no idea that the server is secretly being used for illegitimate purposes.

Accordingly, there is a need for efficient solutions to deal with these abuses.

BRIEF SUMMARY

Various embodiments of the invention provide solutions (including inter alia, systems, methods and software) for dealing with online fraud. In particular, various embodiments of the invention provide ways to incite unsolicited email messages (such as spam messages, phish messages, etc.). In accordance with some embodiments, a bait email address may be planted in a particular location on the Internet. In particular embodiments, the location of the planted email address may be tracked in order to determine which locations are relatively more likely to generate unsolicited email messages. In other embodiments, domains likely to host addresses receiving unsolicited messages may be obtained. In some cases, unsolicited messages may be analyzed and/or otherwise processed to determine whether the messages are possibly associated with a fraudulent activity. Such analysis may lead to the investigation of one or more web sites and/or to the initiation of a response against a fraudulent activity.

One set of embodiments provides methods, including without limitation methods of inciting unsolicited email messages. An exemplary method may comprise searching a listing of domain registration records for a domain registration record that is associated with a candidate domain that would be suitable for attracting unsolicited email messages. The method may further include monitoring the listing of domain registration records for an expiration of the domain registration record and/or registering the candidate domain. An received email message (which may be addressed to a userid at the candidate domain) may then be accepted. Some embodiments might also comprise generating a bait email address for planting. Generating a bait email address can comprise generating with a computer a userid component of a bait email address and/or combining the userid component with a domain name associated with the registered candidate domain to generate a bait email address.

Another exemplary embodiment comprises planting a bait email address at a location on a computer network (which can be the Internet or any other suitable network). The location may be a likely target for a third party attempting to harvest email addresses. The method may further comprise receiving an email message addressed to the bait email address and/or analyzing (perhaps with a computer) the received email message to determine whether the message is an unsolicited email message.

In some embodiments, the bait email address may be an existing email address. In other embodiments, the method further comprises generating a bait email address for planting. The procedure for generating a bait email address can comprise generating a userid component of a bait email address. Generating a userid component may comprise any of a variety of procedures, including without limitation generating a random string, selecting a string from a list, etc. In particular embodiment generating a userid component can comprise selecting from a first userid element from a first list and/or selecting a second userid element from a second list. The userid component, them may comprise the first userid element and the second userid element. In addition, a host and/or domain component may be selected, and the userid component may be combined to generate a bait email address.

Optionally, the bait email address may be tracked, perhaps along with the location(s) at which the bait email address was planted. An email message addressed to the bait email address may be received, and the method can include correlating the received email message with the tracked bait email address and/or location. Since the reception of an email address can indicate that the planting location is fruitful, the method can further comprise planting one or more additional bait email addresses at that location.

In accordance with some embodiments, if an email message is received, that message may be forwarded to a correlation engine for analysis. Alternatively, the method may comprise determining that the received email message is a fraudulent email message. Merely by way of example, the received email message may comprise a URL directing a recipient of the message to a web site referenced by the URL. In such cases, the received email message may be analyzed (using, e.g., any of the procedures described in detail below). Merely by way of example, analyzing the message can include parsing the received email message to identify a header portion of the received email message, a body portion of the received email message, and/or a uniform resource locator portion of the received email message; each of these portions may be analyzed.

Based, perhaps, on this analysis, the message may be categorized as a possibly fraudulent email message (based, perhaps, on an analysis of the received email message). The URL, then may be investigated to determine information about a server hosting the web site referenced by the URL. Optionally, a report may be prepared. The report may comprise at least some of the information about the server. The report may be analyzed to determine whether the server is likely engaged in a fraudulent activity. In some embodiments, the method can also include pursuing a response (and/or allowing a technician to initiate a response) to the fraudulent activity. A wide variety of responses may be pursued and/or initiated. Some possible responses are described below and/or in the applications incorporated by reference. Examples of such responses include technical responses and administrative responses.

Another exemplary method of inciting unsolicited messages comprises planting a bait email address at a location on the Internet; correlating the bait email address with the location at which it was planted, and receiving an email message addressed to the bait email address. The method may further comprise determining (perhaps based on the received email message), that the location is likely to generate additional unsolicited email messages. One or more additional email addresses may then be planted at that location.

Yet another embodiment provides a method of inciting email messages. The method may comprise generating a userid component of a bait email address and/or selecting a domain component of a bait email address. The components may be combined to generate a bait email address, and/or a location on the Internet may be identified. In some cases, the location is likely to generate unsolicited email messages. The generated bait email address may be planted at that location, and/or the generated email address, perhaps along with the identified location, may be tracked, for instance in a database. The location can be, merely by way of example, a web site, an online chat room, a newsgroup, a bulletin board, a domain registration, an online commerce site, and/or an email list.

In some cases, an email message addressed to the bait email address may be received. In other cases, the method may comprise investigating a domain associated with the identified location. The investigation may determine whether the location is involved in a fraudulent activity. Optionally, the message may be forwarded to a correlation engine for analysis, and/or it may be determined that the email message is a fraudulent email message (e.g., a phish message, etc.).

In particular embodiments, a feedback loop may be implemented. The feedback loop may designate the identified location as a location likely to generate unsolicited email messages and/or prioritize the identified location as a preferred location for planting at least one additional generated bait email address.

The process for generating a bait email address may be similar to that described above, for example. In some embodiments, the method may include maintaining a list of domains (e.g., in a database) available to receive email messages, and selecting a domain may comprise selecting a domain from this list. In other embodiments, the method may include taking an appropriate action to enable a domain associated with a bait email address to receive email messages addressed to the bait email address. (This may be, but is not necessarily, performed by an automated process.) One example of an appropriate action is creating an email account on a mail server responsible for receiving email messages directed to the domain associated with the domain component; the email account may correspond to the userid component. Another example is opening an account with an Internet service provider responsible for managing the domain associated with the domain component; again, the account may correspond to the userid component. Yet another example is enabling a mail server responsible for receiving email messages directed to the domain associated with the domain component to receive all messages directed to any recipient at the domain, regardless of a userid of the recipient.

Another exemplary embodiment provides a method comprising providing a bait email address (which may be generated, as described above, for example) and/or identifying a plurality of locations on the Internet. One or more of the locations may be likely to generate unsolicited email messages. The bait email address may be planted at each of the plurality of locations. The method may also comprise, for a particular location, providing at least one piece of information associated with the bait email address. In some cases, the information may be provided as information associated with a fictitious entity to whom the bait email address "belongs." The information may be sufficient to identify to the particular location at which the bait email address is planted. Such information can comprise, merely by way of example, a first name, a last name, a combination of first and last name, a birth date, a social security number, an email address, a telephone number, a mother's maiden name, a password, and a subject matter interest.

In some embodiments, a piece of information may be planted at each of the planting locations. Each piece of information may be sufficient to identify a particular planting location from the other planting locations, and/or each of the plurality of locations, along with the respective piece of information and perhaps the bait email address, may be tracked (e.g., in a database). Thus, for each of the plurality of locations, a distinct piece of information is planted, such that none of the plurality of locations is planted with the same piece of information.

The method may further comprise tracking the particular location, perhaps along with the bait email address and the information. Tracking the location can comprise creating a record (e.g., in a database) associated with the location. In some cases, the record comprises data about the particular location, data about the bait email address, and/or data about the information.

An email message may be received, and the email message may be addressed to the bait email address and/or may comprise the information identifying a particular location. The method, then, can further comprise identifying (perhaps based on the identifying information) that particular location as particularly likely to generate unsolicited email messages. That location may be prioritized as a preferred location for planting additional bait email addresses, and/or at least one additional email address may be planted at that location.

Other sets of embodiments provide systems and/or software programs, including without limitation systems configured to perform methods of the invention and/or software programs comprising instructions executable by one or more computers to perform methods of the invention. Merely by way of example, an exemplary system comprises a processor and instructions executable by the processor to perform one or more of the methods described above. As another example, a software program (which can be embodied on a computer readable medium) may comprise instructions executable by one or more computers to perform one or more of the methods described above.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

In accordance with various embodiments, systems, methods and software are provided for combating online fraud, and specifically "phishing" operations. An exemplary phishing operation, known as a "spoofing" scam, uses "spoofed" email messages to induce unsuspecting consumers into accessing an illicit web site and providing personal information to a server believed to be operated by a trusted affiliate (such as a bank, online retailer, etc.), when in fact the server is operated by another party masquerading as the trusted affiliate in order to gain access to the consumers' personal information. As used herein, the term "personal information" should be understood to include any information that could be used to identify a person and/or normally would be revealed by that person only to a relatively trusted entity. Merely by way of example, personal information can include, without limitation, a financial institution account number, credit card number, expiration date and/or security code (sometimes referred to in the art as a "Card Verification Number," "Card Verification Value," "Card Verification Code" or "CVV"), and/or other financial information; a userid, password, mother's maiden name, and/or other security information; a full name, address, phone number, social security number, driver's license number, and/or other identifying information.

1. Overview

Figure 1A:
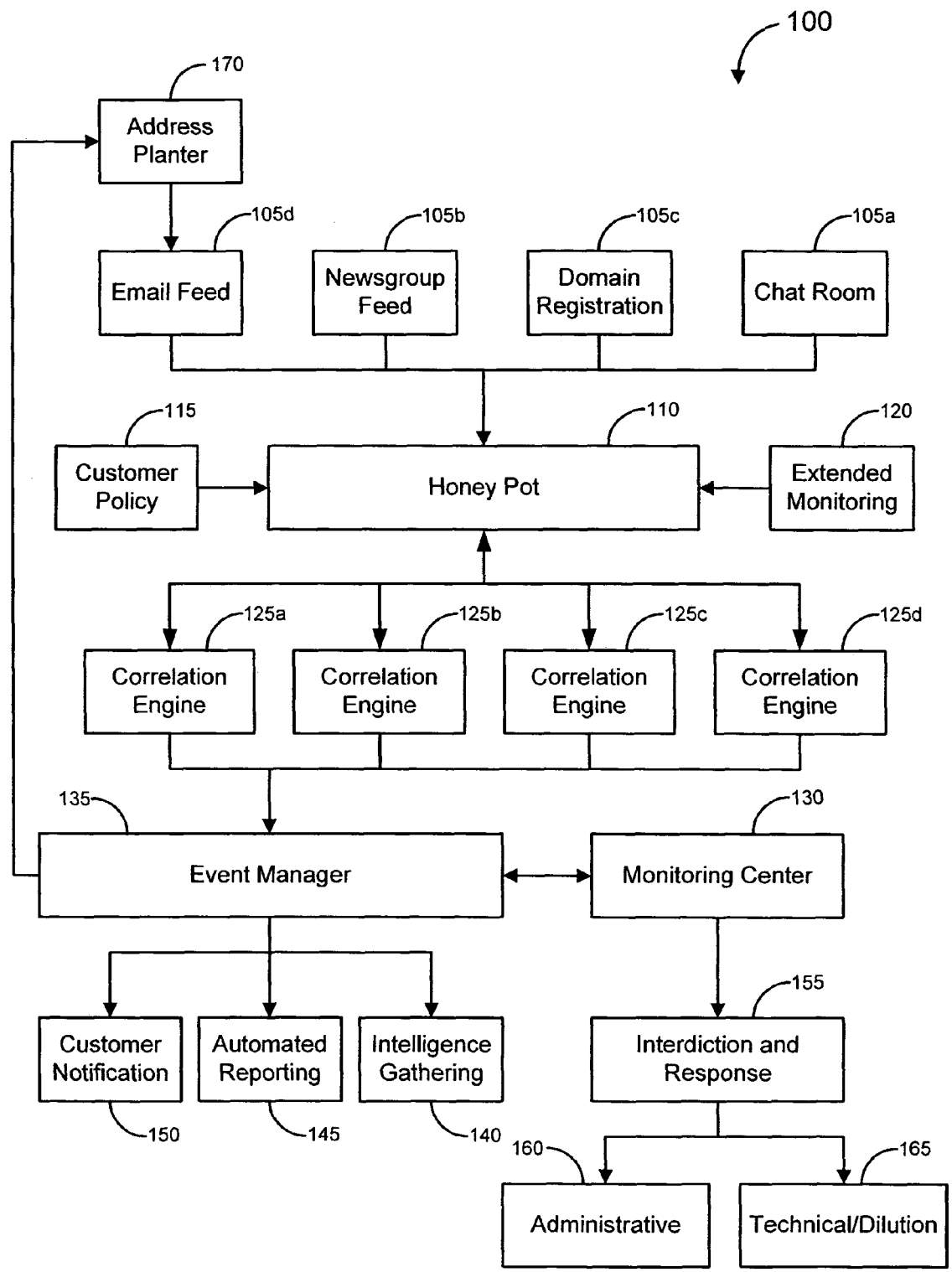
FIG. 1A is a functional diagram illustrating a system for combating online fraud, in accordance with various embodiments of the invention.

Certain embodiments of the invention feature systems, methods and/or software that attract such spoofed email messages, analyze the messages to assess the probability that the message is involved with a fraudulent activity (and/or comprises a spoofed message), and provide responses to any identified fraudulent activity. FIG. 1A illustrates the functional elements of an exemplary system 100 that can be used to combat online fraud in accordance with some of these embodiments and provides a general overview of how certain embodiments can operate. (Various embodiments will be discussed in additional detail below). It should be noted that the functional architecture depicted by FIG. 1A and the procedures described with respect to each functional component are provided for purposes of illustration only, and that embodiments of the invention are not necessarily limited to a particular functional or structural architecture; the various procedures discussed herein may be performed in any suitable framework.

In many cases, the system 100 of FIG. 1A may be operated by a fraud prevention service, security service, etc. (referred to herein as a "fraud prevention provider") for one or more customers. Often, the customers will be entities with products, brands and/or web sites that risk being imitated, counterfeited and/or spoofed, such as online merchants, financial institutions, businesses, etc. In other cases, however, the fraud prevention provider may be an employee of the customer an/or an entity affiliated with and/or incorporated within the customer, such as the customer's security department, information services department, etc.

In accordance with some embodiments, of the invention, the system 100 can include (and/or have access to) a variety of data sources 105. Although the data sources 105 are depicted, for ease of illustration, as part of system 100, those skilled in the art will appreciate, based on the disclosure herein, that the data sources 105 often are maintained independently by third parties and/or may be accessed by the system 100. In some cases, certain of the data sources 105 may be mirrored and/or copied locally (as appropriate), e.g., for easier access by the system 100.

The data sources 105 can comprise any source from which data about a possible online fraud may be obtained, including, without limitation, one or more chat rooms 105a, newsgroup feeds 105b, domain registration files 105c, and/or email feeds 105d. The system 100 can use information obtained from any of the data sources 105 to detect an instance of online fraud and/or to enhance the efficiency and/or effectiveness of the fraud prevention methodology discussed herein. In some cases, the system 100 (and/or components thereof) can be configured to "crawl" (e.g., to automatically access and/or download information from) various of the data sources 105 to find pertinent information, perhaps on a scheduled basis (e.g., once every 10 minutes, once per day, once per week, etc.).

Merely by way of example, there are several newsgroups commonly used to discuss new spamming/spoofing schemes, as well as to trade lists of harvested email addresses. There are also anti-abuse newsgroups that track such schemes. The system 100 may be configured to crawl any applicable newsgroup(s) 105b to find information about new spoof scams, new lists of harvested addresses, new sources for harvested addresses, etc. In some cases, the system 100 may be configured to search for specified keywords (such as "phish," "spoof," etc.) in such crawling. In other cases, newsgroups may be scanned for URLs, which may be download (or copied) and subjected to further analysis, for instance, as described in detail below. In addition, as noted above, there may be one or more anti-abuse groups that can be monitored. Such anti-abuse newsgroups often list new scams that have been discovered and/or provide URLs for such scams. Thus, such anti-abuse groups may be monitored/crawled, e.g., in the way described above, to find relevant information, which may then be subjected to further analysis. Any other data source (including, for example, web pages and/or entire web sites, email messages, etc.) may be crawled and/or searched in a similar manner.

As another example, online chat rooms (including without limitation, Internet Relay Chat ("IRC") channels, chat rooms maintained/hosted by various ISPs, such as Yahoo™, America Online™, etc., and/or the like) (e.g., 105a) may be monitored (and/or logs from such chat rooms may be crawled) for pertinent information. In some cases, an automated process (known in the art as a "bot") may be used for this purpose. In other cases, however, a human attendant may monitor such chat rooms personally. Those skilled in the art will appreciate that often such chat rooms require participation to maintain access privileges. In some cases, therefore, either a bot or a human attendant may post entries to such chat rooms in order to be seen as a contributor.

Domain registration zone files 105c (and/or any other sources of domain and/or network information, such as Internet registry e.g., ARIN) may also be used as data sources. As those skilled in the art will appreciate, zone files are updated periodically (e.g., hourly or daily) to reflect new domain registrations. These files may be crawled/scanned periodically to look for new domain registrations. In particular embodiments, a zone file 105c may be scanned for registrations similar to a customer's name and/or domain. Merely by way of example, the system 100 can be configured to search for similar domains registration with a different top level domain ("TLD") or global top level domain ("gTLD"), and/or a domains with similar spellings. Thus, if a customer uses the <acmeproducts.com> domain, the registration of <acme-products.biz>, <acmeproducts.co.uk>, and/or <acmeproduct.com> might be of interest as potential hosts for spoof sites, and domain registrations for such domains could be downloaded and/or noted, for further analysis of the domains to which the registrations correspond. In some embodiments, if a suspicious domain is found, that domain may be placed on a monitoring list. Domains on the monitoring list may be monitored periodically, as described in further detail below, to determine whether the domain has become "live" (e.g., whether there is an accessible web page associated with the domain).

Figure 1B:
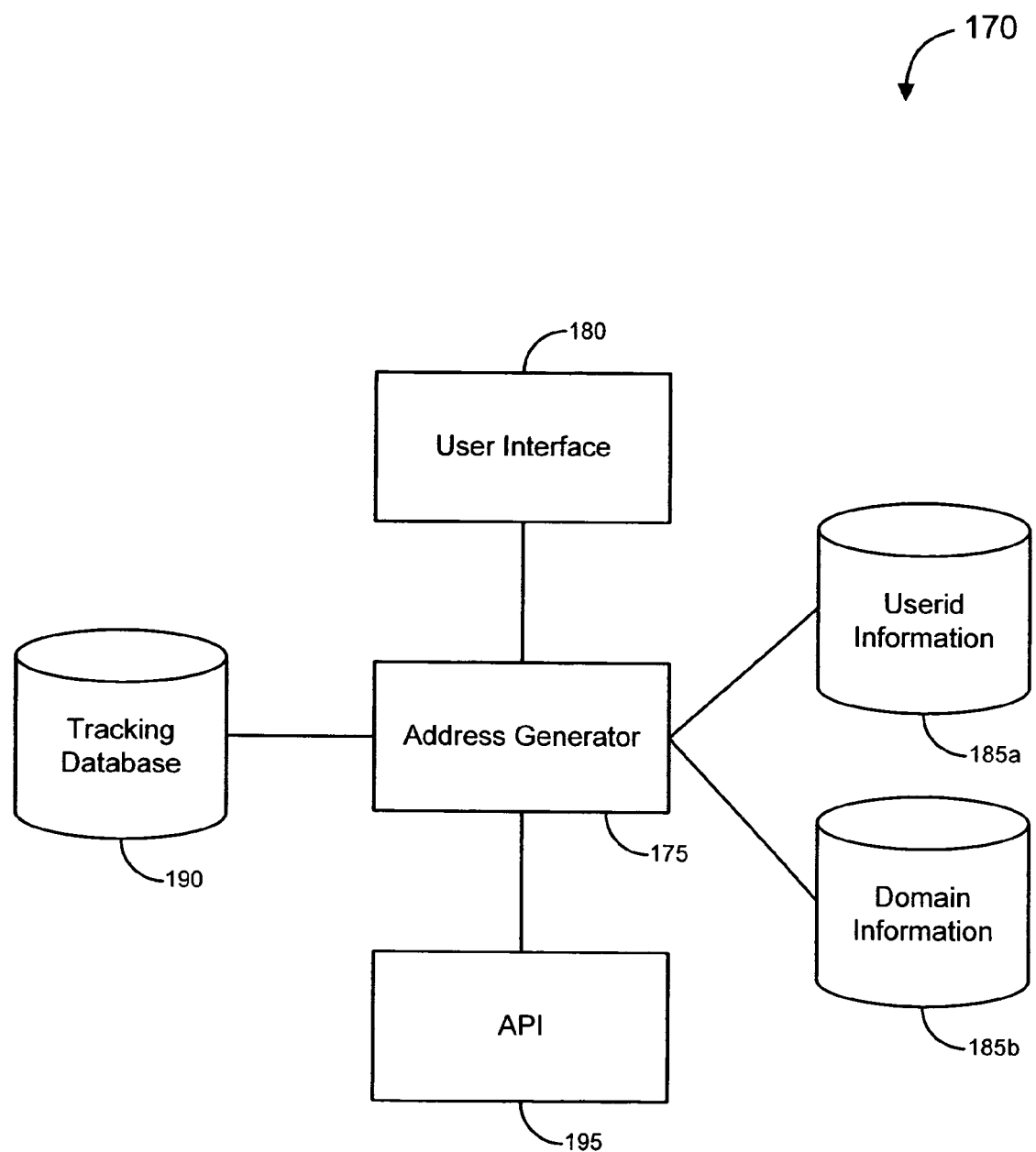
FIG. 1B is a functional diagram illustrating a system for planting bait email addresses, in accordance with various embodiments of the invention.

One or more email feeds 105d can provide additional data sources for the system 100. An email feed can be any source of email messages, including spam messages, as described above. (Indeed, a single incoming email message may be considered an email feed in accordance with some embodiments.) In some cases, for instance as described in more detail below, bait email addresses may be "seeded" or planted by embodiments of the invention, and/or these planted addresses can provide a source of email (i.e., an email feed). The system 100, therefore, can include an address planter 170, which is shown in detail with respect to FIG. 1B.

The address planter 170 can include an email address generator 175. The address generator 175 can be in communication with a user interface 180 and/or one or more databases 185 (each of which may comprise a relational database and/or any other suitable storage mechanism). One such data store may comprises a database of userid information 185a. The userid information 185a can include a list of names, numbers and/or other identifiers that can be used to generate userids in accordance with embodiments of the invention. In some cases, the userid information 185a may be categorized (e.g., into first names, last names, modifiers, such as numbers or other characters, etc.). Another data store may comprise domain information 185b. The database of domain information 185b may include a list of domains available for addresses. In many cases, these domains will be domains that are owned/managed by the operator of the address planter 170. In other cases, however, the domains might be managed by others, such as commercial and/or consumer ISPs, etc.

The address generator 175 comprises an address generation engine, which can be configured to generate (on an individual and/or batch basis), email addresses that can be planted at appropriate locations on the Internet (or elsewhere). Merely by way of example, the address generator 175 may be configured to select one or more elements of userid information from the userid data store 185a (and/or to combine a plurality of such elements), and append to those elements a domain selected from the domain data store 185b, thereby creating an email address. The procedure for combining these components is discretionary. Merely by way of example, in some embodiments, the address generator 175 can be configured to prioritize certain domain names, such that relatively more addresses will be generated for those domains. In other embodiments, the process might comprise a random selection of one or more address components.

Some embodiments of the address planter 170 include a tracking database 190, which can be used to track planting operations, including without limitation the location (e.g., web site, etc.) at which a particular address is planted, the date/time of the planting, as well as any other pertinent detail about the planting. Merely by way of example, if an address is planted by subscribing to a mailing list with a given address, the mailing list (as well, perhaps, as the web site, list maintainer's email address, etc.) can be documented in the tracking database. In some cases, the tracking of this information can be automated (e.g., if the address planter's 170 user interface 180 includes a web browser and/or email client, and that web browser/email client is used to plant the address, information about the planting information may be automatically registered by the address planter 170). Alternatively, a user may plant an address manually (e.g., using her own web browser, email client, etc.), and therefore may add pertinent information to the tracking database via a dedicated input window, web browser, etc.

In one set of embodiments, therefore, the address planter 170 may be used to generate an email address, plant an email address (whether or not generated by the address planter 170) in a specified location and/or track information about the planting operation. In particular embodiments, the address planter 170 may also include one or more application programming interfaces ("API") 195, which can allow other components of the system 100 of FIG. 1 (or any other appropriate system) to interact programmatically with the address planter. Merely by way of example, in some embodiments, an API 195 can allow the address planter 170 to interface with a web browser, email client, etc. to perform planting operations. (In other embodiments, as described above, such functionality may be included in the address planter 170 itself).

A particular use of the API 195 in certain embodiments is to allow other system components (including, in particular, the event manager 135) to obtain and/or update information about address planting operations (and/or their results). (In some cases, programmatic access to the address planter 170 may not be needed—the necessary components of the system 100 can merely have access—via SQL, etc.—one or more of the data stores 185, as needed.) Merely by way of example, if an email message is analyzed by the system 100 (e.g., as described in detail below), the system 100 may interrogate the address planter 170 and/or one or more of the data stores 185 to determine whether the email message was addressed to an address planted by the address planter 170. If so, the address planter 170 (or some other component of the system 100, such as the event manager 135), may note the planting location as a location likely to provoke phish messages, so that additional addresses may be planted in such a location, as desired. In this way, the system 100 can implement a feedback loop to enhance the efficiency of planting operations. (Note that this feedback process can be implemented for any desired type of "unsolicited" message, including without limitation phish messages, generic spam messages, messages evidencing trademark misuse, etc.).

Other email feeds are described elsewhere herein, and they can include (but are not limited to), messages received directly from spammers/phishers; email forwarded from users, ISPs and/or any other source (based, perhaps, on a suspicion that the email is a spam and/or phish); email forwarded from mailing lists (including without limitation anti-abuse mailing lists), etc. When an email message (which might be a spam message) is received by the system 100, that message can be analyzed to determine whether it is part of a phishing/spoofing scheme. The analysis of information received from any of these data feeds is described in further detail below, and it often includes an evaluation of whether a web site (often referenced by a URL or other information received/downloaded from a data source 105) is likely to be engaged in a phishing and/or spoofing scam.

Any email message incoming to the system can be analyzed according to various methods of the invention. As those skilled in the art will appreciate, there is a vast quantity of unsolicited email traffic on the Internet, and many of those messages may be of interest in the online fraud context. Merely by way of example, some email messages may be transmitted as part of a phishing scam, described in more detail herein. Other messages may solicit customers for black- and/or grey-market goods, such as pirated software, counterfeit designer items (including without limitation watches, handbags, etc.). Still other messages may be advertisements for legitimate goods, but may comprise unlawful or otherwise forbidden (e.g., by contract) practices, such as improper trademark use and/or infringement, deliberate under-pricing of goods, etc. Various embodiments of the invention can be configured to search for, identify and/or respond to one or more of these practices, as detailed below. (It should be noted as well that certain embodiments may be configured to access, monitor, crawl, etc. data sources—including zone files, web sites, chat rooms, etc.—other than email feeds for similar conduct). Merely by way of example, the system 100 could be configured to scan one or more data sources for the term ROLEX™, and/or identify any improper advertisements for ROLEX™ watches.

Those skilled in the art will further appreciate that an average email address will receive many unsolicited email messages, and the system 100 may be configured, as described below, to receive and/or analyze such messages. Incoming messages may be received in many ways. Merely by way of example, some messages might be received "randomly," in that no action is taken to prompt the messages. Alternatively, one or more users may forward such messages to the system. Merely by way of example, an ISP might instruct its users to forward all unsolicited messages to a particular address, which could be monitored by the system 100, as described below, or might automatically forward copies of users' incoming messages to such an address. In particular embodiments, an ISP might forward suspicious messages transmitted to its users (and/or parts of such suspicious messages, including, for example, any URLs included in such messages) to the system 100 (and/or any appropriate component thereof) on a periodic basis. In some cases, the ISP might have a filtering system designed to facilitate this process, and/or certain features of the system 100 might be implemented (and/or duplicated) within the ISP's system.

As described above, the system 100 can also plant or "seed" bait email addresses (and/or other bait information) in certain of the data sources, e.g. for harvesting by spammers/phishers. In general, these bait email addresses are designed to offer an attractive target to a harvester of email addresses, and the bait email addresses usually (but not always) will be generated specifically for the purpose of attracting phishers and therefore will not be used for normal email correspondence.

Returning to FIG. 1A, therefore, the system 100 can further include a "honey pot" 110. The honey pot 110 can be used to receive information from each of the data sources 105 and/or to correlate that information for further analysis if needed. The honey pot 110 can receive such information in a variety of ways, according to various embodiments of the invention, and how the honey pot 110 receives the information is discretionary.

Merely by way of example, the honey pot 110 may, but need not, be used to do the actual crawling/monitoring of the data sources, as described above. (In some cases, one or more other computers/programs may be used to do the actual crawling/monitoring operations and/or may transmit to the honey pot 110 any relevant information obtained through such operations. For instance, a process might be configured to monitor zone files and transmit to the honey pot 110 for analysis any new, lapsed and/or otherwise modified domain registrations. Alternatively, a zone file can be fed as input to the honey pot 110, and/or the honey pot 110 can be used to search for any modified domain registrations.) The honey pot 110 may also be configured to receive email messages (which might be forwarded from another recipient) and/or to monitor one or more bait email addresses for incoming email. In particular embodiments, the system 100 may be configured such that the honey pot 110 is the mail server for one or more email addresses (which may be bait addresses), so that all mail addressed to such addresses is sent directly to the honey pot 110. The honey pot 110, therefore, can comprise a device and/or software that functions to receive email messages (such as an SMTP server, etc.) and/or retrieve email messages (such as a POP3 and/or IMAP client, etc.) addressed to the bait email addresses. Such devices and software are well-known in the art and need not be discussed in detail herein. In accordance with various embodiments, the honey pot 110 can be configured to receive any (or all) of a variety of well-known message formats, including SMTP, MIME, HTML, RTF, SMS and/or the like. The honey pot 110 may also comprise one or more databases (and/or other data structures), which can be used to hold/categorize information obtained from email messages and other data (such as zone files, etc.), as well as from crawling/monitoring operations.

In some aspects, the honey pot 110 might be configured to do some preliminary categorization and/or filtration of received data (including without limitation received email messages). In particular embodiments, for example, the honey pot 110 can be configured to search received data for "blacklisted" words or phrases. (The concept of a "blacklist" is described in further detail below). The honey pot 110 can segregate data/messages containing such blacklisted terms for prioritized processing, etc. and/or filter data/messages based on these or other criteria.

The honey pot 110 also may be configured to operate in accordance with a customer policy 115. An exemplary customer policy might instruct the honey pot to watch for certain types and/or formats of emails, including, for instance, to search for certain keywords, allowing for customization on a customer-by-customer basis. In addition, the honey pot 110 may utilize extended monitoring options 120, including monitoring for other conditions, such as monitoring a customer's web site for compromises, etc. The honey pot 110, upon receiving a message, optionally can convert the email message into a data file.

In some embodiments, the honey pot 110 will be in communication with one or more correlation engines 125, which can perform a more detailed analysis of the email messages (and/or other information/data, such as information received from crawling/monitoring operations) received by the honey pot 110. (It should be noted, however, that the assignment of functions herein to various components, such as honey pots 110, correlation engines 125, etc. is arbitrary, and in accordance with some embodiments, certain components may embody the functionality ascribed to other components.)

On a periodic basis and/or as incoming messages/information are received/retrieved by the honey pot 110, the honey pot 110 will transmit the received/retrieved email messages (and/or corresponding data files) to an available correlation engine 125 for analysis. Alternatively, each correlation engine 125 may be configured to periodically retrieve messages/data files from the honey pot 110 (e.g., using a scheduled FTP process, etc.). For example, in certain implementations, the honey pot 110 may store email messages and/or other data (which may or may not be categorized/filtered), as described above, and each correlation engine may retrieve data an/or messages on a periodic and/or ad hoc basis. For instance, when a correlation engine 125 has available processing capacity (e.g., it has finished processing any data/messages in its queue), it might download the next one hundred messages, data files, etc. from the honey pot 110 for processing. In accordance with certain embodiments, various correlation engines (e.g., 125*a*, 125*b*, 125*c*, 125*d*) may be specifically configured to process certain types of data (e.g., domain registrations, email, etc.). In other embodiments, all correlation engines 125 may be configured to process any available data, and/or the plurality of correlation engines (e.g., 125*a*, 125*b*, 125*c*, 125*d*) can be implemented to take advantage of the enhanced efficiency of parallel processing.

The correlation engine(s) 125 can analyze the data (including, merely by way of example, email messages) to determine whether any of the messages received by the honey pot 110 are phish messages and/or are likely to evidence a fraudulent attempt to collect personal information. Procedures for performing this analysis are described in detail below.

The correlation engine 125 can be in communication an event manager 135, which may also be in communication with a monitoring center 130. (Alternatively, the correlation engine 125 may also be in direct communication with the monitoring center 130.) In particular embodiments, the event manager 135 may be a computer and/or software application, which can be accessible by a technician in the monitoring center 130. If the correlation engine 125 determines that a particular incoming email message is a likely candidate for fraudulent activity or that information obtained through crawling/monitoring operations may indicate fraudulent activity, the correlation engine 125 can signal to the event manager 135 that an event should be created for the email message. In particular embodiments, the correlation engine 125 and/or event manager 135 can be configured to communicate using the Simple Network Management ("SNMP") protocol well known in the art, and the correlation engine's signal can comprise an SNMP "trap" indicating that analyzed message(s) and/or data have indicated a possible fraudulent event that should be investigated further. In response to the signal (e.g., SNMP trap), the event manager 135 can create an event (which may comprise an SNMP event or may be of a proprietary format).

Upon the creation of an event, the event manager 135 can commence an intelligence gathering operation (investigation) 140 of the message/information and/or any URLs included in and/or associated with message/information. As described in detail below, the investigation can include gathering information about the domain and/or IP address associated with the URLs, as well as interrogating the server(s) hosting the resources (e.g., web page, etc.) referenced by the URLs. (As used herein, the term "server" is sometimes used, as the context indicates, any computer system that is capable of offering IP-based services or conducting online transactions in which personal information may be exchanged, and specifically a computer system that may be engaged in the fraudulent collection of personal information, such as by serving web pages that request personal information. The most common example of such a server, therefore, is a web server that operates using the hypertext transfer protocol ("HTTP") and/or any of several related services, although in some cases, servers may provide other services, such as database services, etc.). In certain embodiments, if a single email message (or information file) includes multiple URLs, a separate event may be created for each URL; in other cases, a single event may cover all of the URLs in a particular message. If the message and/or investigation indicates that the event relates to a particular customer, the event may be associated with that customer.

The event manager can also prepare an automated report 145 (and/or cause another process, such as a reporting module (not shown) to generate a report), which may be analyzed by an additional technician at the monitoring center 130 (or any other location, for that matter), for the event; the report can include a summary of the investigation and/or any information obtained by the investigation. In some embodiments, the process may be completely automated, so that no human analysis is necessary. If desired (and perhaps as indicated by the customer policy 115), the event manager 135 can automatically create a customer notification 150 informing the affected customer of the event. The customer notification 150 can comprise some (or all) of the information from the report 145. Alternatively, the customer notification 150 can merely notify the customer of an event (e.g., via email, telephone, pager, etc.) allowing a customer to access a copy of the report (e.g., via a web browser, client application, etc.). Customers may also view events of interest to the using a portal, such as a dedicated web site that shows events involving that customer (e.g., where the event involves a fraud using the customer's trademarks, products, business identity, etc.).

If the investigation 140 reveals that the server referenced by the URL is involved in a fraudulent attempt to collect personal information, the technician may initiate an interdiction response 155 (also referred to herein as a "technical response"). (Alternatively, the event manager 135 could be configured to initiate a response automatically without intervention by the technician). Depending on the circumstances and the embodiment, a variety of responses could be appropriate. For instance, those skilled in the art will recognize that in some cases, a server can be compromised (i.e., "hacked"), in which case the server is executing applications and/or providing services not under the control of the operator of the server. (As used in this context, the term "operator" means an entity that owns, maintains and/or otherwise is responsible for the server.) If the investigation 140 reveals that the server appears to be compromised, such that the operator of the server is merely an unwitting victim and not a participant in the fraudulent scheme, the appropriate response could simply comprise informing the operator of the server that the server has been compromised, and perhaps explaining how to repair any vulnerabilities that allowed the compromise.

In other cases, other responses may be more appropriate. Such responses can be classified generally as either administrative 160 or technical 165 in nature, as described more fully below. In some cases, the system 100 may include a dilution engine (not shown), which can be used to undertake technical responses, as described more fully below. In some embodiments, the dilution engine may be a software application running on a computer and configured, inter alia, to create and/or format responses to a phishing scam, in accordance with methods of the invention. The dilution engine may reside on the same computer as (and/or be incorporated in) a correlation engine 125, event manager 135, etc. and/or may reside on a separate computer, which may be in communication with any of these components.

As described above, in some embodiments, the system 100 may incorporate a feedback process, to facilitate a determination of which planting locations/techniques are relatively more effective at generating spam. Merely by way of example, the system 100 can include an address planter 170, which may provide a mechanism for tracking information about planted addresses, as described above. Correspondingly, the event manager 135 may be configured to analyze an email message (and particular, a message resulting in an event) to determine if the message resulted from a planting operation. For instance, the addressees of the message may be evaluated to determine which, if any, correspond to one or more address(es) planted by the system 100. If it is determined that the message does correspond to one or more planted addresses, a database of planted addresses may be consulted to determine the circumstances of the planting, and the system 100 might display this information for a technician. In this way, a technician could choose to plant additional addresses in fruitful locations. Alternatively, the system 100 could be configured to provide automatic feedback to the address planter 170, which in turn could be configured to automatically plant additional addresses in such locations.

In accordance with various embodiments of the invention, therefore, a set of data about a possible online fraud (which may be an email message, domain registration, URL, and/or any other relevant data about an online fraud) may be received and analyzed to determine the existence of a fraudulent activity, an example of which may be a phishing scheme. As used herein, the term "phishing" means a fraudulent scheme to induce a user to take an action that the user would not otherwise take, such as provide his or her personal information, buy illegitimate products, etc., often by sending unsolicited email message (or some other communication, such as a telephone call, web page, SMS message, etc.) requesting that the user access an server, such as a web server, which may appear to be legitimate. If so, any relevant email message, URL, web site, etc. may be investigated, and/or responsive action may be taken. Additional features and other embodiments are discussed in further detail below.

2. Exemplary Embodiments

As noted above, certain embodiments of the invention provide systems for dealing with online fraud. The system 200 of FIG. 2 can be considered exemplary of one set of embodiments. The system 200 generally runs in a networked environment, which can include a network 205. In many cases, the network 205 will be the Internet, although in some embodiments, the network 205 may be some other public and/or private network. In general, any network capable of supporting data communications between computers will suffice. The system 200 includes a master computer 210, which can be used to perform any of the procedures or methods discussed herein. In particular, the master computer 210 can be configured (e.g., via a software application) to crawl/monitor various data sources, seed bait email addresses, gather and/or analyze email messages transmitted to the bait email addresses, create and/or track events, investigate URLs and/or servers, prepare reports about events, notify customers about events, and/or communicate with a monitoring center 215 (and, more particularly, with a monitoring computer 220 within the monitoring center) e.g. via a telecommunication link. The master computer 210 may be a plurality of computers, and each of the plurality of computers may be configured to perform specific processes in accordance with various embodiments. Merely by way of example, one computer may be configured to perform the functions described above with respect to a honey pot, another computer may be configured to execute software associated with a correlation engine, e.g. performing the analysis of email messages/data files; a third computer may be configured to serve as an event manager, e.g., investigating and/or responding to incidents of suspected fraud, and/or a fourth computer may be configured to act as a dilution engine, e.g., to generate and/or transmit a technical response, which may comprise, merely by way of example, one or more HTTP requests, as described in further detail below. Likewise, the monitoring computer 220 may be configured to perform any appropriate functions.

The monitoring center 215, the monitoring computer 220, and/or the master computer 210 may be in communication with one or more customers 225 e.g., via a telecommunication link, which can comprise connection via any medium capable of providing voice and/or data communication, such as a telephone line, wireless connection, wide area network, local area network, virtual private network, and/or the like. Such communications may be data communications and/or voice communications (e.g., a technician at the monitoring center can conduct telephone communications with a person at the customer). Communications with the customer(s) 225 can include transmission of an event report, notification of an event, and/or consultation with respect to responses to fraudulent activities.

The master computer 210 can include (and/or be in communication with) a plurality of data sources, including without limitation the data sources 105 described above. Other data sources may be used as well. For example, the master computer can comprise an evidence database 230 and/or a database of "safe data," 235, which can be used to generate and/or store bait email addresses and/or personal information for one or more fictitious (or real) identities, for use as discussed in detail below. (As used herein, the term "database" should be interpreted broadly to include any means of storing data, including traditional database management software, operating system file systems, and/or the like.) The master computer 210 can also be in communication with one or more sources of information about the Internet and/or any servers to be investigated. Such sources of information can include a domain WHOIS database 240, zone data file 245, etc. Those skilled in the art will appreciate that WHOIS databases often are maintained by central registration authorities (e.g., the American Registry for Internet Numbers ("ARIN"), Network Solutions, Inc., etc), and the master computer 210 can be configured to query those authorities; alternatively, the master computer 210 could be configured to obtain such information from other sources, such as privately-maintained databases, etc. The master computer 210 (and/or any other appropriate system component) may use these resources, and others, such as publicly-available domain name server (DNS) data, routing data and/or the like, to investigate a server 250 suspected of conducting fraudulent activities. As noted above, the server 250 can be any computer capable of processing online transactions, serving web pages and/or otherwise collecting personal information.

The system can also include one or more response computers 255, which can be used to provide a technical response to fraudulent activities, as described in more detail below. In particular embodiments, one or more the response computers 255 may comprise and/or be in communication with a dilution engine, which can be used to create and/or format a response to a phishing scam. (It should be noted that the functions of the response computers 255 can also be performed by the master computer 210, monitoring computer 220, etc.) In particular embodiments, a plurality of computers (e.g., 255a-c) can be used to provide a distributed response. The response computers 255, as well as the master computer 210 and/or the monitoring computer 220, can be special-purpose computers with hardware, firmware and/or software instructions for performing the necessary tasks. Alternatively, these computers 210, 220, 255 may be general purpose computers having an operating system including, for example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. In particular embodiments, the computers 210, 220, 255 can run any of a variety of free operating systems such as GNU/Linux, FreeBSD, etc.

The computers 210, 220, 255 can also run a variety of server applications, including HTTP servers, FTP servers, CGI servers, database servers, Java servers, and the like. These computers can be one or more general purpose computers capable of executing programs or scripts in response to requests from and/or interaction with other computers, including without limitation web applications. Such applications can be implemented as one or more scripts or programs written in any programming language, including merely by way of example, C, C++, Java™, COBOL, or any scripting language, such as Perl, Python, or TCL, or any combination thereof. The computers 210, 220, 255 can also include database server software, including without limitation packages commercially available from Oracle™, Microsoft™, Sybase™, IBM™ and the like, which can process requests from database clients running locally and/or on other computers. Merely by way of example, the master computer 210 can be an Intel™ processor-machine operating the GNU/Linux operating system and the PostgreSQL database engine, configured to run proprietary application software for performing tasks in accordance with embodiments of the invention.

In some embodiments, one or more computers 210 can create web pages dynamically as necessary for displaying investigation reports, etc. These web pages can serve as an interface between one computer (e.g., the master computer 210) and another (e.g., the monitoring computer 220). Alternatively, a computer (e.g., the master computer 210) may run a server application, while another (e.g., the monitoring computer 220) device can run a dedicated client application. The server application, therefore, can serve as an interface for the user device running the client application. Alternatively, certain of the computers may be configured as "thin clients" or terminals in communication with other computers.

The system 200 can include one or more data stores, which can comprise one or more hard drives, etc. and which can be used to store, for example, databases (e.g., 230, 235) The location of the data stores is discretionary: Merely by way of example, they can reside on a storage medium local to (and/or resident in) one or more of the computers. Alternatively, they can be remote from any or all of these devices, so long as they are in communication (e.g., via the network 205) with one or more of these. In some embodiments, the data stores can reside in a storage-area network ("SAN") familiar to those skilled in the art. (Likewise, any necessary files for performing the functions attributed to the computers 210, 220, 255 can be stored a computer-readable storage medium local to and/or remote from the respective computer, as appropriate.)

Figure 3:
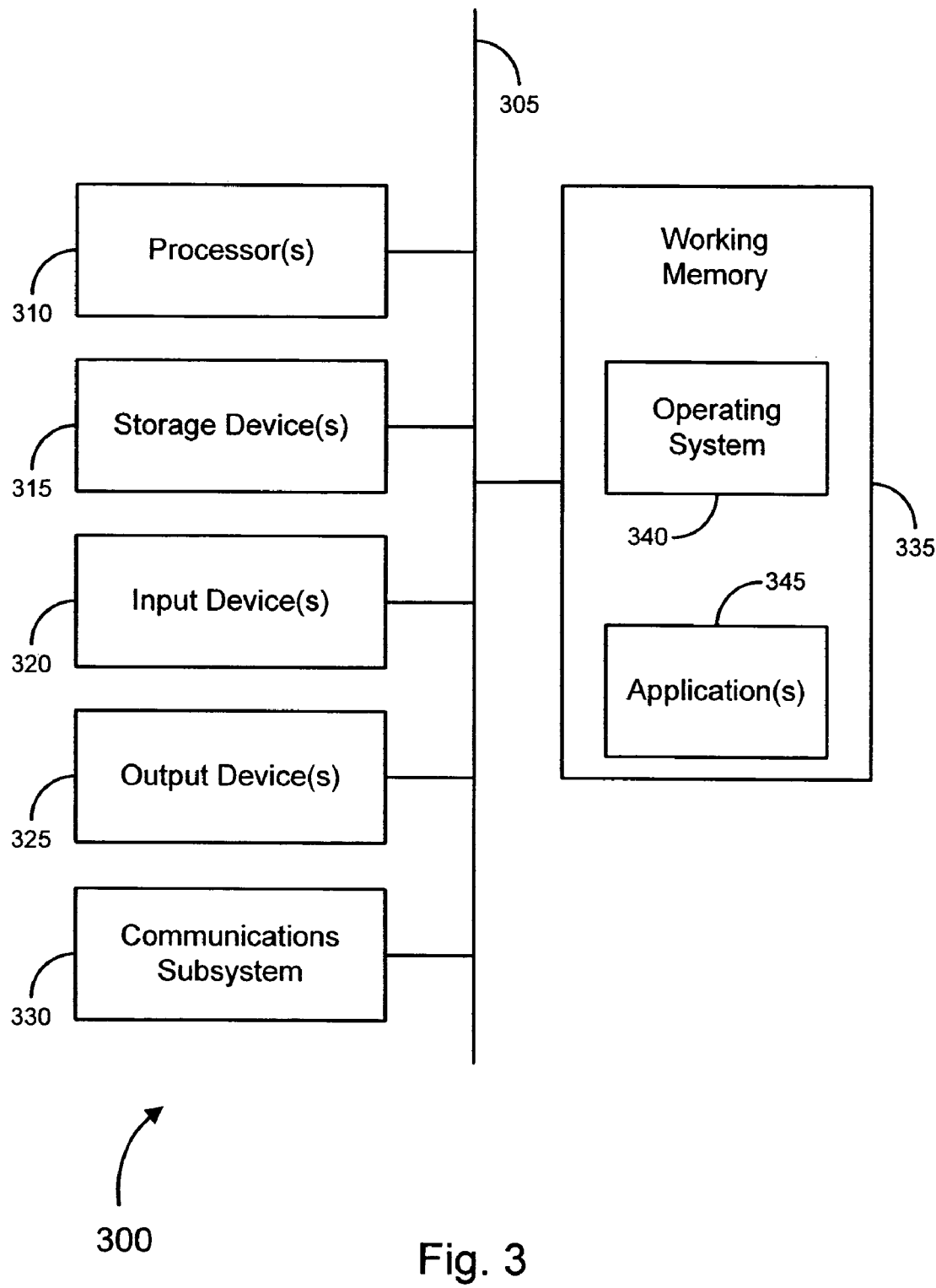
FIG. 3 is a generalized schematic diagram of a computer that may be implemented in a system for combating online fraud, in accordance with various embodiments of the invention.

FIG. 3 provides a generalized schematic illustration of one embodiment of a computer system 300 that can perform the methods of the invention and/or the functions of a master computer, monitoring computer and/or response computer, as described herein. FIG. 3 is meant only to provide a generalized illustration of various components, any of which may be utilized as appropriate. The computer system 300 can include hardware components that can be coupled electrically via a bus 305, including one or more processors 310; one or more storage devices 315, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 305 can be one or more input devices 320, which can include without limitation a mouse, a keyboard and/or the like; one or more output devices 325, which can include without limitation a display device, a printer and/or the like; and a communications subsystem 330; which can include without limitation a modem, a network card (wireless or wired), an infrared communication device, and/or the like).

The computer system 300 also can comprise software elements, shown as being currently located within a working memory 335, including an operating system 340 and/or other code 345, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

Another set of embodiments provides methods of combating online fraud which can be, in some cases, implemented by a computer or embodied in a computer software program. These methods may be, but need not be, implemented as a computer software application and/or with a computer system, including the systems described above. FIGS. 4-8 collectively illustrate several such methods, which may be implemented separately and/or in conjunction with one another (as well as other methods). Some or all of the procedures described as part of these methods may be (but need not be) performed by the various components of system similar to that described with respect to FIG. 1A, perhaps with interaction from one or more human technicians.

Figure 4A:
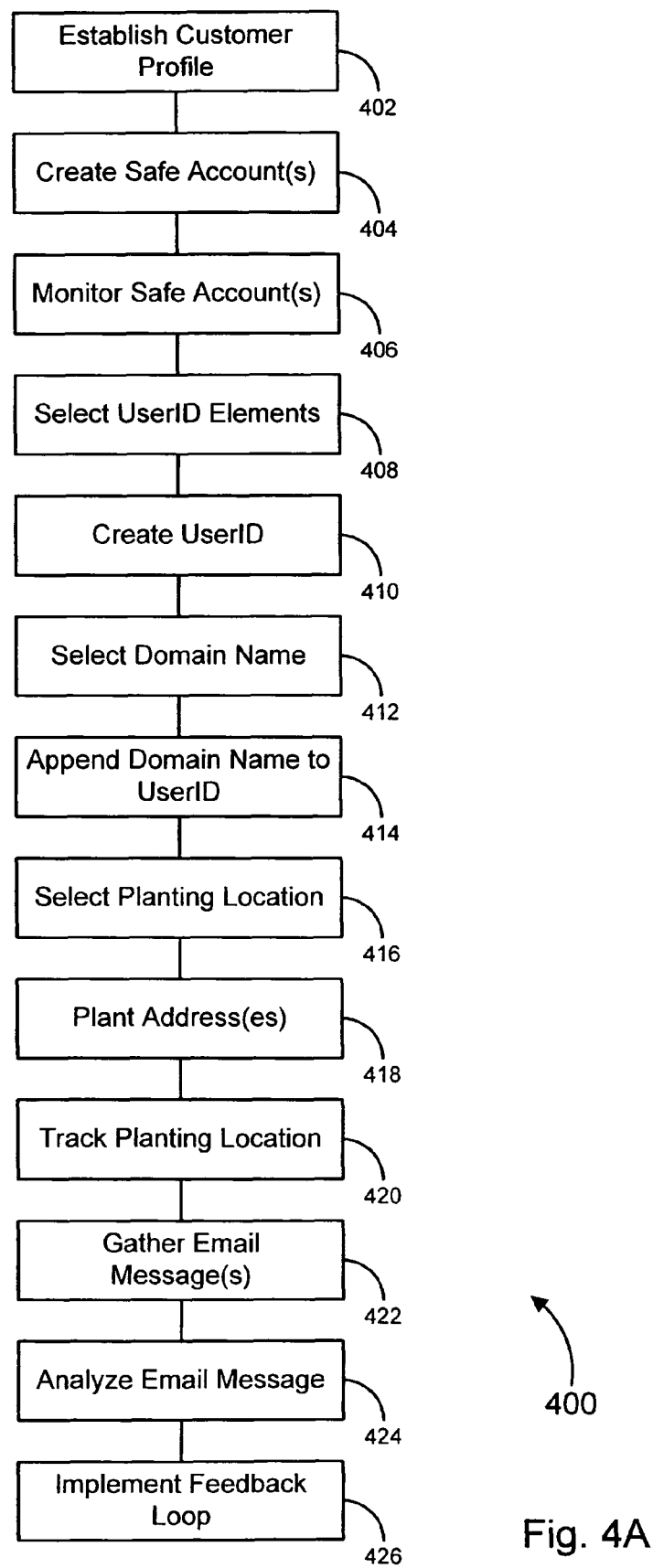
FIGS. 4A, 4B and 4C are process flow diagrams illustrating various methods for obtaining information about possible fraudulent activities, in accordance with various embodiments of the invention.
Figure 4B:
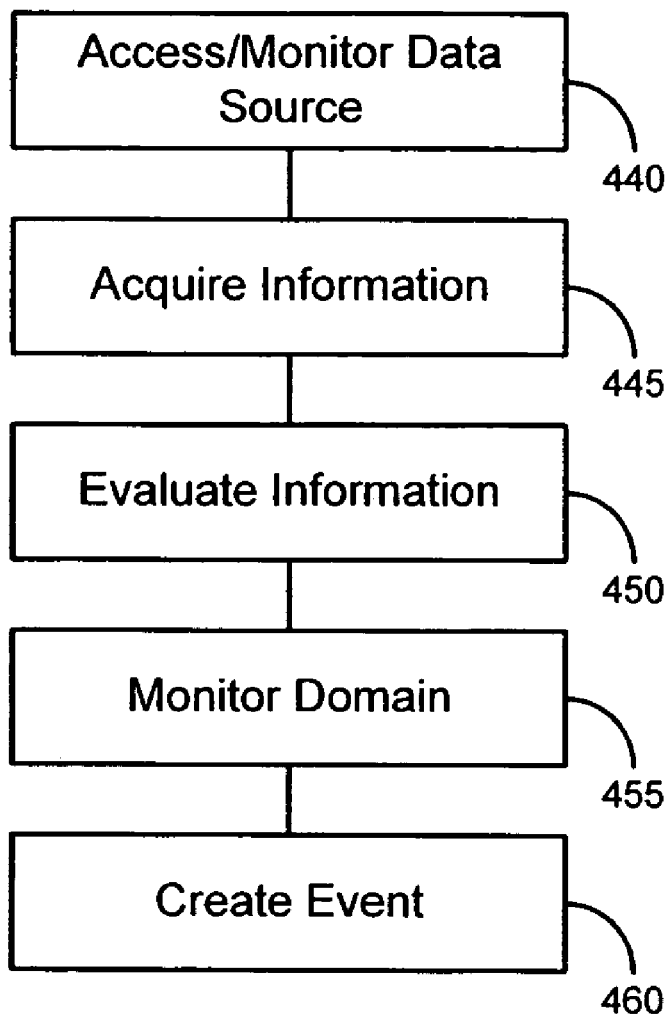
Figure 4C:
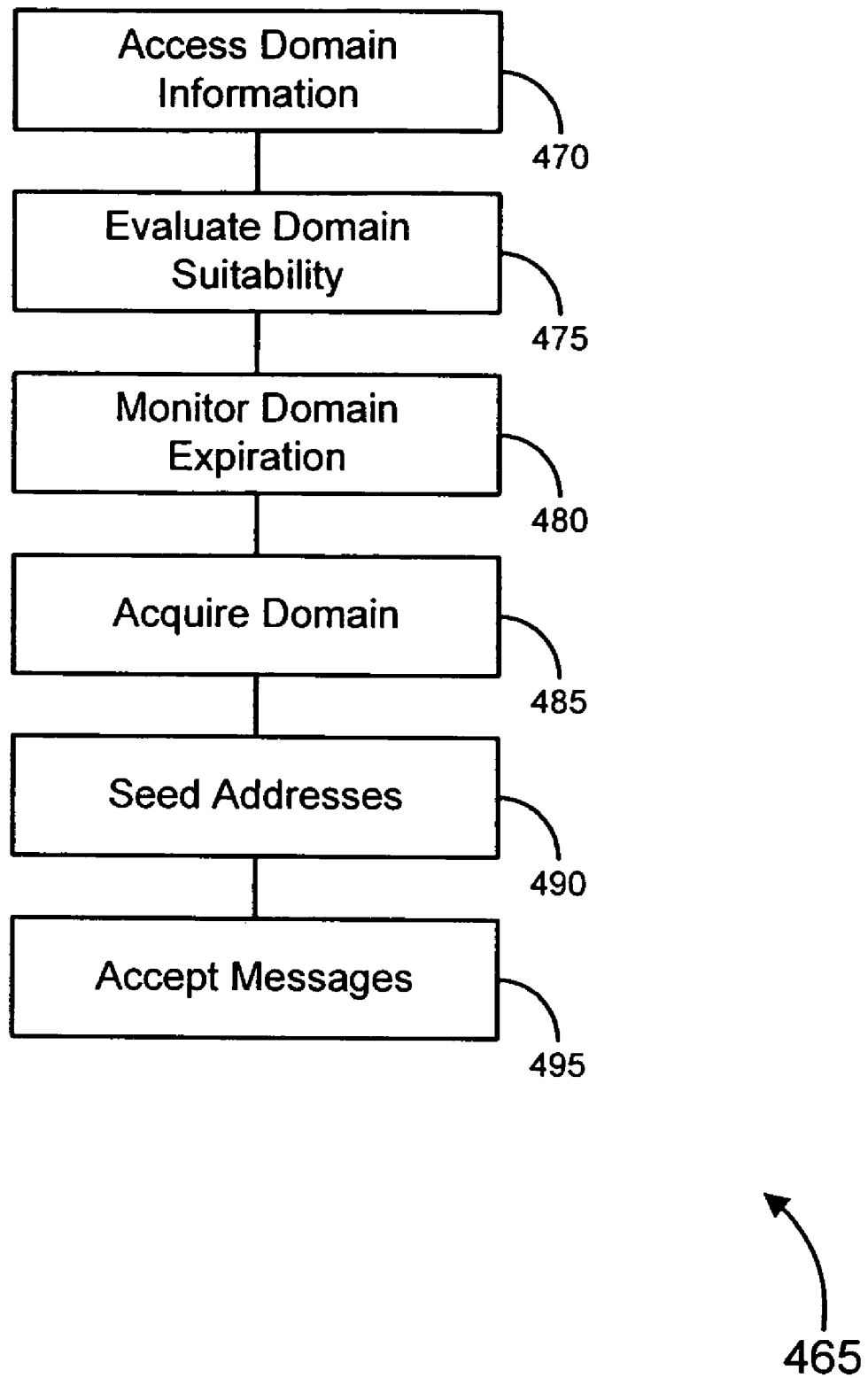

FIGS. 4A, 4B and 4C illustrate methods of collecting information about possible incidents of online fraud. For instance, FIG. 4A illustrates a method 400 for inducing, receiving and/or categorizing incoming email message in accordance with certain embodiments of the invention. In some cases, a honey pot and/or a correlation engine may be used to perform the method 400. In particular embodiments, an address generator, such as the address generator 170 described with respect to FIG. 1B may be used to perform certain operations, such planting bait email addresses, implementing a feedback loop, etc. The exemplary method 400 can include establishing a customer profile (block 402) for one or more customers. The customer profile can identify a blacklist of particular keywords that may indicate an incoming email message is attempting to spoof the customer. For instance, for a customer in the financial services industry, key words could be "loan," "account," "credit card," and/or the like. The customer profile can also identify servers, URLs, domains and/or IP addresses known to be involved with phishing activities involving that customer, as well as default configuration information, such as the customer's threshold for considering an email message as a phish (e.g., relatively lenient or relatively strict), and/or the customer's preferences for responding to fraudulent activity (e.g., a preference for administrative response, a preferred level of technical response, etc.).

At block 404, one or more "safe accounts" may be created, e.g., in the customer's system. These safe accounts can be valid accounts (e.g., active credit card accounts) that do not correspond to any real account holder, and the safe accounts may be associated with fictitious personal information, including a valid (or apparently valid) identifier, such as an account number, social security number, credit card number, etc., that does not correspond to any real account holder but may be accepted as valid by the customer's system. The safe accounts thereafter can be monitored (block 406) for any transactions or access attempts. Because the safe accounts do not correspond to a real account holder, any transactions, access attempt, etc. ("account activity") represent an illegitimate use. In addition, the safe account can be used to trace and/or track the use of the identifier, as described in more detail below, and/or to compile an evidentiary record of fraudulent activity.

The method 400 can also include generating and/or planting bait email addresses, which can be used to attract spam and/or phish messages. In some cases, the bait addresses may be selected to be attractive to phishers (e.g., from attractive domains and/or using English proper names as the userids) and/or to be prioritized on harvested lists (e.g., having userids that begin with numbers, the letter a, or non-alphabetic characters, etc.). In this way, if a phisher sends a phish message to each of the addresses on a harvested list, there may be a higher probability that the bait addresses will receive the phish message relatively early in the mailing process, allowing the system to take responsive action before many actual recipients have had a chance to provide personal information in response to the phish.

Thus, in some embodiments, generating an email address can comprise selecting one or more userid elements (block 408) such as those described above, which can be used to generate an email address. The selection of userid elements can be performed by an address planter (as described above), by any other appropriate tool, and/or manually. If desired, two or more userid elements may be concatenated or otherwise combined to form a userid (block 410). In particular embodiments, the userid may simply comprise a single userid element.

The method 400 can further comprise selecting a hostname and/or domain name for the bait address (block 412). As described herein, the selection of a domain may consider several factors. Merely by way of example, certain domains may be prioritized as relatively more likely to provoke spam and/or phish messages (e.g., because of the nature of the domain name, because email addresses using that domain have provoked relatively more phish messages in the past, etc.). In many cases, the domain may be a domain that is owned and/or managed by the entity responsible for planting the addresses (or a domain to which such an entity has access). In particular cases, popular consumer ISP domains (such as "aol.com," "msn.com," etc. may be used. The owners of such domains may be in cooperation with the entity responsible for planting addresses. Alternatively, the address planter (or another tool) may be used to create an account at the appropriate ISP and/or to configure the account to auto-forward received messages to a honey pot, etc.

The domain name then may be appended to the userid to create an email address (block 414). (At this point, any necessary steps to enable the email address, such as creating a userid on the appropriate host, opening an account with an ISP, etc. may be taken, either automatically or by a technician. It can be appreciated, however, that in many cases no steps need be taken for a particular userid, since the mail exchange for the selected domain may be configured to accept incoming mail to any userid, as described herein).

One or more planting locations for the generated email address may be selected (block 416). Planting locations can include web sites, newsgroups and/or other locations described herein that may be likely to result in the planted address being harvested and/or receiving spam and/or phish emails. In some cases, it may be desirable to plant each email address in only one location (e.g., to facilitate the tracking and feedback processes, described below and with respect to FIG. 1B). In other cases, e.g., when it is desirable to maximize the impact of each generated address, a particular address may be planted in multiple locations. In particular embodiments, the selection of planting locations may be designed to facilitate triangulation procedures in assessing which planting location produced a phish/spam message, as described below in detail.

At block 418, then, bait email addresses can be planted in appropriate locations, as described above. (Bait email addresses may be generated addresses, addresses associated with purchased domains, pre-existing addresses, etc.) In some cases, the planting locations may be the locations selected at block 416. The task of planting (also referred to herein as "seeding") the bait addresses can be automated (e.g. performed by a computer system such as a honey pot, address generator etc.) and/or performed manually. Merely by way of example, an address generator similar to the address generator 170 described with respect to FIG. 1B can be used to plant bait email addresses, using, in certain embodiments, a process similar to that described in detail with respect to FIG. 1B. As noted above, in particular embodiments, it may be desirable to plant each address in only one location (e.g., to assist in tracking and/or implementing a feedback loop). In other cases, to maximize the effect of each generated address, it may be desirable to plant each address in multiple locations.

In other embodiments, a variety of automated and/or manual processes could be used to plant (seed) bait addresses (which themselves may have been generated by an address generator, manually and/or through other automated processes); merely by way of example, an automated process could post newsgroup items that include bait email addresses, create a domain registration with a bait email address as the administrative contact, compile and/or distribute lists of bait addresses formatted to appear as a list of harvested addresses, etc. In some situations, planting an email address can comprise providing additional information. Merely by way of example, if planting an address comprises creating a WHOIS record with the address as an administrative contact, the planting operation can comprise providing other relevant information for inclusion in the WHOIS record, such as a telephone number, contact name, address, etc. In other examples, for instance when subscribing to a newsletter, a first and/or last name may be provided with the bait address. This information may be supplied manually and/or may be generated in automated fashion (e.g., by an address planter), perhaps in a manner similar to the generation of userids. In some cases, as described below, such additional information may be used to refine the process of determining which planting location resulted in a spam/phish email. Consequently, it may be useful to provide different information in each planting location (even if the bait address is the same).

The planting locations may be tracked (block 420), e.g. through the use of a tracking database, as described above. Additionally, any information provided along with the planted address may also be tracked. The tracking of planting locations can facilitate a feedback process, as described below.

After the bait email addresses have been planted, any incoming email messages to the bait addresses can be gathered (block 422), using any acceptable procedure, including the procedures discussed above. In accordance with some embodiments, for example, gathering an incoming email message can comprise downloading the incoming email message from a honey pot/mail server and/or converting the email message into a data file, which can have separate portions and/or fields corresponding to the header information of the email message, the body portion of the email message, any URLs included in the email message, and/or any attachments to the email message. Gathering the email message can further comprise transmitting the email message to a correlation engine for analysis, and/or the correlation downloading the email message. Any gathered incoming email messages (and/or corresponding data files) can be analyzed to determine whether the message should be categorized as a likely phish (i.e., a fraudulent email message) (block 424). One exemplary process for analyzing email messages is described below by reference to FIG. 5.

In accordance with particular embodiments, the planting process may implement a feedback loop (block 426), including, for instance, as described above. Merely by way of example, when an incoming email message is analyzed, the addressee of the incoming email message may be examined to determine if it correlates to any generated and/or planted address. If so, a lookup may be performed to determine where the address was planted (e.g., by searching a tracking database), and feedback may be provided to an address generator (and/or any other tool or entity responsible for planting addresses) to indicate that the planting location for that address is a likely source for spam and/or phish email messages. If desired, then, such location may be prioritized as a location for additional planting operations.

In some embodiments (e.g., where a generated address is planted in multiple locations), the feedback process may be more sophisticated. For example, if a particular address was planted in multiple locations, merely ascertaining the addressee of the incoming phish/spam message may be insufficient to determine which of the planting locations resulted in the message. In such cases, any of several procedures may be used to provide more information about which planting location generated the message. Merely by way of example, a triangulation procedure may be used. Consider the situation in which address A was planted in locations X and Y, while address B was planted in locations Y and Z, and address C was planted in locations X and Z. If phish messages are received by addresses A and C, it is likely that location X was the plant location that produced the phish messages. Similarly, if phish messages are received by addresses A and B, it is likely that location Y was the plant location that produced the phish messages, and so on. (It should be noted that the selection of plant locations for particular generated addresses may be configured to enhance the ability to perform such triangulation).

Another exemplary procedure can include parsing the incoming message for information identifying which of the planting locations produced the phish message. In a simple case, the domain from which the message originated may correlate with a domain at which the address was planted. (In some cases, domain analysis, as described elsewhere herein, may be used to refine this analysis. Merely by way of example, the WHOIS records for the planting locations may be analyzed to find any information that matches corresponding WHOIS information for the domain from which the phish message originated.) In other cases, the phish message may correlated to information provided with a planted address (such as a given name, last name, etc.), and such information may be used to determine which planting location resulted in the message. Based on the disclosure herein, one skilled in the art can appreciate that a variety of procedures may be used to ascertain which of several planting locations resulted in a phish message.

FIG. 4B illustrates another method 435 that may be used to obtain information about potential fraudulent activities, including phishing/spoofing scams. The method 435 of FIG. 4B, which may, in some cases be implemented using a honey pot, correlation engine and/or event manager (as described above, for example), can be used to acquire information from any appropriate data source, including without limitation the data sources 105 described above. In accordance with some embodiments, the method 435 can include accessing a data source (block 440). Accessing a data source can comprise any of a variety of procedures, depending on the type of data source, the type of information desired, and/or other pertinent factors. Merely by way of example, in some embodiments, accessing a data source can comprise using a process (which may be unattended and/or automated) to crawl the data source. Thus, for example, if the data source is a web site, one or more files on the web site may be crawled (i.e., accessed and/or downloaded), and such files optionally may be saved locally to the fraud-prevention system. In other cases, a web search engine (such as Google™, Lycos™, etc. may be used to search for information. If the data source is a limited-access data source, accessing the data source might comprise one or more authentication procedures (e.g., providing a username and/or password), which may be performed manually, interactively and/or in automated fashion. As another example, for instance, if the data source is an online chat room, accessing the data source can include logging onto the chat room. In further cases, accessing a data source can include downloading the entire data source, e.g., on a periodic or as-needed basis, and/or accessing (reading, parsing, searching, etc.) the downloaded data source. Merely by way of example, a domain registration zone file may be downloaded locally on a periodic basis, so that searches against the zone file can performed more quickly and/or in an offline fashion.

In particular embodiments, accessing a data source can include monitoring that data source. Monitoring a data source can include, in some cases, accessing the data source on a periodic basis. In accordance with some embodiments, monitoring a data source can comprise evaluating the data source for changes (e.g., additional and/or updated information) occurring since a previous access of the data source. Merely by way of example, a domain registration zone file may be monitored to find modifications to domain registrations (as described in more detail below). In other embodiments, monitoring a data source can comprise tracking changes to the data source occurring while the data source is being accessed. As one example, if the data source is an online chat room, monitoring the data source can comprise viewing, downloading, copying, etc. an online "conversation" taking place in the chat room. Somewhat analogously, if the data source is a newsgroup, the newsgroup may be monitored for new posts, replies, etc.

The method 435 can also include acquiring information from an accessed/monitored data source (block 445). Like accessing/monitoring a data source, acquiring information can take a variety of forms. For instance, if the data source is a file or set of files (such as a web site, domain registration file, newsgroup), acquiring information can comprise searching the file(s), e.g., for keywords, etc. Merely by way of example, information may be acquired by searching for URLs and/or relevant terms, such as "phish," "spoof," "scam," etc., as well as variants of such words. Names of particular customers might also be search terms, as the presence of one of those names could indicate a possible fraudulent activity involving the customer. Files including such words may be downloaded and/or categorized for further analysis. In other cases, acquiring information can comprise copying and/or logging transcripts of online chat sessions that include relevant information, including information comprising URLs and/or relevant terms.

In particular embodiments, including for instance, if a data source is being monitored, acquiring information can comprise downloading and/or otherwise making a record of any modifications to the data source. This can be done generically (i.e., with respect to all modifications of the data source and/or the information contained therein) and/or selectively (i.e., only with respect to relevant information). Merely by way of example, if a domain registration zone file is being monitored, all changes to registration records might be noted and/or downloaded. Alternatively, only changes that meet certain criteria (e.g., new domains that are suspiciously similar to a client's domain name and/or trademark, or new domains that appear to cater to spammers, phishers and/or spoofers) might be noted and/or downloaded. In particular cases, if a useful domain name expires (e.g., is marked "expired" and/or disappears from a domain name registration zone file), that information may be noted, as described in further detail with respect to FIG. 4C.

In general, acquiring information can comprise any action by which information may be obtained from a data source. Moreover, based on the disclosure herein, those skilled in the art will appreciate that the procedures of acquiring accessing a data source and acquiring information may be consolidated into a single procedure. In some cases, the process of acquiring information may also include notifying an administrator (and/or an automated process) that new information has been acquired and needs to be evaluated. This notification can include, without limitation, an email message, an inter-process software message, an application call, etc. In particular cases, acquired information may be placed in a particular location (e.g., a database or other data structure, a particular directory in a file system, etc.), and/or a process may monitor that location for new information to be evaluated. Hence, the notification might simply comprise placing the information in the correct location.

Once information has been acquired, that information may be evaluated (block 450). Evaluation of the information may be performed by an automated process and/or by a human technician. In some cases, evaluation may be performed during the process of acquiring the information. In a general sense, evaluating the information comprises making a determination of whether the information is likely to require further action, and/or determining what type of action may be required. Hence, the procedures for evaluating the information are likely to vary, depending at least in part on the type of information acquired, customer preferences (as noted in a customer policy, for example)

Merely by way of example, if the information relates to a suspected phishing scam, evaluation of the information may comprise parsing the information for a URL. If a URL is found, that may indicate that further investigation of the URL should be performed. Likewise, if information indicates a possible spam source and/or harvesting operation, it may be appropriate to further investigate the possibility of planting bait email addresses for harvesting. In other embodiments, the acquired information may indicate domain activity, such as a new registration, expired registration, etc., and evaluation of the information may include evaluating whether the domain activity warrants further action.

Merely by way of example, in particular cases, if the acquired information indicates that a suspicious domain has been registered, it may be appropriate to monitor the domain (block 455). (Monitoring the domain can be considered, in some cases, to be part of the evaluation process.) In accordance with certain embodiments, monitoring the domain can comprise checking the domain for activity, perhaps periodically (e.g., every fifteen minutes, every hour, every day, etc.). Checking the domain for activity can comprise attempting to access a website at the domain (e.g., by sending an HTTP GET request either to the domain itself and/or to common hostnames—www, web, etc.—at the domain), interrogating the domain for servers, monitoring domain registration records and/or DNS records, etc. If a domain becomes "live" (i.e., a server begins operating in that domain), that might indicate a need for further investigation of a possible fraudulent activity.

Figure 6:
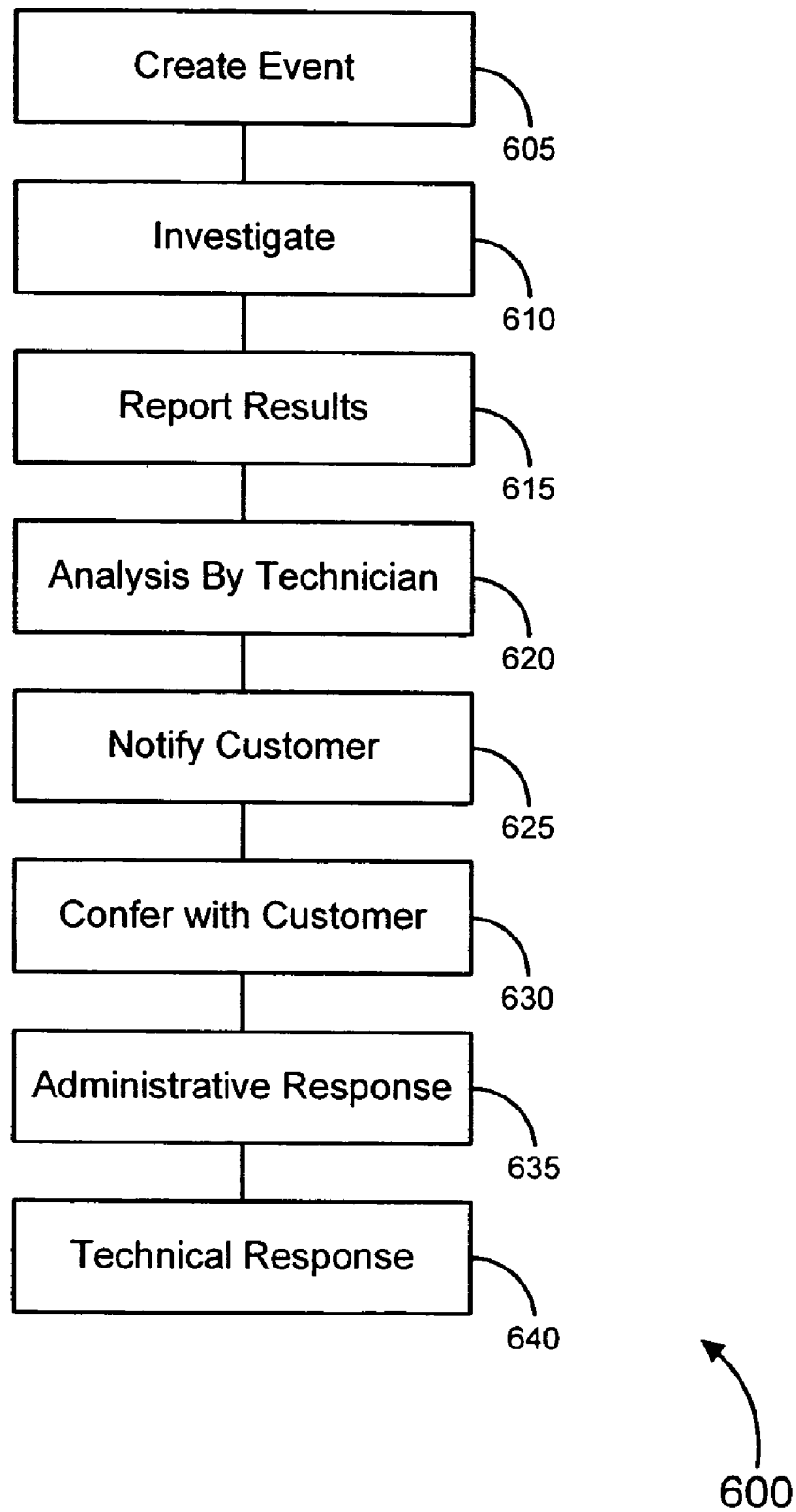
FIG. 6 is a process flow diagram illustrating a method of combating online fraud, in accordance with various embodiments of the invention.

If evaluation of the information (and/or monitoring of a domain) does indicate that further investigation is necessary, such an investigation may be conducted. In accordance with some embodiments, an investigation may be initiated by creating an event (block 460), e.g., in an event manager, and/or otherwise making a record of the need for further investigation. FIG. 6 (described below) illustrates some exemplary methods of investigating possible fraudulent activity, and block 605 (also described below) illustrates one possible procedure for creating an event. In some embodiments, events may be prioritized for investigation and/or response. Some events may be judged to be relatively less critical than other events, and the determination of which events are considered relatively more critical is discretionary. Merely by way of example, some types of online fraud (e.g., the selling of fake watches) may be judged to be less harmful than other types (e.g., attempts to collect personal information). In some cases, global parameters may define, for all customers, the relative urgency of different types of events. In other cases, a particular customer's profile can be configured to indicate, for that customer, which events should be treated as relatively more urgent. There may be several levels of urgency, and/or the levels can be identified using colors (e.g., yellow, orange, red), numbers (e.g., 1-5), and/or any other appropriate scheme to help the system, technicians and/or any other interested parties in identifying the relative urgency of a particular event.

As an example of how the method 400 can be used to monitor a domain in accordance with particular embodiments of the invention, consider the following scenario. If a company "Acme Products" wishes to avoid phishing schemes associated with its brand name, the company (and/or a third party security service provider, for example), may choose to monitor a zone file as a data source. Through the monitoring of the data source, it is discovered that the domain <acmeproduct.com> has been registered. In accordance with methods of the invention, a monitoring system can monitor that domain, for instance by periodically making HTTP GET requests to the domain (and/or to a host on that domain, such as www.acmeproduct.com). Once the domain has become available (i.e., the HTTP GET request returns something other than a failure), the system can be configured to crawl the web site, taking a "snapshot" of one or more (perhaps all) available pages on the web site. The snapshot can comprise a copy of the page(s) themselves and/or merely one or more checksums and/or hash values computed from, e.g., the contents of the page(s). This procedure can be continued periodically (such as, for example, once per minute, hour, day, etc.), and/or such periodic snapshots can be compared one against the other (for example, by quickly comparing hash values for returned pages, etc.). One skilled in the art will appreciate that, in its initial stages, a domain usually will have a "park" page indicating that the web site is "under construction," etc. Hence, when the web site goes "live" (i.e., has some content other than a park page), the comparison of periodic snapshots will reveal this change. At the point the web site goes live, an investigation and/or analysis of the web site may be performed. In particular embodiments, for example, an event may be opened in an event manager and/or the investigation/analysis procedures described elsewhere herein may be performed. Thus, by monitoring the domain, a possible phishing operation may be uncovered before and phish messages have been sent (and, consequently, before any customers have been scammed by the phishing operation).

Other embodiments of the invention provide methods that can be used to encourage additional incoming spam messages. FIG. 4C illustrates one such method 465. Messages prompted by such methods may, in some embodiments, be processed in similar fashion to that described with respect to FIG. 4A and/or analyzed as described in further detail below. In general, the method 465 involves the acquisition of expired domains and the collection of email messages addressed to those domains. As those skilled in the art will appreciate, once a domain expires, email addressed to recipients at that domain generally will no longer be routed to the recipients. Such recipients, therefore, generally will acquire new email addresses and notify their correspondents of those new addresses, who thereafter will use the new address, not the address at the expired domain. Thus, in many cases, any email messages still being sent to the expired domain will have a higher-than-average probability of being spam messages.

The method 465 can comprise accessing domain information (block 470). In many cases, accessing domain information can comprise accessing a relevant data source (e.g., a domain registration zone file) and/or acquiring information from that data source. The procedures described above may be used to access domain information in this fashion. In other cases, a variety of resources may be used to access domain information, including, merely by way of example, subscription to newsletters identifying expired domains (and/or domains about to expire), domain-squatting websites (which often advertise expired domains for sale), and/or the like.

The method 465 can further comprise evaluating the suitability of the domain for attracting spam messages (block 475). Merely by way of example, spammers sometimes send messages by demographics, and any attempt to attract such spam can attempt to simulate such demographics. For instance, a particular domain (e.g., <musclecars.com>) might indicate that users receiving email at that domain are likely to be car enthusiasts, and/or another domain (e.g., <finearts.com>) might indicate that users receiving email at that domain are likely to be enthusiasts of the arts. Other domains might indicate other likely demographics, such as female users, male users, young users, etc.

Other factors might be considered in evaluating the suitability of a domain. Merely by way of example, a domain that has been registered for a relatively long period of time would be relatively more likely to receive a greater quantity of spam than a domain with a relatively short history. Thus, evaluating the suitability of a domain might include an analysis of the length of time the domain has been registered and/or in existence. Such an analysis could include an examination of the relevant domain registration record, a review of various archive sites (including, merely by way of example, <archive.org>) that store archived web sites, etc. Further, if the domain registration already has expired, the length of time since the domain was last in use may be considered as a factor: a recently-expired domain is relatively more likely to receive spam than a long-expired domain.

If the domain registration has not already expired, the method 465 may comprise monitoring domain registration records (and/or other data sources for expiration (block 480).

Merely by way of example, those skilled in the art will understand that a typical domain registration record (e.g., a record in a zone file), often will provide an indication of an expiration date for the domain. If a suitable domain is found, the expiration date may be noted, and/or data sources (e.g., zone files) may be monitored around the scheduled expiration date to determine whether the domain registration is renewed or expired. Similarly, zone file updates may be monitored for expired domains (as discussed above), and such domains may be evaluated for suitability. Thus, in accordance with various embodiments, the procedures for evaluating the suitability of the domain and monitoring the expiration of a domain may occur in any suitable order. In certain embodiments, monitoring the expiration of a domain may include monitoring any activity at the domain, for instance using the techniques described above.

If a suitable expired (or otherwise available) domain is found, that domain may be acquired (block 485). In some cases, acquiring a domain can comprise registering the domain with an appropriate registrar, a procedure familiar to those skilled in the art. This procedure may be automated and/or performed manually by a technician. In other cases, acquiring a domain can comprise purchasing the domain from a third party. In such cases, re-registration of the domain may be required. Optionally, bait email addresses related to the domain may be seeded and/or planted (block 490), e.g., for harvesting. One exemplary procedure for seeding/planting bait addresses is discussed above with respect to FIG. 4A. Other procedures may be used as well.

A mail server (which might be a honey pot) can be configured to receive mail addressed to recipients at the domain, and/or email messages sent to the domain can be accepted by the mail server (block 495). Accepted messages may then be processed as described with respect to other methods discussed herein and/or as desired. In accordance with particular embodiments, the system may be configured so that all incoming messages to the domain are accepted, whether or not they are addressed to a valid recipient. In fact, messages addressed to invalid recipient addresses may be more likely to be spam and/or phishing attempts. It can be anticipated, for example, that some quantity of messages will be addressed to former users of the domain, and as described above, it is relatively more likely that such messages will be mass-mailings.

Further embodiments of the invention can be used to analyze, investigate and/or respond to any received information and/or messages (including without limitation information/messages received as a result of the methods described above). FIG. 5, for example, illustrates in detail a method 500 of analyzing an incoming email message (or data file) in accordance with certain embodiments of the invention. (In the discussion of FIG. 5, the terms data file and message are used interchangeably, since the methods of analysis can apply equally to a message and a data file, which may, as discussed above, correspond to a received email message but which also may correspond to any other data set, which may be acquired from a variety of different data sources, such as a news group posting, web page, and/or the like. Similarly, the other methods discussed herein may be applied to data files corresponding to such data sets and/or sources.) It should be noted that some of the procedures illustrated on FIG. 5 may, in particular embodiments, take place at other points in the method 500 illustrated by FIG. 5 (including, for example, gathering incoming email messages (block 525)), and that the organization of the procedures in these methods (and indeed, all of the methods described herein) is merely for ease of description: Certain procedures may occur in an order different than that described herein; indeed, various procedures may be added and/or omitted in accordance with various embodiments of the invention.

The method 500 illustrated by FIG. 5 can include time stamping the message (and/or any other data to be analyzed) and/or assigning an identifier to the message/data (which may be sufficient to uniquely identify the message (block 505), which can aid in the identification (e.g., throughout the processes discussed herein) of the message, provide a permanent indication of when the message was received, and/or facilitate the comparison of different messages. The procedure for developing an identifier is discretionary. Merely by way of example, the identifier may include information about when the analysis of the message/data (e.g., a time stamp), an indicator of the source of the message, etc. Alternatively, the identifier (and/or a component thereof) may be assigned serially and/or randomly, and/or the identifier may identify the type of data to be analyzed (e.g., domain registration, email message, etc.).

The method 500 can also include, in some embodiments, creating a data file from the message (block 510), perhaps in the manner described above. (As noted above, unless the context clearly indicates otherwise, email messages, other data—such as, for example, domain registrations, received URLs, etc.—and data files created from such messages/data can be processed in similar fashion, and the description of the procedures herein generally can be applied equally, with appropriate modifications as necessary, to any of these items.) The data files may then be collected (block 515), for instance, by transmitting the data files to a correlation engine and/or by a correlation engine downloading the data files from the computer (e.g. honey pot) that gathered the data files. (In some cases, it may not be necessary to collect the data files; for instance, the correlation engine and the honey pot may be incorporated within a single software program or program module and/or be running on the same computer.)

A data file may then be parsed or read by the correlation engine (block 520). The parsing can divide the data file into various sections and/or fields, which can allow the fields and/or sections of the data file to be analyzed by the correlation engine. For example, with respect to an email message, the header information can be analyzed (block 525) to determine, for instance, whether the source and/or destination information in the header has been forged. If so, it is relatively more likely that the email is a phish. As another example, the routing information in the message header may be analyzed to determine whether the message originated from and/or was routed through a suspect domain, again enhancing the likelihood that the message is a phish.

Any text, including without limitation the body of an email message (i.e., the body field of a data file) can then be analyzed (block 530). The analysis of the body can include searching the body for blacklisted and/or whitelisted terms; merely by way of example, a blacklisted term might include terms commonly found in phish messages, such as "free trip"; terms indicating that the message refers to personal information, such as "credit card," "approval," "confirm," etc.; and/or brand names, the name of a customer, etc. Conversely, whitelisted terms are those that commonly indicate that the message is not a phish. It should be noted at this point that the system can be configured to provide a feedback loop, such that if a message is determined eventually to be a phish, the list of blacklisted terms can be automatically updated to include the text of that message (or portions of that text). Further, the correlation engine (and/or any other appropriate component) can include heuristic algorithms designed to defeat common phish tactics, such as obvious misspellings, garbage text, and the like. Likewise, the system may implement "stemming" logic, in order to identify common grammatical variations of root words (e.g., the words "going," "goes, "gone," etc. can be identified as variants of "go," and vice-versa).

Analyzing the body of the message can include other forms of analysis as well. Merely by way of example, if the body includes a URL or other form of redirection, the presence of those devices can also indicate a higher likelihood that the message is a phish (or conversely, that the message is not a phish). (In addition, the URLs and other redirection devices can be analyzed separately, as discussed below). Moreover, other factors, such as the length of the body of the email message, whether the body includes graphics, etc., can be considered in the analysis of body of the email message.

In addition, if the message does include a URL (or any other form of reference and/or redirection), the URL can be analyzed (block 535). (This analysis can also be applied to a URL received from another source, such as a list of URLs transmitted by an ISP, the URL of a suspicious web page, a URL associated with a suspicious domain registration, etc.) For example, network data (including without limitation DNS and/or WHOIS data, as well as network records, e.g., ARIN information), for the domain associated with the URL can be accessed. If this data indicates that the URL does not resolve to a domain (e.g., the URL resolves only to an IP address), the URL may be part of a phishing scam. Similarly, those skilled in the art can appreciate that phishing scams often are based from servers/domains outside the United States; as well, a particular domain may be known to be likely to host phishing scams. Hence, if the URL resolves to a suspicious domain or global top-level domain ("gTLD"), the URL may be part of a phishing scam. As another example, a URL (and/or the network data for the domain and/or IP address associated with the URL) may be compared with information in the email headers (including, for example, source address, "FROM:" field, etc.) and/or network data associated with such header information. If this comparison reveals inconsistencies, it may be relatively more likely that the message is a phish. Conversely, if this information is consistent, it may be (but is not necessarily) relatively more likely that the message is not a phish.

Figure 5A:
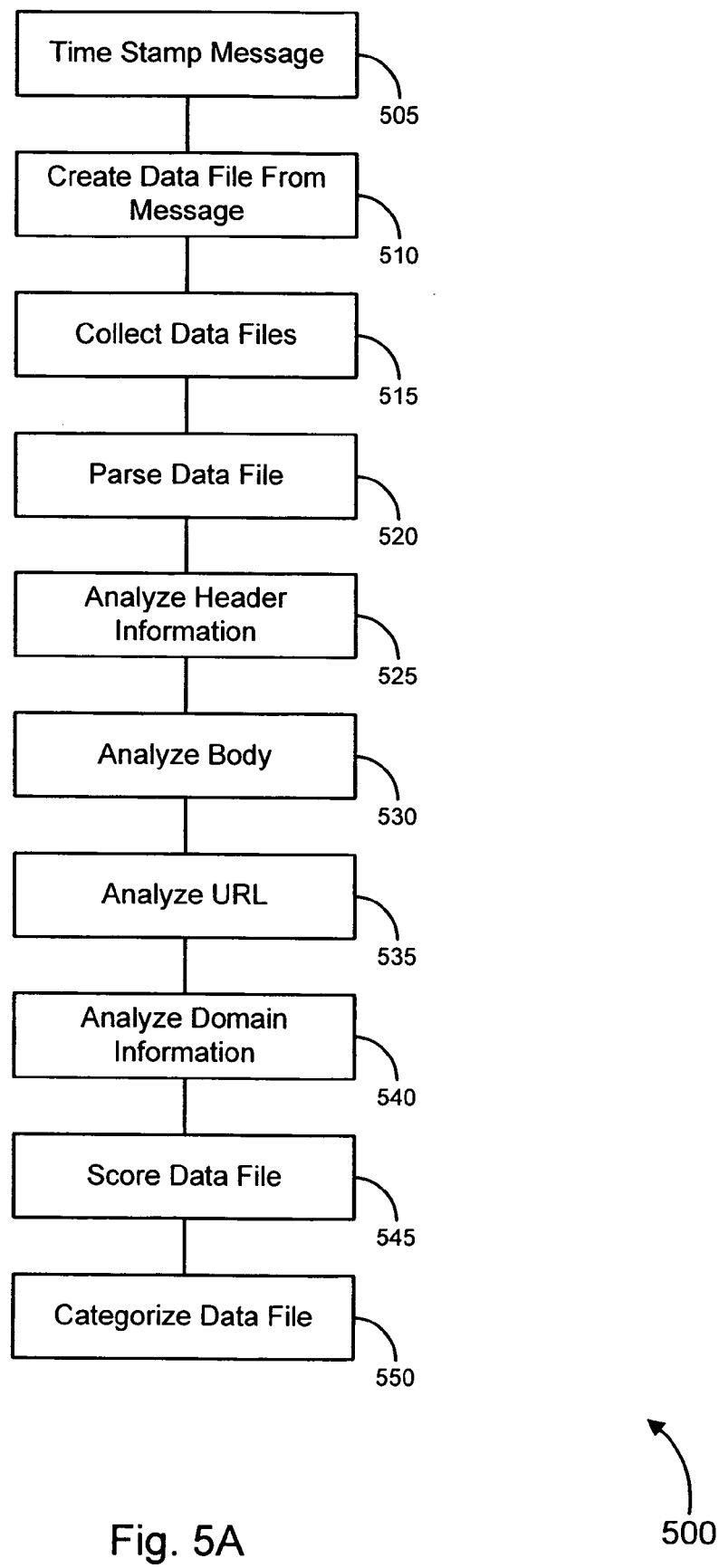
FIG. 5A is a process flow diagram illustrating a method of collecting and analyzing data, in accordance with various embodiments of the invention.
Figure 5B:
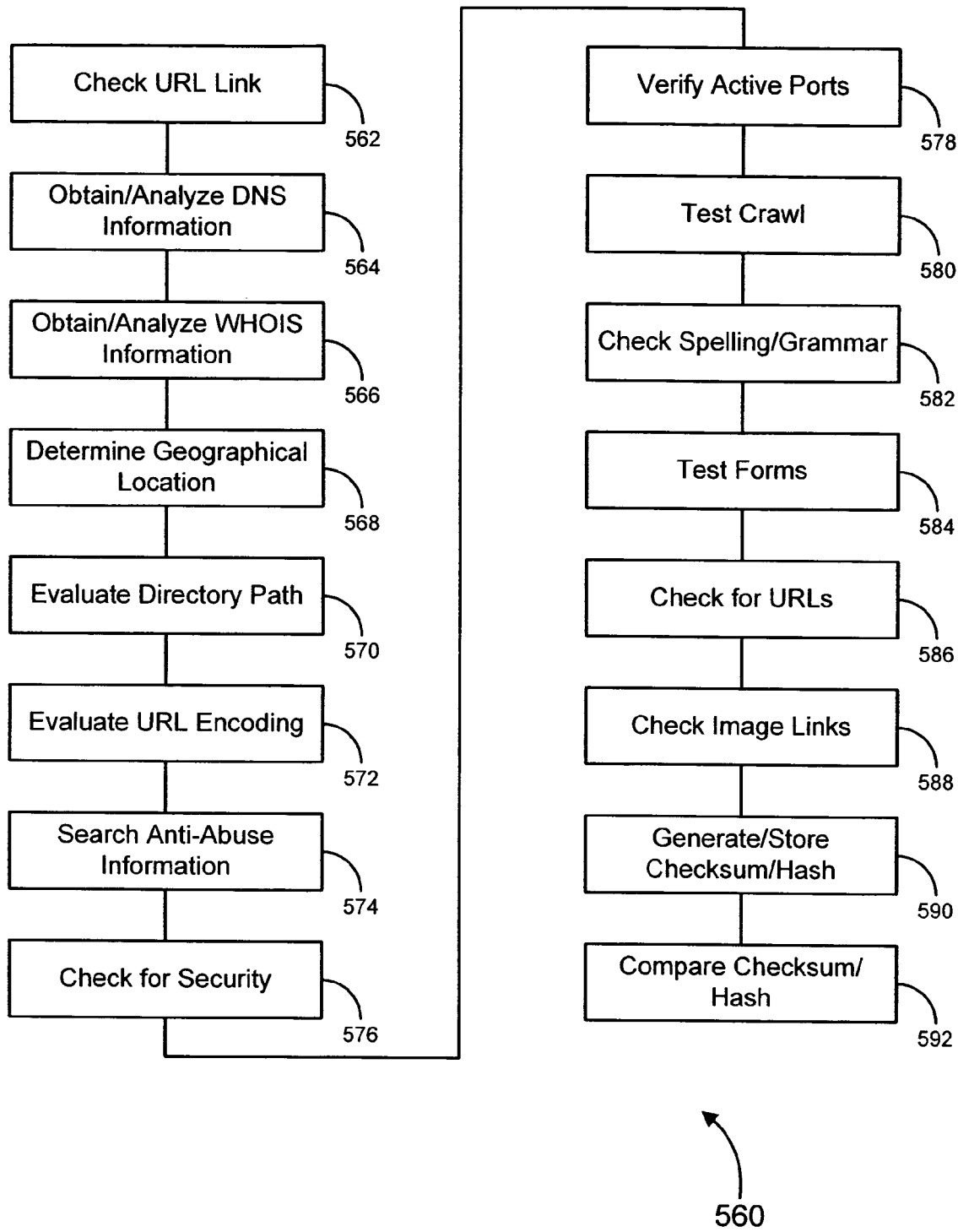
FIG. 5B is a process flow diagram illustrating procedures for analyzing a uniform resource locator and/or a web site, in accordance with various embodiments of the invention.

In accordance with some embodiments, analyzing a URL (obtained from any source) can involve one or more detailed tests. FIG. 5B illustrates an exemplary method 560 comprising a variety of such tests (any of which may be performed in various orders and/or combinations, depending on the embodiment). One test, for example, comprises testing the URL to determine that it is "live" (i.e., that a web page, etc. referenced by the URL is available) (block 562). This may be performed using a web browser, an HTTP GET request, etc. Further, the DNS information for a server and/or a domain referenced by the URL may be obtained (using any of several common methods) and/or analyzed (block 564) (e.g., to determine the IP address and/or network block of the server to which the URL refers). Similarly, the WHOIS information for the domain may be obtained and/or analyzed (block 566), e.g., to determine who owns the domain. In particular, any particular identifying information for the domain (e.g., a contact name, address, email address, phone number, etc.) may be noted. Any of the information obtained by these procedures may be stored for future reference and/or compared to similar information obtained through earlier analyses. In this way, for example, repeat offenders may be identified efficiently. Merely by way of example, if a domain associated with a URL being analyzed has the same contact email address as a domain previously found to be associated with an online scam, the current URL may be relatively more likely to be associated with a scam.

In accordance with some embodiments, the geographical location of the server hosting the URL may be determined (block 568). Those skilled in the art will appreciated that there are a variety of known procedures for determining the geographical location of a server (based on its domain name and/or IP address, for example) and any of these procedures may be used. The geographical location of a server can provide an indication of whether the server is likely engaged in a fraudulent activity. Merely by way of example, if a server located in Eastern Europe is hosting a web site that purports to be associated with a company located in the U.S., it may be relatively more likely that the web site is fraudulent. In addition, determining the location of the server may provide an indication of what administrative and/or technical responses are available with respect to web pages served by that server.

The composition of the URL itself may also reveal whether the URL is likely to refer to a fraudulent web site. Merely by way of example, in many cases, a URL referring to a legitimate corporate web site will have a fairly simple directory path, such as the root (default) path for the web server (e.g., "/", or perhaps a subdirectory of the root path (e.g., "/verify/ "). Any URLs with convoluted or unusual directory paths, therefore, may be more likely to be engaged in fraudulent activity, and an examination of the URL itself might provide some indication of this fact. Thus, the method 560 can include, in some cases, evaluating the directory path of the URL (block 570). Merely by way of example, if the URL references a user directory (e.g., "/~jsmith/") the URL may be relatively more likely to refer to an illegitimate web site, since a legitimate corporate web site would not be expected to reside in a user's directory. Because scammers recognize this fact, they sometimes attempt to obscure the directory path of the web site using, for example, URL redirection, which often results in relatively unconventional URLs. Thus, the encoding of the URL also may be examined (block 572). If the URL has unconventional coding (such as character strings in the place of a directory path, etc.), such unconventional coding may indicate that the URL includes implicit redirection (e.g., to an obscured path), meaning the URL may be relatively more likely to refer to an illegitimate web site.

In some cases, sources of anti-abuse information, such as anti-abuse newsgroups, email lists, etc. may be searched for references to the URL being analyzed (and/or for a host, domain, IP address and/or network block associated with the URL (block 574). A reference in one of these anti-abuse sources may indicated that the URL refers to a fraudulent web site.

Another factor that may be considered is whether the URL refers to an encrypted connection, such as a connection secured by the Secured Sockets Layer ("SSL") encryption scheme known to those skilled in the art (block 576). For example, if the protocol specified by the URL is "https," the URL generally will link to a secured connection. Alternatively, the server hosting the resource referenced by the URL may be interrogated to determine whether the server accepts secured connections, for example by submitting an HTTPS GET request to the hostname (or IP address) referenced by the URL. Other procedures may be used as well. The use of encryption or other security may indicate that the referenced web site is relatively more (or less) likely to be engaged in fraudulent activity.

In addition to testing for secured connections, the server and/or web site to which the URL refers may be subjected to additional tests. (Such tests may also be performed as part of a web site/server investigation, such as the investigation described with respect to FIG. 7). Merely by way of example, the active ports on the server may be verified (block 578), e.g., using a port scanner and/or other diagnostic tools (including without limitation those discussed above, such as NMAP and Nessus). If a server is listening on "high" or "unknown" ports (e.g., any port numbered above 1024), the activity of such ports may indicate that the web site is relatively more likely to be illegitimate. (In addition, the URL may be further evaluated to determine whether it refers to a high or unknown port number, which would provide a similar indication). Further, if the server "listens" on ports known to allow security vulnerabilities, it may be relatively more likely that the server has been compromised, which could indicate an enhanced likelihood of a fraudulent activity.

In some cases, it may be appropriate to "crawl" the web site referenced by the URL (and/or a portion of that web site, such as the referenced page, the first ten pages, the first level of links, etc.) (block 580). This procedure is described in more detail with respect to FIG. 7. The downloaded pages may provide additional indications of whether the web site is legitimate. Merely by way of example, the pages can be checked for spelling and/or grammar errors (block 582). The presence of such errors (particularly if they are relatively numerous) can indicate that the web site is not professionally designed and/or maintained, and therefore is relatively more likely to be fraudulent. Similarly, the method may test for the presence of any HTML forms (and/or the contents of the forms) (block 584), which may provide an indication of the legitimacy of the web site. The testing of forms is described in more detail with respect to FIGS. 7 and 8, and similar procedures may be used in this context.

The downloaded pages may also be checked to determine whether the pages contain URLs referring to other pages (block 586), especially pages external to the web site, including without limitation pages associated with a legitimate business and/or other fraudulent sites, as well whether the pages refer to images hosted on other sites (block 588). The presence of either of these types of references may indicate that the web site is relatively more likely to be illegitimate. Merely by way of example, if a web site is spoofing a bank's web site, the spoofing site may have external URL links to the bank's actual web site and/or may comprise images hosted by the bank's web site (so as to appear more authentic).

Often, a scammer will move a fraudulent web site (and/or pages from that site) among various servers in an attempt to perform multiple scams and/or avoid detection/prosecution. Further, some scammers purchase (or otherwise acquire) "turnkey" scamming kits comprising pre-built web pages/sites that can be hosted on a server to perform a scam. It follows, therefore, that it can be useful to provide an efficient way to compare URLs and/or web sites from a plurality of investigations. Merely by way of example, in some cases, the method 560 can include generating and/or storing (e.g., in a database, file system, etc.) a checksum and/or hash value associated with the URL and/or page(s) referenced by the URL (e.g., the page directly referenced by the URL and/or the pages crawled in block 580) (block 590). Merely by way of example, a hashing algorithm may be used to calculate a value for the URL string and/or for the contents of the referenced page(s). Alternatively, a checksum value may be calculated for the contents of these page(s). Either (or both) of these procedures may be used to provide an efficient "snapshot" of a URL, web page and/or web site. (In some cases, a discrete checksum/hash may be generated for a URL, an entire site and/or individual pages from that site). The checksum/hash value(s) may then be compared against other such values (which may be stored, as described above, in a database, file system, etc.) calculated for URLs/web sites investigated previously (block 592). If the checksum/hash value matches the value for a web site previously found to be fraudulent, the odds are good that the present site is fraudulent as well.

Returning to FIG. 5A, information about the domain to which the URL resolves may be analyzed (block 540), either as a separate step or as a part of the URL analysis. Further, in determining whether a domain is suspicious, the domain may be compared to any brand information contained in the body of the message. For example, if the body of the message includes the brand name of a customer, and the URL resolves to a domain different than a domain owned by and/or associated with that customer, the URL can be considered suspicious.

Upon the completion of the analysis (of any portion of a message, as discussed above, and/or of the message as a whole), the data file/message may, in some embodiments be assigned a score (block 545). Assigning a score to the data file/message can provide a quantitative measurement of the likelihood that the message is a phish, and in such embodiments, a score can be compared to a threshold score, such that a score meeting a particular threshold can result in further analysis and/or investigation, while a score not meeting that threshold can indicate a judgment that the email is not a probable phish. In some embodiments, the overall analysis of the message can result in the assignment of a single score.

In other embodiments, each type of analysis (e.g., the analysis of the header, of the body, of the URL and/or of the associated domain) can result in the assignment of a separate score, and/or these separate scores can be consolidated to form a composite score that can be assigned to the message. Moreover, the individual scores for each type of analysis may themselves be composite scores. Merely by way of example, each of the tests described with respect to FIG. 5B (as well, perhaps as other tests) may result in a score, and the scores of these tests may be consolidated to form a composite URL score.

In further embodiments, the analysis of each data file or email message can be performed in hierarchical fashion: the header information may be analyzed and scored, and only if that score meets a certain threshold will the correlation engine proceed to analyze the body. If not, the message is considered not to be a phish and the analysis ends. Likewise, only of the score resulting from the body analysis reaches a certain threshold will the URL be analyzed, etc.

The score values for various findings can be arbitrary, and they can reflect a judgment of the relative importance of various factors in the analysis. Further, based on the disclosure herein, one skilled in the art can appreciate that the scaling of the scores for various portions of the message (and/or the threshold scores for proceeding to the next stage of analysis) can be adjusted depending on the relative reliability of the analysis of each portion in determining whether the message actually is a phish, as well as the desired degree of precision in identifying possible phish messages. Moreover, the correlation engine can employ an automatic feedback loop, as described above, allowing the correlation engine to be self-tuning if desired for instance, if a particular factor proves to be a reliable indicator in categorizing a message, the correlation engine can automatically begin to give that factor more weight.

To understand how a hierarchical scoring system may be implemented in accordance with some embodiments, consider the following, simplified example. An email message with a forged header may be accorded a score of 150, and if a score over 100 is required to proceed to the analysis of the body, that analysis will be performed. The presence of a customer's name in the body may be worth a score of 1000, and the presence of the term "confirm your credit card" may be worth a score of 2000. A score over 2500 may be required to proceed to URL analysis, so if the message includes both terms, it will have a score of 3150 and will proceed to URL analysis. Finally, if the URL resolves to an IP address, that may be worth a score of 10000. If the threshold composite score for considering a message to be a likely phish is 12000, the composite score of the message (13150) would indicate that the email likely is a phish. (It should be noted that, while, for purposes of illustration, this example requires the assigned score to exceed the threshold score, in other embodiments, a score might have to be lower than the threshold score to meet the threshold. That is, the required relationship between the assigned score and the threshold score is discretionary. It should also be noted that certain factors, such as the presence of a white listed term, can detract from a score.)

After the analysis of the message/data file is complete, the message may be categorized as a phish (block 550). In some embodiments, a scoring algorithm similar to those discussed above may be used to categorize the message. In some cases, the categorization can depend on an overall and/or composite score for the message, while in other cases, the categorization might depend only on a score for a particular section (e.g., the body portion, the URL, etc.). Other methods of categorization may be used as well. For example, the mere presence of any particular blacklisted term, a URL resolving to a suspicious domain, etc. may cause the message to be categorized as a phish. The choice of criteria for categorization is discretionary.

The scoring methodology described above may be applied to the categorization of data (including email messages, URLs, web sites, etc.) in a broader context as well. Merely by way of example, in accordance with some embodiments, a similar scoring system could be used to identify direct email marketing (e.g., from a competitive marketing perspective), to determine whether a business's products, trademarks, business identity, etc. is being used in an improper manner, etc. With the benefit of this disclosure, those skilled in the art will appreciate that this robust scoring methodology may utilize a variety of different scoring criteria to analyze such data in a wide variety of applications.

FIG. 6 illustrates a method 600 for investigating a suspected fraudulent activity. In some cases, a fraudulent activity may be discovered through the analysis of a received email message and/or data obtained from a data source (e.g., via a crawling/monitoring activity, as discussed above).

Once a suspected instance of fraud has been uncovered, an event may be created in an event manager (block 605). As described above, in accordance with some embodiments of the invention, an event manager can be a computer systems (and/or a software application) that may be configured to track suspected fraudulent activity. In particular embodiments, the event manager may have workflow capabilities, such that an event may be created as a container for all available information about a suspect activity. Merely by way of example, the creation of an event can be similar to the creation of a "trouble ticket" known to those skilled in the art, whereby the event remains open until a final resolution (e.g., classification of the suspect activity as non-fraudulent, cessation of the suspect activity, etc.) renders the event moot, at which point it may be closed. In the interim, various investigative and/or responsive procedures (including without limitation those described in detail below) may be initiated by the event manager (automatically and/or with user interaction) and/or a record of the results of such procedures may be stored and/or tracked by the event manager. All of this information may be contained within an event object. As noted above, in some cases, the event manager can be policy-driven, such that customer policies influence the way a particular event is handled. The event, therefore, may be linked to one or more customer policies, which can inform the behavior of the event manager and/or a technician handling the event. In general, each event may be investigated (block 610). In some cases, when an event is opened, a technician might evaluate the event (e.g., by visiting and/or analyzing a web site associated with the event). In other cases, a more rigorous investigation may be performed, for instance by an event manager.

Figure 7:
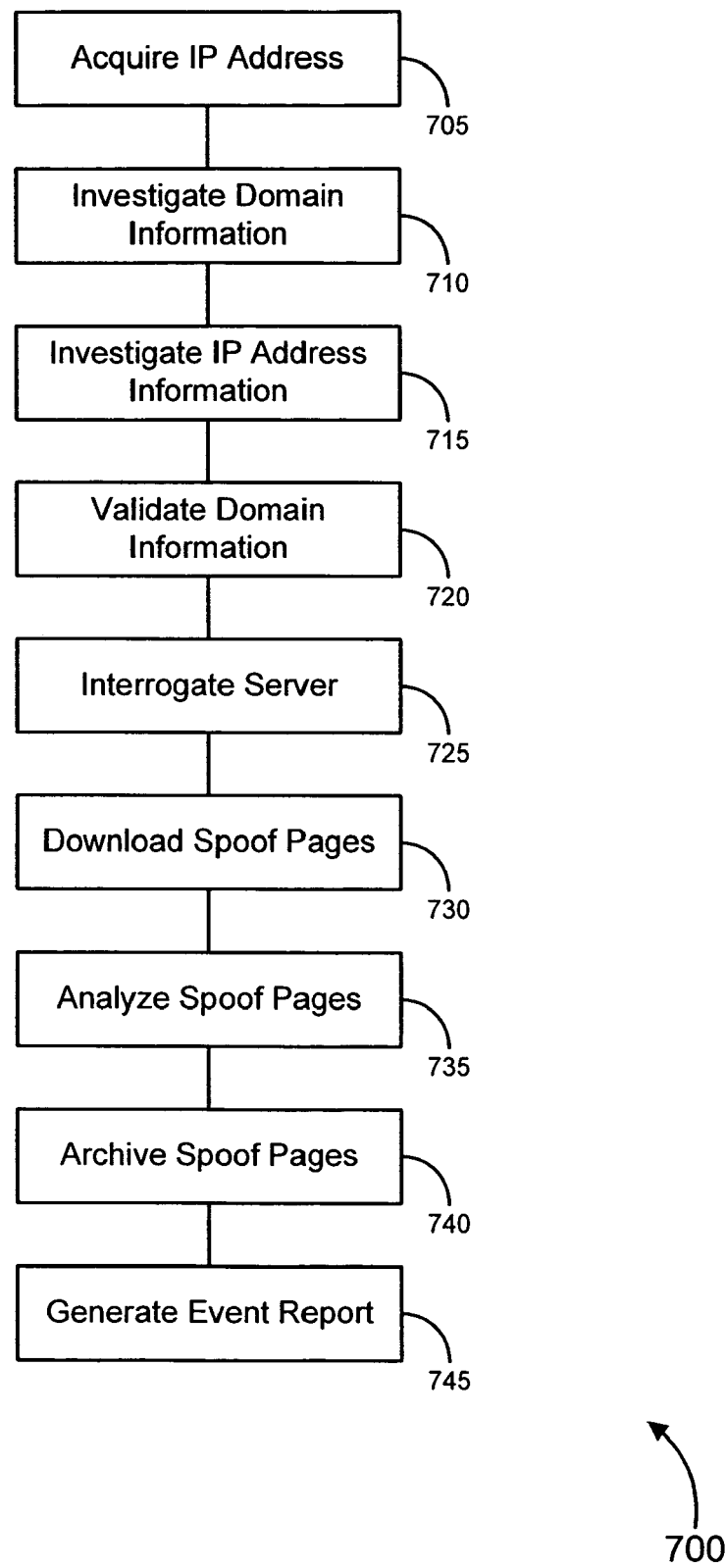
FIG. 7 is a process flow diagram illustrating a method of investigating a suspicious uniform resource locator and/or web site, in accordance with various embodiments of the invention.

FIG. 7 illustrates an exemplary method 700 detailing various procedures that may be undertaken as part of the investigation. At block 705, the IP address of the server referenced by a URL included in the message may be acquired via any of several well-known methods, such as a DNS query (or, if the URL refers to an IP address instead of a hostname, the URL itself).

In addition, an apparent address for the server referenced by the URL may be identified. Those skilled in the art can appreciate that a URL may be associated with an "anchor," which can be text, an image, etc., such that the anchor appears to be the address for the server referenced by the URL, while the actual URL remains hidden to a casual observer. (In other words, the user may select the anchor in a web browser, email client, etc. to be redirected to the server referenced by the URL). In this way, the anchor may comprise an "apparent address" that actually is different than the address referenced by the URL. Both the apparent address (e.g., the address in the anchor) and the address of the server referenced in the URL (i.e., the actual address in the URL) may comprise a hostname (usually including a domain) and/or an IP address. In addition, the anchor may comprise an identifier for a trusted entity (a business name, etc.) If the apparent address is different than the address actually referenced by the URL (and/or the apparent address comprises an identifier for a trusted entity while the address actually referenced by the URL is not associated with that trusted entity), it may be more likely that the URL is fraudulent and/or that the server reference by the URL is engaged in fraudulent activity.

The method 700 may also comprise investigating information about the domain to which the URL resolves (block 710), for instance through a domain WHOIS query. This information can show the owner of the domain, the assigned name server for the domain, the geographic location of the domain and administrative contact information for the domain. In addition, information about the IP block to which that domain should be assigned can be investigated (block 715), which can elicit similar information to the domain WHOIS query, as well as an indication of which IP block the domain should relate to. Further, the domain information referenced by the URL can be verified (block 720), for instance by comparing the IP address obtained through the DNS query (or via the URL, if the URL contains an IP address instead of a hostname) with the IP block to which the domain should belong. Any discrepancy in the domain information can indicate that the domain has been spoofed in the message, providing further evidence that the message is likely a phishing attempt.

At block 725, the server to which the URL refers can be interrogated, using a variety of commercially-available tools, such as port scanners, etc. In some embodiments, the NMAP application and/or the Nessus application may be used to interrogate the server. In a particular set of embodiments, these tools may be incorporated into a proprietary application (which may also perform other investigation, as discussed above) to provide more robust interrogation of the server. The interrogation of the server can indicate what services the server is running (which can provide some indication of whether the server is engaged in fraudulent activity). For instance, if the server is accepting HTTP requests on an unusual port, that service may (or may not) indicate that the server is engaged in fraudulent activity. The interrogation of the server may also show security vulnerabilities, which can indicate that the server may be compromised and therefore may be engaged in fraudulent activity without the knowledge of the server operator. In addition, the route to the server may be traced in a well-known manner, providing more information about the server, its location, and the domain/IP block in which it resides.

Interrogating the server can include downloading some or all of the web pages served by that server (using, for example, the WGET command and/or any other HTTP GET function) (block 730), especially any pages that appear to masquerade as pages on other servers (spoof pages). The downloaded pages may be analyzed to determine whether the pages request any personal information and/or provide fields for a user to provide personal information (block 735). Further, downloaded pages may be archived (block 740), which can allow a technician and/or the customer to view the pages to assist in any necessary human evaluation of whether the pages actually are fraudulently requesting personal information. In some cases, a representation of the pages may be saved, as described in detail herein.

Finally, an event report may be generated (block 745). The event report may include any or all of the information obtained through the investigation, including any archived pages. The event report may be consulted by a technician and/or provided to a customer to assist in formulating a response strategy. In some cases, a redacted version of the event report may be provided to the customer.

Returning once again to FIG. 6, the results of the investigation may be reported (block 615), for instance by displaying a copy of the event report to a technician at a monitoring center (or any other location). Optionally, the technician may analyze the report (block 620) to provide a reality check on the information obtained in the investigation and/or to formulate a response strategy. The customer may be notified of the event and/or of the investigation results (block 625), by an automated email message, phone call from a technician, etc. The technician may also confer with the customer (block 630) to allow the customer to make a decision with respect to how to respond to the attempted fraud. Alternatively, a customer profile may indicate that a specific response strategy should be pursued, such that the customer need not be consulted before formulating a response strategy.

If the investigation and/or event report indicates that the server is engaging in fraudulent activity, the method 600 can include responding to the fraudulent activity. Any such response may be initiated and/or pursued automatically and/or manually (i.e., at the direction of a technician). Responses can take a variety of forms. Merely by way of example, the customer, customer policy and/or technician may determine that an administrative response (block 635) is appropriate. An administrative response can include any response that does not involve a direct response against the server. For example, one possible administrative response is notifying the ISP hosting the server and/or the registrar for the server's domain that the server is engaged in fraudulent activity. Another administrative response could be notifying legal authorities about the fraudulent activity and/or preparing evidence for a case under the Uniform Domain-Name-Dispute Resolution Policy ("UDRP"). If the investigation reveals that the server may have been compromised, an administrative response can include notifying the server operator (perhaps via contact information obtained during the investigation of the event) that the server has been compromised and/or providing advice on how to secure the server to avoid future compromises.

Figure 8:
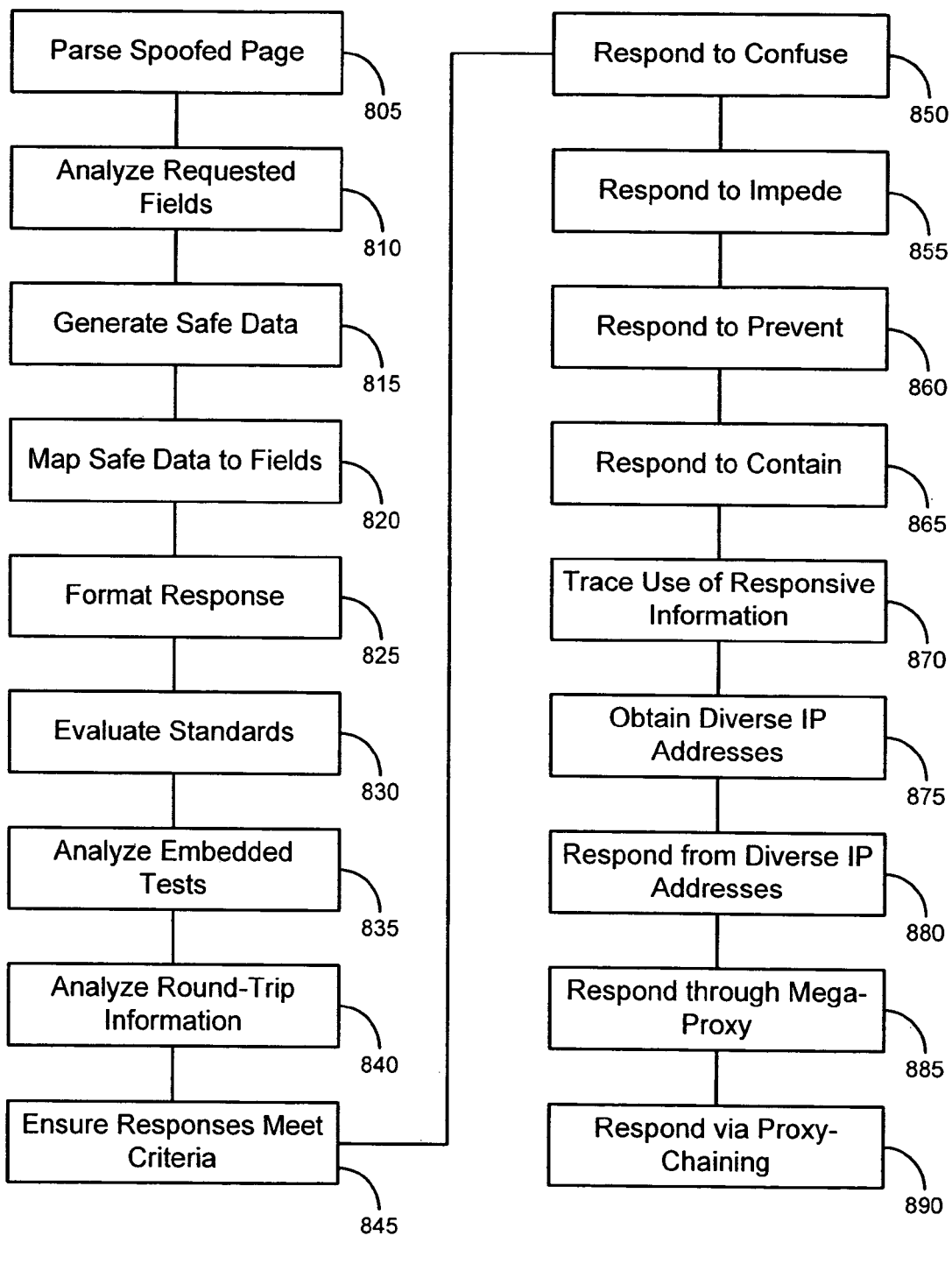
FIG. 8 is a process flow diagram illustrating a method of responding to an attempted online fraud, in accordance with various embodiments of the invention.

In addition (or as an alternative) to administrative responses, it may be desirable to pursue a direct technical response against the server (block 640). FIG. 8 illustrates an exemplary method 800 for pursuing a technical response against a server. The method 800 can include parsing a spoofed web page to identify fields in which a user may provide personal information (block 805). Those skilled in the art will recognize that an online form (such as an HTML form, etc.) comprises one or more fields, and that those fields generally include a label indicating the information that should be entered. In accordance with some embodiments, therefore, a set of requested fields from the web page may be analyzed (block 810); for instance the label accompanying each field can be analyzed to determine whether the field requests personal information, and in what format the information should be submitted. This analysis can include a search for common words, such as "first name," "credit card," "expiration," etc., as well as an analysis of any restrictions imposed by the field (e.g., data type, length, etc.) A set of "safe" data may be generated to populate the fields requesting personal information (and/or any other necessary fields) (block 815). In some cases, the safe data can correspond to a safe account, as discussed above. In any event, the safe data can comprise data that appears to be valid (and in fact may be valid, in that it corresponds to a valid account) but that does not pertain to any real account holder or other person. The safe data can be drawn from a database and/or dictionary of safe data (e.g., fictitious first and last names, addresses, etc.) and/or generated algorithmically (e.g., account numbers, credit card numbers, expiration dates, etc.) and/or some combination of the two.

Based on the analysis of the requested fields, the safe data can be mapped to the requested fields (block 820), such that the data is formatted to appear to be actual personal information for a user. Merely by way of example, if a field requests a credit card number, safe data representing an apparently valid credit card number (e.g. a sixteen digit number starting with a "4," which would appear to be a valid Visa™ credit card number) can be mapped to that field. A responsive message may be generated and/or formatted to look like a filled-out form from the spoofed web page (block 825) and then may be submitted to the server. This process can be repeated as necessary, creating a plurality of "safe" responses.

In many cases, a phisher will attempt to filter responses, in order to avoid the deleterious effects of safe data on his collection of acquired data, to avoid the snare of "Marked Money™" (which is discussed in further detail below), and/or for other reasons. Phishers may attempt to use a variety of devices to filter received responses. One type of filtering involves the examination and/or filtering of responses from a particular IP address and/or domain (or set of addresses/domains) the phisher suspects might not be real responses to the phishing scam. Methods of the invention can implement countermeasures, including without limitation those discussed below, to avoid this type of filtration.

One type of filtration can be loosely termed "data verification," and it involves the use of various techniques to check the submitted responses for consistency. Merely by way of example, if the phisher's web site collects data that is formatted according to a standard (which may be an industry standard, a published standard, etc.), the phisher may implement controls (which can be software applications and/or portable software residing on the phisher's web server, in the phish email, etc.) to check submitted responses for consistency with such standards. To avoid filtration of safe responses, therefore, the method 800 can implement countermeasures such as identifying and/or evaluating any such standards that may be applicable (block 830). For example, the method 800 can include evaluating each of the response fields to determine whether any standards apply to that field, and if so, determining how the standard is implemented. Merely by way of example, as discussed above, credit card networks have developed standards for ensuring the consistency and/or validity of credit card numbers. If a field asks for a credit card number, therefore, the method 800 could include identifying the proper standard for appropriate responses. Similar standards exist for bank routing ("RTN") numbers, etc. As another, perhaps simpler, example, if a web site requires the submission of an email address, the method 800 can include identifying the requirements for a valid email address (e.g., user@domain.tld). (Other procedures involving the validation of email addresses are discussed below.) In some cases, therefore, the system may comprise logic and/or data structures for identifying common field types and/or correlating those field types with the appropriate standard for data submitted in response to those field types.

Phishers sometimes also use one or more embedded tests to validate responses, and the method 800 therefore can comprise countermeasures to defeat such embedded tests. Such countermeasures can include without limitation identifying and/or analyzing such embedded tests (block 835). Merely by way of example, the web server and/or the email message may include portable code (such as a Java applet, a JavaScript, a CGI application, etc.) and/or other devices designed to track, identify and/or ignore responses not generated as a result of a phish mailing and/or sent repetitively. Such devices can include, again merely by way of example, counters, timers, cookies, hash values and/or the like. Identifying and/or analyzing such devices can include scanning/parsing an email message and/or web site for the existence of such code, downloading such code and/or executing the code in a sandbox to determine how it operates, and/or reverse-engineering the code to determine how responses are validated. As a simple example, a web site might set a cookie that identifies a particular computer, such that multiple responses from that computer may be identified and/or filtered by the phisher. Identifying and/or analyzing this device can comprise examining the contents of the cookie, so that a modified cookie (which could, for example, change and/or remove the identifying information) could be sent with each response. In other cases, the device might include a counter that is incremented for each access to the web site from a particular computer, and that timer might be identified so that appropriate countermeasures could be taken. In yet other cases, a timer might be implemented to prevent a plurality of responses being sent within a certain time frame, and/or a hash algorithm may be applied to responses, etc., e.g., to identify the responses.

In other cases, a phisher may attempt to validate responses based on information about and/or contained in a phish email designed to trigger the response, often requiring the response to comport in some fashion with the email to which it responds. Such strategies can be said to involve "round-trip" information; that is, certain data is sent by the phisher in the email address, and corresponding data is expected to be returned on the "round trip" to the web server. These techniques can be used, for example, to filter responses that do not appear to correlate to any email sent by the phisher, on the assumption that such responses are bogus and/or comprise safe data. Accordingly, the method 800 can comprise countermeasures to defeat attempts by the phisher to user such round-trip information to filter responses. Such countermeasures can include, for instance, identifying and/or analyzing any such "round trip" information (block 840). Round trip information may be identified and/or analyzed through a variety of procedures.

Merely by way of example, a phisher may retain a list of addresses to which a particular phish message was sent and also require responses to include an email address. The phisher can then filter responses by email address, such that any responses listing an email address not include on the list maintained by the phisher are considered bogus. Alternatively, the phisher may include a response code in each of the phish messages and require responses to provide the response code, then filtering any responses that do not include the response code. (In particular cases, the response code may be keyed to the day of the phish transmission, to the address to which the phish message was transmitted, and/or any other variable, for instance by using portable code in the phish message, and/or analyzing the round trip information can comprising analyzing such portable code, in a manner similar to that discussed above.)

Identifying and/or analyzing such round trip information can include analyzing the phish message and/or the response web page; in many cases, a comparison of the phish message and the response web page will reveal the use of round trip information. Further, a collection of phish messages (each of which, perhaps, being collected by a honey pot, as described above, and/or by another method) can reveal similarities and/or patterns that allow for the identification and/or analysis of round trip information. Merely by way of example, the recipient addresses on a plurality of phish emails appearing to originate from a common email "blast" may be compared to find commonalities and/or differences (in recipient addresses and/or domains, in response codes, in included portable code, etc.). This comparison can help in the formulation of responses that will not be filtered by the phisher.

In particular cases, a phisher may use one or more of the above techniques in an attempt to filter responses. Moreover, since phishers often operate their web sites on compromised servers (as discussed above), phishers often have incentives to make their filtering procedures as "lightweight" as possible, to avoid imposing a significant load on the compromised server (which could alert the operator of the server to the compromise, for example). Hence, phishers often attempt to generalize their filtering techniques to allow for more efficient searching. Merely by way of example, instead of filtering for particular email addresses corresponding to transmitted phish emails, a phisher may limit a particular spam burst to addresses at a single domain, such as "aol.com" (or a plurality of selected domains) and require an email address as part of responses submitted to a corresponding web site. Any responses listing an email address with a domain different than the domain to which the email blast is addressed may then be filtered. This procedure may prove to be significantly more efficient (from a computing resources standpoint) than actually comparing individual email addresses. The procedures of identifying round trip information (and/or any other devices) may reveal patterns indicating such "shortcuts," and/or these shortcuts may be exploited in forming responses. Merely by way of example, if an analysis of a collection of phish emails indicates that a particular blast was directed to users at a particular domain, it may be the case that any response using providing an email address in that domain (and/or appearing to originate from a host in that domain) will be accepted by the phisher's filtering procedures.

Hence, the method 800 can include ensuring (block 845) that responses to be transmitted to the phisher's web server meet criteria identified and/or analyzed in blocks 830-840 (and/or any other identified validation criteria). Based on the disclosure herein, one skilled in the art will appreciate that ensuring the responses meet a given criteria will often be highly on the nature of the identified criteria. Merely by way of example, if the criteria is that a particular returned value must conform to an industry standard (such as a credit card number, for example), the method 800 likely would include ensuring that all responses included validly-formatted credit card numbers. As another example, if analysis of round trip information indicates that the phish email blast appears only to have transmitted messages to users at a certain domain and/or ISP, the method 800 could ensure that all responses submitted include an address associated with that domain. As yet another example, if an embedded test is identified (for example, by reverse engineering portable code, as discussed above), the method 800 can ensure that each response will be considered valid when evaluated by that portable code (for example, by creating responses compliant with the code and/or by executing the code on the response before transmission to the web server to test the result).

Hence, the method 800 can include countermeasures designed to circumvent any filtering techniques (and, in particular, any content-based filtering techniques) implemented by the phisher. It may be noted that the procedures discussed with respect to blocks 830-845 have been illustrated as occurring after responses have been formatted (block 825). In some embodiments, however, it may be relatively more efficient to perform these procedures at other points in the method 800, such as before generating safe data (block 815) and/or before formatting responses (block 825).

Safe responses (and/or any other appropriate response and/or request, which could include, for instance, generic HTTP requests, other types of IP communications/packets, etc.) may be submitted to the server in a number and frequency determined by a response strategy. For instance, a "respond to confuse" strategy may be employed, whereby relatively few safe responses are submitted to the server (block 850). This strategy can have the effect of introducing invalid data into the server's database, thereby causing uncertainty for the phisher about which of the data collected actually represents valid personal information that can be exploited and which of the data collected is mere garbage. This alone can significantly affect the profitability of a phishing scam and may be sufficient to prevent the phisher from exploiting significant amounts of valid personal information received from actual consumers. In addition, if the safe data is associated with a safe account, and the phisher attempts to exploit the safe data, the phisher's use of that data can be traced, and an evidentiary trail of the phisher's activities can be compiled, aiding the identification of the phisher and possibly providing evidence for a civil litigation or criminal prosecution.

If desired, a "respond to impede" strategy can be pursued (block 855). In this strategy, safe responses can be transmitted in greater numbers and/or at a greater rate. Safe responses can also be sent from a plurality of response computers, which can reside in different domains and/or IP blocks, preventing easy detection by the phisher of which responses comprise safe information (and are therefore useless to the phisher). In addition to the benefits of the "respond to confuse" strategy (which are in fact magnified under this strategy), the "respond to impede" strategy may signal to the phisher that his scam has been discovered, possibly providing a deterrent against continuing with the scam.

If a more aggressive response is desired, a "respond to prevent" strategy may be undertaken (block 860). The respond to prevent strategy can involve transmitting large numbers of safe responses at a high rate from numerous, possibly widely-distributed, response computers. In fact, response rates can be sufficiently high to effectively prevent the server from being able to accept any substantial quantity of real responses from actual consumers or others, effectively terminating the scam. This strategy can be pursued until the server stops accepting responses, and may in fact be continued in case the server once again begins accepting responses.

Finally, in some cases, a "respond to contain" strategy may be employed (block 865). This strategy involves submitting sufficient HTTP requests to a web server operating a spoof scam to effectively disable the server's ability to service requests. Those skilled in the art will appreciate that typical web servers often implement a connection table, which tracks and limits the number of HTTP connections the server may service at any given time. In accordance with embodiments of the invention, therefore, sufficient simultaneous HTTP requests may be submitted (perhaps by a distributed systems of computers, as described above) to "fill up" the web server's connection table and thereby prevent the server from accepting any more requests. This process may be continued indefinitely until the fraudulent web site is removed. The HTTP requests may comprise safe responses (as described above) but, in this case, need not. Any generic HTTP request (such as an HTTP GET request) generally will suffice to create a connection and thereby occupy an entry in a connection table.

It is worth noting that this technique is different from a generalized attack (e.g., the transmission of an overwhelming number of IP packets) on the system/network from which the online fraud is being perpetrated, in that the number of HTTP requests required to fill a connection table generally will not be high enough to have a significant impact on the network infrastructure. Further, the system running the web server generally will remain otherwise available—it simply will not be above to service HTTP requests. In this way, the fraudulent activity may be impaired or prevented without causing excessive collateral damage to network infrastructure, etc. Of course, a generalized attack (of any variety) could also be used to accomplish this purpose, but such attacks may be infeasible in some cases, e.g., due to ethical and/or political considerations.

If desired, the use of responsive information may be traced (block 870). As described above, safe responses can comprise information (such as apparently valid credit card numbers) that is not associated with any real user. If the perpetrator of a scam attempts to use such information, the use of that information may be traced to identify the perpetrator. Merely by way of example, if the customer is a bank or credit card issuer, an account associated with a "safe" account number could be opened (or the "safe" account number could otherwise be monitored), and any attempts to access that account (e.g., attempted withdrawals or credit card authorizations) could be flagged for further investigation. This use of "marked money" has been used by authorities in other contexts, such as providing marked cash to bank robbers, then tracing the bank robbers by following the trail of the marked money as it is spend or otherwise distributed. Similar concepts may be implemented in accordance with embodiments of the invention, using the technologies described herein.

Sophisticated phishers may also attempt to filter responses according to the origin of the responses. Merely by way of example, if a phisher detects multiple responses from a single IP address (and/or from a range of similar IP addresses), from a single domain, etc., that phisher may filter responses from that IP address/range/domain, on the theory that a plurality of responses from a single location indicate that someone has discovered his scam and is attempting to identify him, submit safe responses, etc. Hence, the method 800 can include one or more procedures designed to defeat such attempts by the phisher. Merely by way of example, one strategy described above involves the use of multiple computers and/or multiple IP addresses to transmit responses in distributed fashion. In some cases, it may be advantageous to provide a diversity of IP addresses (which may be from different address blocks, etc.) to impede the phisher's ability to identify responses generated according to methods of the invention.

One strategy for transmitting a from a plurality of diverse IP address can comprise acquiring a plurality of diverse IP addresses (block 875), for instance by purchasing (or otherwise obtaining) relatively "disposable" or temporary IP addresses from a plurality of providers, for instance, by opening accounts with a plurality of different ISPs. In some cases, it may be advantageous to obtain IP addresses associated with (e.g., assigned to) retail ISPs, such as MSN, AOL, etc., because responses from such addresses may be assumed to originate from consumers, often the prime target of a phisher. (A retail ISP can be considered any ISP that provides Internet connectivity to consumers, as opposed to those ISPs that provide connectivity and/or other services merely to businesses.) In some cases, arrangements may be made with such ISPs simply to use addresses temporarily. The method 800, then, can further include assigning each of the plurality of IP addresses to a computer (and/or other device) configured to generate responses, e.g., in accordance with methods of the invention, and/or to transmit such responses to the phisher's web server (block 880). In some embodiments, each of these computers may be logged on to an appropriate ISP (e.g., the ISP with which the assigned IP address is associated) in order to use the IP address, such that any responses transmitted by the computers will be transmitted via the ISP. Further, in certain embodiments, these computers may be controlled by one or more central computers. In other embodiments, the responses may be generated at one or more central computers and then transmitted to the computers assigned the plurality of IP addresses, which could then forward the responses (perhaps with some modification), such that the responses appear to originate from these computers/IP addresses.

Another strategy which can be employed in accordance with embodiments of the invention is the use of a megaproxy (or similar technology) (block 885) to provide responses from a single computer (or set of computers), but wherein each of the responses appears to originate from a different IP address, domain and/or network block. Examples of such procedures are described in U.S. Prov. Pat. App. No. 60/610,716, already incorporated by reference herein. Using these and similar procedures, a group of requests may be made to appear as originating from a variety of sources, frustrating the phisher's attempts to filter the responses and/or forcing the phisher to block actual consumer responses in attempting to block safe responses generated in accordance with methods of the invention.

Figure 9A:
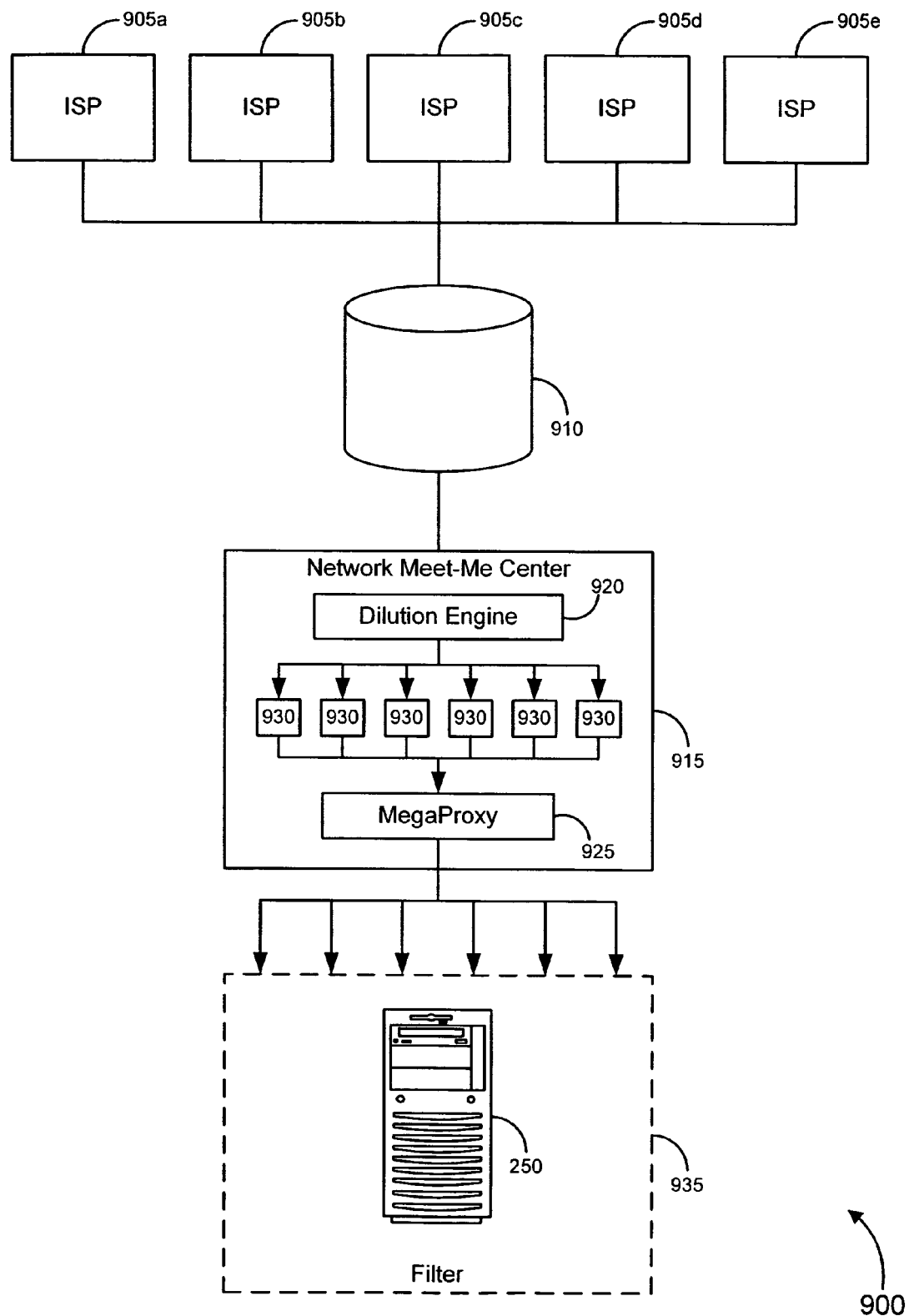
FIGS. 9A and 10 illustrate systems that can be used to submit responses to a phishing scam, in accordance with various embodiments of the invention.

Merely by way of example, FIG. 9A illustrates a system 900 that may be used to submit responses to a phishing scam. The system 900 works by using one or more network blocks (e.g., blocks of IP addresses) assigned to one or more entities 905, which can include, in some cases, major consumer ISPs, such as Comcast, America Online ("AOL"), the Microsoft Network ("MSN"), etc. The network blocks may be "donated" by these entities for use in an anti-phishing solution. (Although the term "donated" is used herein for ease of description, one should not infer that title to the network blocks necessarily is transferred to the security provider or that the blocks are provided without remuneration. In some embodiments, for example, a security provider may purchase or lease blocks for use in accordance with embodiments of the invention, or the blocks may be temporarily loaned to the security provider for such use. In other embodiments, the ISP need not even be aware of the purpose for which the blocks are to be used—those skilled in the art will appreciate that the allocation of dedicated network blocks from an ISP to a business for that business' use is commonplace.)

The donated blocks may be relatively permanently assigned to a security provider, etc. and/or may be assigned on an ad hoc basis. Such blocks may be provided by these entities 905 via interior routing protocols, and/or a record of the donated blocks may be stored in a database 910, for use by the anti-fraud system 900. The anti-fraud system 900 can also include a network meet-me center 915, which can be any facility that provides an opaque connection between the network blocks and the rest of the Internet (and in particular, the perpetrator of online fraud). The meet-me center 915 can provide the ability to submit a plurality of responses/requests 930 (e.g., HTTP POST or HTTP GET commands) to a scammer's server 250. By way of example, the responses 930 may be similar to the responses discussed above.

The meet-me center 915 may comprise a dilution engine 920, which may function in similar fashion to the dilution engines described above. (Alternatively, the meet-me center 915 may be in communication with a dilution engine maintained by a security provider, perhaps as part of a system such as the system 100 in FIG. 1A and/or the system 200 of FIG. 2.) Merely by way of example, the dilution engine 920 may be a software application that is designed to create and/or format the responses/requests 930 (perhaps in the manner discussed above), as well as a mega-proxy 925, which can make the responses/requests 930 appear to be originating from any of the IP addresses contained within the network blocks stored in the database 910. In operation, therefore, the dilution engine 920 may compose many responses/requests 930. As described in the above, these requests/responses 930 may be formatted to appear as legitimate responses to the phishing scam and/or may simply be generic requests designed to occupy the server's ability to service other requests. The mega-proxy 925 will forward those responses/requests 930, using any appropriate address (e.g., an IP address within the blocks stored in the database 910, as described above) as the originating address, to the spoofer's website 250. As noted above, the responses/requests 930 can be designed to feed incorrect personal information to the website 940 and/or merely to occupy the website and thereby impede its ability to defraud others. The scammer may use a filter 935 (such as a firewall application configured to block communications from particular IP blocks, domains, etc.) to attempt to block the responses/requests 930, but this will prove problematic for the scammer, for one or more of the following reasons.

First, since the responses/requests 930 will appear to be originating from a variety of different IP addresses (and, in many cases, from a variety of different domains and/or ISPs, it will be difficult for the scammer to determine which of the responses/requests it receives are from the system 900 and which are from ordinary consumers. While in some cases, it may be technically possible to determine which responses/requests are from the system 900, making such a determination usually will involve relatively expensive equipment and significant processing power, and those skilled in the art will appreciate that online fraud schemes are often operated by those without the financial resources to invest in such equipment. In addition, because many online fraud sites are operated on compromised servers operated not by the scammer but by an innocent third party, it often will be difficult for the spoofer to marshal the required computing resources to perform in-depth analysis, at least without alerting the owner of the server to the compromise.

Further, even if the scammer is successful at identifying the requests/responses 930 from the system 900 and manages to block some of these requests/responses 930, the fact that those requests/responses 930 often will appear to be originating from major consumer ISPs (e.g., 905), the scammer will be in the difficult position of having to block IP addresses associated with the scammer's prime target: the average consumer. In this way, the system 900 can provide multiple benefits, not only making it difficult and/or expensive for the scammer to block the requests/responses 930, but also using the scammer's attempts to block the requests/responses 930 against the scammer, by causing the scammer to block network blocks that also include addresses assigned to ordinary users, thereby blocking responses from the very people the scammer hopes to attract.

Figure 9B:
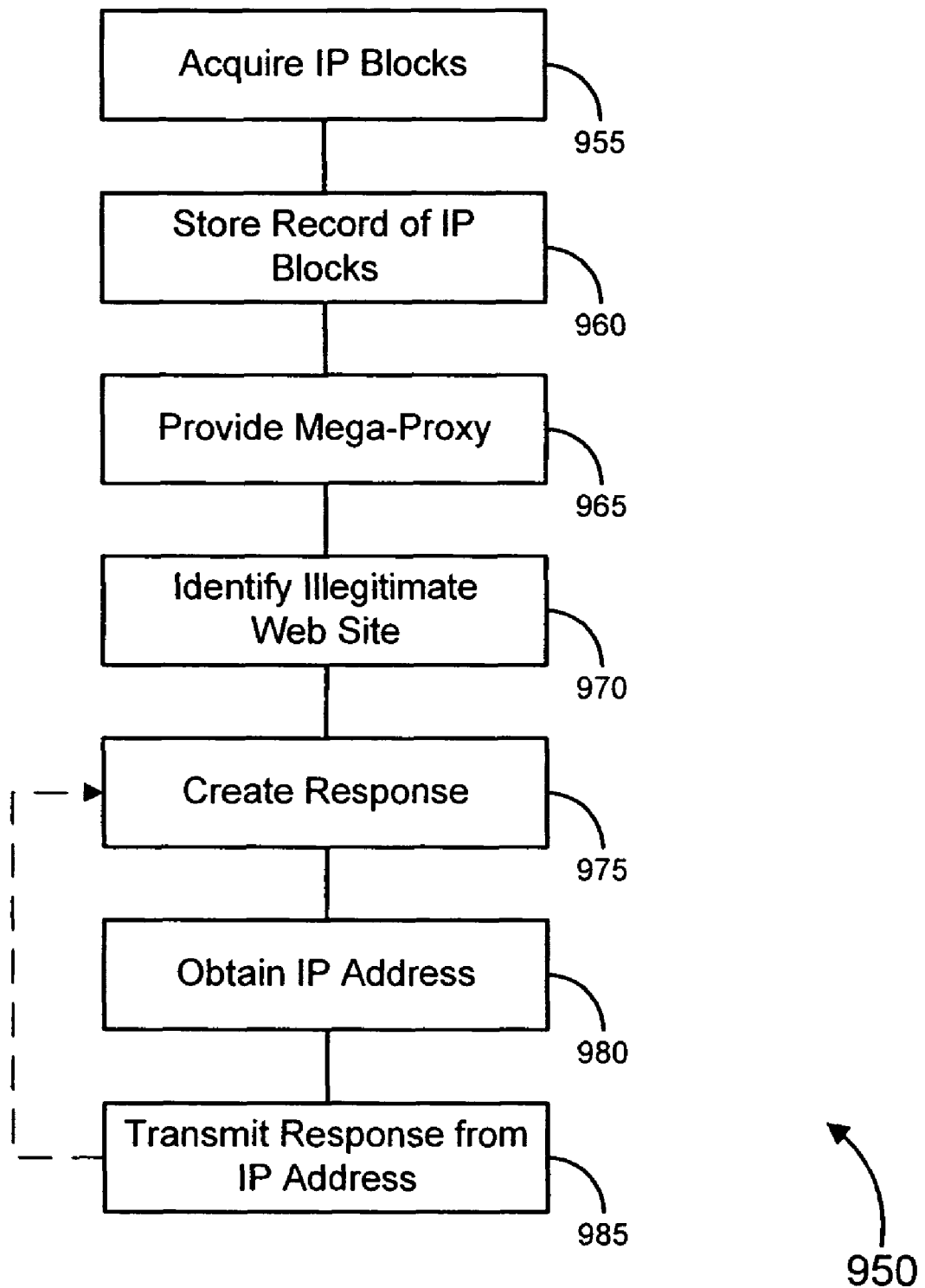
FIG. 9B illustrates a method of submitting responses to a phishing scam, in accordance with various embodiments of the invention.

FIG. 9B 950 illustrates a method of submitting responses to a web server. The method may be implemented in using a system such as the system 900 of FIG. 9A, although the methods of the invention are not limited to any particular hardware or software implementation. The method 950 can include acquiring one or more IP blocks (block 955) (that is, blocks of available IP addresses). As noted above, it may be useful in some cases for the IP blocks to be acquired from a plurality of ISPs (including retail ISPs), in order that responses generated by the method 900 appear to originate from within such ISPs (and, in particular cases, from customers of the retail ISPs, such as consumers). Various strategies for acquiring IP blocks are discussed above, and any of these strategies may be used in accordance with embodiments of the invention. In accordance with some embodiments, a record of the acquired IP addresses and/or blocks may be stored (e.g., in a database) (block 960).

The method 950 can further include providing a mega-proxy (such as, for example, a mega-proxy similar to the mega-proxy 925 described with respect to FIG. 9A) and/or any other device or software application capable of transmitting IP packets (and, in particular cases, HTTP requests) that appear to originate from a variety of different sources (block 965). Providing a mega-proxy can comprise situating the mega-proxy at a network meet-me center, which can be, for instance, a peering facility that provides the ability for multiple ISPs to communicate using interior routing protocols. In other embodiments, the mega-proxy can be situated elsewhere, so long as the mega-proxy is able to transmit packets using the acquired IP addresses.

Once an illegitimate web site is identified (block 970), for instance, using the methods discussed above, a response (e.g., an HTTP request) may be created, using, for example, the methods discussed above (block 975). The mega-proxy then can obtain an IP address (for example, by searching a database of acquired IP addresses) (block 980), and transmit the response to the illegitimate web server (block 985), such that the response originates from the IP address obtained by the mega-proxy. This process may be repeated for a plurality of responses (as indicated by the broken line in FIG. 9B). In some cases, a new IP address may be obtained for each response to be transmitted. In other cases, a particular IP address may be used to transmit a plurality of responses. In this manner, a plurality of responses (which may, in some cases, comprise "safe" data as described above) may be transmitted to the illegitimate web server.

Returning now to FIG. 8, another strategy for responding to an illegitimate web site can implement "proxy chaining" (block 890). Proxy chaining involves the transmission of response packets through a variety of proxy servers before their final transmission to the phisher's web server. In one embodiment of proxy chaining, a fraud-prevention system (such as the system 100 described above) can include connections to a variety of different ISPs (and, in particular, retail ISPs), via a plurality of dedicated connections, modem connections, etc. Responses may be sent through such connections, thereby utilizing the proxy servers of these ISPs to actually submit the request on behalf of the fraud-prevention system. When the phisher receives the responses, the responses will appear to originate from those retail ISPs, preventing the phisher from determining (and thus from easily being able to block) the actual machines from which the responses originated. In another embodiment, request may be sent through a plurality of proxy servers, perhaps in serial fashion, making it even more difficult for the phisher to determine the origination of the responses.

Figure 10:
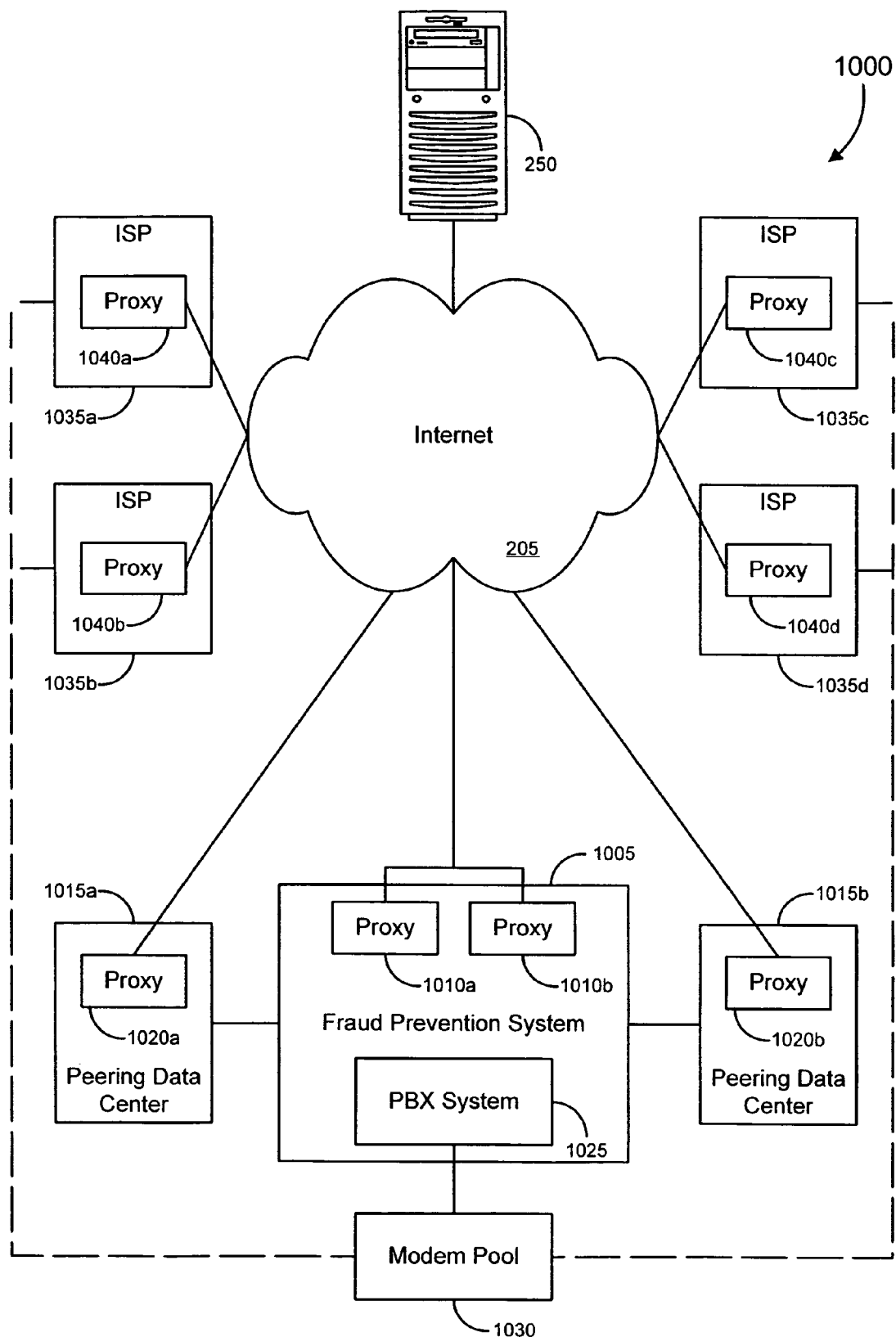

FIG. 10 illustrates a system 1000 that can be used to submit responses using a proxy-chaining strategy. The system 1000 comprises a fraud prevention system 1005, which can be similar to the systems illustrated by FIGS. 1A, 2 and/or 11 (and/or can include components similar to those described with respect to those systems), and/or can perform various methods of the invention. In particular, the fraud prevention system 1005 can be configured to carry out a technical response (such as a dilution response) against an illegitimate web server 250. The fraud prevention system 1005 may include one or more proxies 1010, which as one skilled in the art will appreciate, can be used to forward responses from the fraud prevention system 1005. The proxies 1010 can be SOCKS proxies, HTTP proxies, CGI proxies and/or any other type of Internet proxy known in the art.

As those skilled in the art will appreciate, a proxy can be used to disguise header information that may be used to identify a computer (such as a dilution engine and/or a response computer) that creates and/or formats responses for transmission to the illegitimate web site 250. In some embodiments, the proxies 1010 can be used to transmit responses directly to the web site 250. In such embodiments, however, the proxies 1010 may be identified by a scammer as part of a fraud prevention system 1005 (since they will be transmitting the dilution responses, for example, to the server 250). To prevent such identification, the responses may be transmitted by the fraud detection system 1005 (either through the proxies 1010 or directly) to other proxies for transmission to the server 250.

Merely by way of example, the fraud prevention system 1005—and/or an ISP (not shown) hosting the fraud prevention system 1005—may have a peering relationship (as is known in the art) with one or more data centers 1015 (which may themselves be ISPs and/or hosted by ISPs). The responses may be transmitted to these data centers 1015, either through a direct peering connection or via the Internet 205, and the data centers 1015 may transmit these responses to the server 250, often through their own proxies 1020.

The proxies 1020, like all of the proxies discussed herein, can be anonymous proxies. Further, in certain embodiments, the proxies discussed herein may be "distorting" proxies, which can omit and/or substitute false or pseudorandom data into certain fields in HTTP requests (which can comprise the dilution responses), such as the "HTTP_VIA" and "HTTP_X_FORWARDED_FOR" fields, thereby disguising the fact that they are serving as proxies and/or obscuring the fraud prevention system 1005 (and/or components of that system) as the actual sources of the HTTP requests. The data center proxies 1020 (and other proxies discussed herein) thus can serve to "anonymize" the responses vis-à-vis the fraud prevention system, further isolating the fraud prevention system 1005 from detection by the server 250 (or an operator of a scam on the server 250).

In accordance with other embodiments of the invention, the fraud prevention system 1005 may incorporate a private branch exchange ("PBX") system 1025 (and/or any other means of providing one or more available telephone (POTS, ISDN or other) lines in communication with the fraud prevention system 1005. The PBX 1025 may be in communication with a modem pool 1030 (or similar device) and thus can be used to provide communication with one or more ISPs 1035, as indicated by the broken lines on FIG. 10. (In other embodiments, other means for providing communication with the ISPs 1035 may be used as well). Responses, therefore, may be routed through one or more ISPs 1035 (and, in some embodiments, transmitted to one or more proxies 1040 operated by the ISP(s) 1035), which would forward the responses to the server 250. In some cases, one or more of the ISPs 1035 may be retail ISPs, providing the additional benefit of making the responses appear to originate from consumer customers of the ISPs, as discussed above.

In particular embodiments, the fraud prevention system 1005 may be configured to route responses through a plurality of proxies (including any of the proxies 1010, 1020, 1040 depicted on FIG. 10) using a proxy-chaining technique. Merely by way of example, a response such as an HTTP request might be transmitted from the fraud prevention system 1005 to a data center 1015*a* (perhaps via a proxy 1010*a*), where the request is forwarded by the data center's proxy server 1020*a* to another data center 1020*b* (or, alternatively, to an ISP 1035*a*), where another proxy server 1020*b* forwards the request to the web server 250 (the forwarding between links in the proxy chain can be done via a peering connection, modem connection, the Internet, etc.). This technique can, under some circumstances, provide more comprehensive "anonymizing" of the responses, making it relatively more difficult for the web server 250 (and/or a scammer using the web server 250) to identify the source of the responses. Further, in some embodiments, the proxy servers 1010 of the fraud prevention system 1005 (and/or other components of the system 1005, such as dilution engines, response computers, etc., which are not shown on FIG. 10), can be configured to distribute a plurality of responses among various proxies (e.g., 1020, 1040), randomly, in rotation, etc., to further disguise the source of the responses.

Hence, various embodiments of the invention provide several different procedures to circumvent filtering or blocking techniques (whether based on the content of the responses or the origination of those responses). These procedures, which may be used separately or in any combination, make it difficult for the phisher to separate responses submitted by actual, scammed consumers from responses generated by methods of the invention. In this way, the response and/or "marked money" techniques discussed herein, as well as other anti-fraud processes, may be implemented more effectively.

Figure 11A:
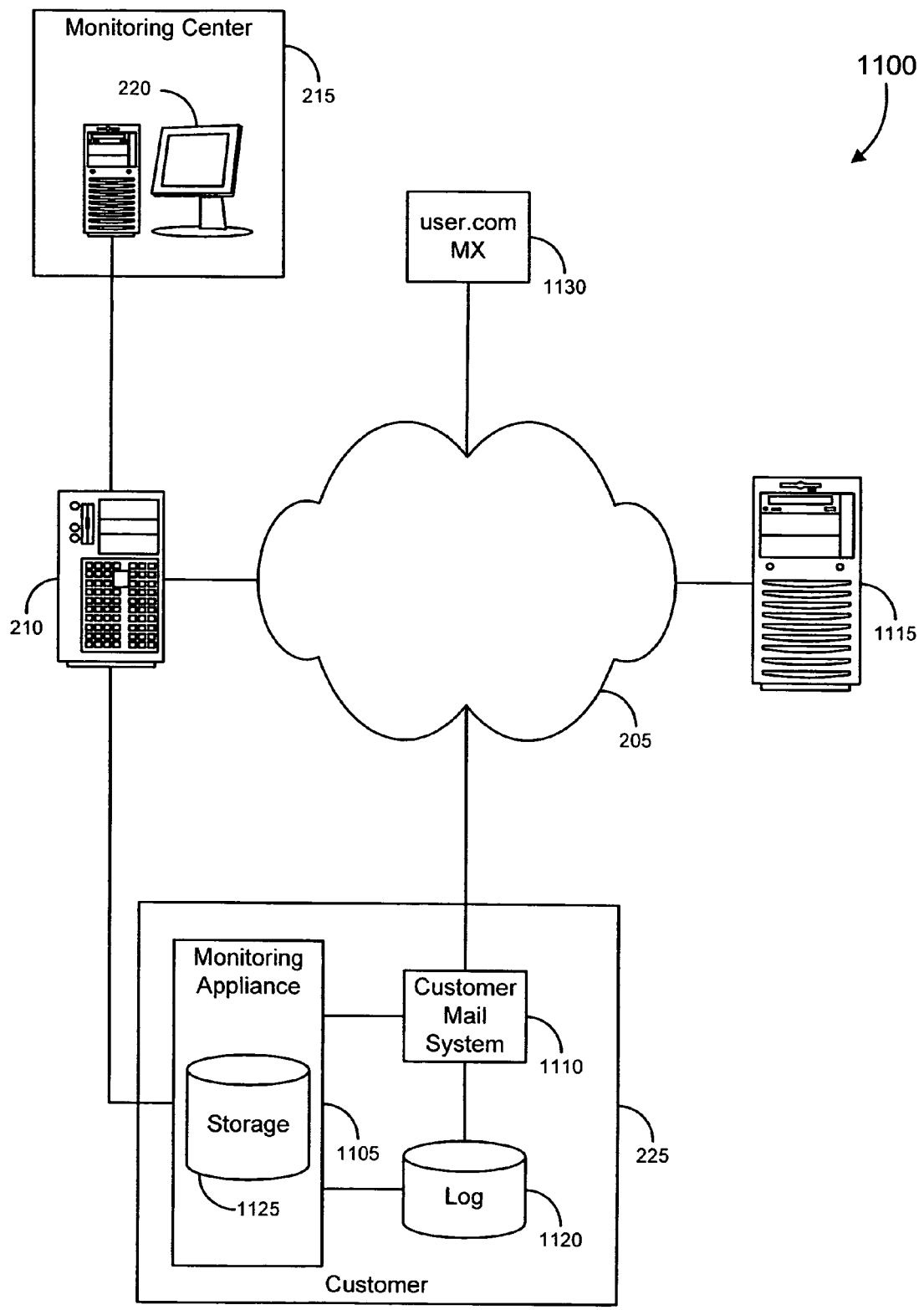
FIG. 11A illustrates a system that can be used to identify an improper use of a customer's online identity, in accordance with various embodiments of the invention.

In another set of embodiments of the invention, a monitoring appliance can be used to provide notice of a phishing scam (or other illegitimate use of a customer's online identity) through messages received by the customer's system. FIG. 11 illustrates a system 1100 that may be used to identify such an event, and FIG. 12 illustrates an exemplary method for identifying such an event.

Merely by way of example, the system 1100 of FIG. 11 can be configured to capture, inter alia, phishing events, in some cases, at a relatively early stage in the phishing scam (i.e., when phish messages originally are transmitted to prospective victims and/or participants in the phishing scam). The system 1100 be configured to operate, in some respects, similarly to the system 200 described with respect to FIG. 2. (It should be noted that the system 1100 of FIG. 11 may include components similar to those of the system 200 of FIG. 2, although, for ease of illustration, not all components are shown on FIG. 11.) A system similar to the system 1100 is described in detail in commonly-assigned, co-pending U.S. Prov. App. No. 60/610,715, already incorporated by reference.

Those skilled in the art will appreciate that, when perpetrating a phishing and/or spoofing scam, a scammer often will generate bulk email transmissions, seeking (for example) to induce recipients to log onto the scammer's web site, which may be engineered to appear to be the website of a legitimate (and often well-known) business, such as a bank, online commerce site, etc. To enhance the scam, therefore, the scammer often attempts to replicate and/or imitate as closely as possible an actual email message from the legitimate business. Hence, in many cases, certain fields in the message header (such as, for example, the "FROM:," "SENDER:," "RETURN PATH:," and/or "REPLY-TO:" fields) may be copied from, and/or forged to appear as, corresponding headers from an actual message sent by the legitimate business.

Although the inclusion of such false header information may help scammers to confuse the recipients of such messages, the false header information may also be used to help detect a potential online abuse, such as an attempted fraud. Those skilled in the art will appreciate that, when a mail server receives an electronic message addressed to an address at that mail server, the mail server will attempt to route the message to a mailbox associated with that message. When there is no such mailbox, the mail server often will use one or more of these fields (such as, for instance, the "RETURN-PATH:" field) to send a "bounce" message in an attempt to notify the sender of the message that the message could not be delivered to the address specified in the message. When the message's header information indicates that the legitimate business was the sender of the message, however (as, for example, when the scammer wishes to make the message appear authentic), the "bounce" message will be transmitted not back to the scammer, but instead to the legitimate business.

Moreover, because in many cases, the "bounce" message will have appended to it a copy of the original message (or a portion thereof) sent by the scammer, significant information may be gleaned from the bounce message, using, for instance, the methods and/or systems described below. And because scammers often send bursts of messages to large groups of unverified email addresses, there is a relatively high likelihood that any given burst of messages will include a substantial portion of undeliverable messages. Hence, an analysis of messages received by the legitimate business can facilitate the early detection of possible online abuses.

The system 1100 of FIG. 11 can be used to for this process. In addition to the components described with respect to FIG. 2, the system 1100 can additionally feature a monitoring appliance 1105, which may be located at the site of a customer 225 in particular embodiments. In other embodiments, however, the monitoring appliance 1105 may be located elsewhere (including at a monitoring center 215, etc.). In accordance with some embodiments, the monitoring appliance 1105 may comprise a general purpose computer (such as the computers described above, for example), perhaps with software for interfacing with the customer's email system and/or for performing other tasks described below (including, without limitation, methods of the invention). In other embodiments, the monitoring appliance 1105 may be a special purpose machine, with hardware, firmware and/or software instructions for performing these tasks.

The monitoring appliance 1105 may in communication with the customer's email system 1110. The legitimate business, (i.e., the customer) may be any entity that is concerned about phishing scams (or otherwise would like to be aware of mailings purporting to originate from that business), including without limitation an organization that has an online presence and/or would be expected to communicate with consumers, members, etc. via email (such as, for example, a bank, an online commerce web site, an online auction site, etc.). The email system 1110 can include, without limitation, an SMTP server, a POP3 server, a mail transfer agent ("MTA"), and/or any other commonly-available email server and/or client software. Standard email systems may be used in accordance with some embodiments of the invention. In other embodiments, the email system 1110 may be specially-configured (e.g., to integrate with the monitoring appliance 1105).

The monitoring appliance 1105 may be operated by the customer and/or may be operated by a third-party, such as a security service provider, etc. The monitoring appliance 1105 may be situated in proximity to the email system 1110 and/or may be remote from the email system 1110, so long as it is in communication with the email system 1110. In accordance with some embodiments, the monitoring appliance may be in communication with and/or integrated with an email gateway, MTA, SMTP server, etc. such that the monitoring appliance has access to every email message incoming to the email system 1110. (In particular cases, the monitoring appliance 1105 may be embodied by a modification to a standard mail system component, so that the monitoring appliance 1105 is in fact part of the email system 1110). In other cases, the system 1100 may be configured so that the email system 1110 (and/or a component thereof) sends copies of particular messages (e.g., messages meeting certain criteria that might identify those messages as "bounce" messages) to the monitoring appliance 1105.

Figure 2:
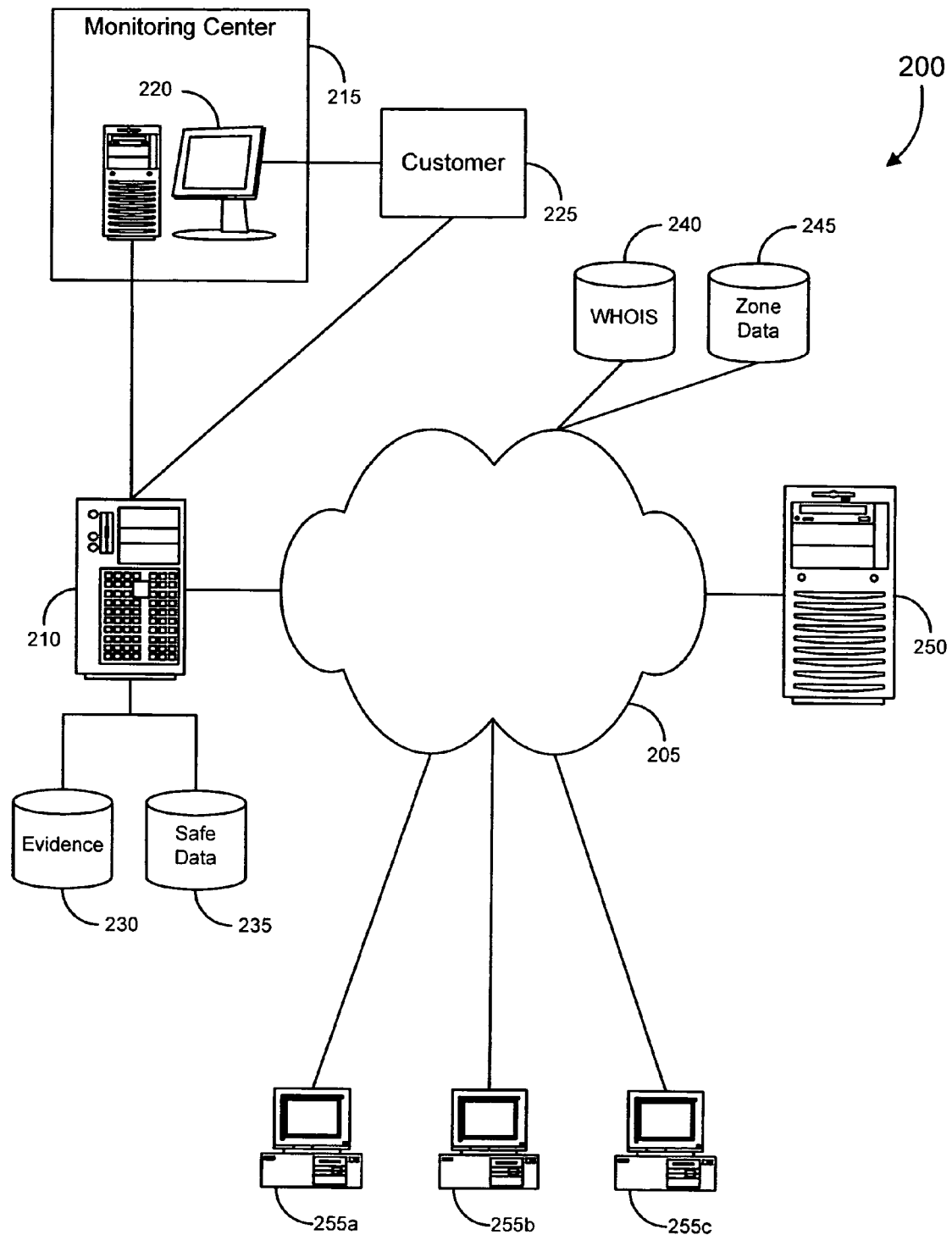
FIG. 2 is a schematic diagram illustrating a system for combating online fraud, in accordance with various embodiments of the invention.

The monitoring appliance 1105 may be in further communication with (and/or incorporate) a fraud prevention and/or detection system configured to analyze received email messages, including for example, a master computer 210, monitoring computer 220, and/or any other system components described with respect to FIG. 2. Hence, the monitoring appliance 1105 may be in direct or indirect communication with a correlation engine (such as, for example, the correlation engine 125 described with respect to FIG. 1A) and/or an event manager (such as the event manager 135 of FIG. 1A), either or both which can be used to analyze email messages, including in particular "bounce" messages, received by the email system 1110, perhaps using methods described in further detail below. The correlation engine, which may be (but need not be) part of a larger fraud detection and/or prevention system, may be situated locally to the customer. In other cases, however, the correlation engine may be located off-site. As such, the correlation engine may be managed by a security provider and/or used to analyze incidents of possible fraud based on data received from a variety of sources, including without limitation, various customers, other data sources (some of which are described herein), etc.

The following example illustrates one mode of operation of the system 1100. In this example, it is assumed that the customer is a bank. A scammer creates an email message that is addressed to a plurality of addresses, some of which the scammer assumes will be customers of the bank. This "original" message appears to be addressed to "a valued customer" and to originate from the bank, and in fact, the return path of the message lists the bank's email system 1110 (or an address associated with the bank's email system) in the "RETURN PATH:" field of the message. The scammer uses a mail server 1115 to send this original message to many (perhaps hundreds or thousands) of addresses culled from a spam list maintained by the scammer (or another). (Those skilled in the art will recognize that a phisher often will use compromised email servers, open relays, etc. to send phish emails, but for purposes of this example, such distinctions are unimportant.) Assuming that one of these addresses is <joe_user@user.com>, the scammer's email server 1115 will transmit the message to a mail server 1130 associated with the <user.com> domain, for receipt by a user "joe_user." If "joe_user" is not known to the <user.com> mail server 1130, that mail server 1130 will attempt to send a return, "bounce" message to the sender of the original message, as discussed above. Because the "RETURN PATH:" field points to the bank's email system 1110, however, the <user.com> mail server 1130 will send the "bounce" message to the bank's system 1110, instead of to the actual sender (the scammer's email server 1115).

When the bank's email system 1110 receives this message, it can identify it as a "bounce" message and forward it to the monitoring appliance 1105. (Alternatively, the monitoring appliance 1105 could intercept all such messages before reception by the email system 1110, if, for instance, the monitoring appliance is integrated with—and/or serve as—a mail gateway and/or an MTA. In yet other embodiments, the monitoring appliance 1105 may access the mail system 1110 to retrieve bounce messages.) The monitoring appliance 1105 optionally may include a storage medium 1125 (which could comprise RAM, hard disk, one or more databases, etc.), for storing such messages (and/or specified portions of such messages, information about such messages, etc.), for example, to store messages until several have been received, so that messages may be consolidated, summarized, etc. before transmission and/or can be transmitted in batch format. Merely by way of example, if a plurality of bounce messages are received, and all relate to a common mass mailing, it may be more efficient to provide one copy of the original message, along with a summary of information (e.g., intended recipient of each message, summary of differences between messages, etc.) about the collection of bounce messages. The monitoring appliance 1105 may then send the "bounce" messages (and/or summary information) to a phish detection/monitoring system (such as the system 100 depicted in FIG. 1A), which may be embodied by the system 200 of FIG. 2 and/or components thereof, including without limitation a correlation engine, event manager, etc. The messages may be sent individually, in batch format, as one or more consolidated messages, etc.

In accordance with some embodiments, the monitoring appliance 1105 may be configured to parse received messages for certain items, including without limitation uniform resource locators ("URL") contained in the messages, and may transmit only those parsed items to phish detection/monitoring system, instead of the entire message. In yet further embodiments, some aspects of a correlation engine may be incorporated within the monitoring appliance 1105, such that some (or all) of the analysis of the message occurs at the monitoring appliance 1105.

In particular embodiments, the email system 1110 (and/or the monitoring appliance 1105 and/or fraud detection/prevention system) may maintain a log 1120 of mail system errors, including without limitation a record of "bounce" messages and/or information about the bounce messages (e.g., extracted portions of messages, addressee of original message, etc.). This log 1120 can be searched to determine the errors resulting from "undeliverable" addresses. This information can be used in many ways. Merely by way of example, a feedback loop may be utilized, such that "undeliverable" addresses can be used as bait email addresses for other anti-fraud operations. For instance, if the "bounce" messages (obtained from one or more customers) indicate that a particular addresses and/or domain is used often by scammers, it might be desirable to attempt to register that address and/or domain, thereby ensuring direct receipt of mail addressed to that address. Such addresses can also be used to plant traceable information for "marked money" operations, as described in further detail above.

Figure 11B:
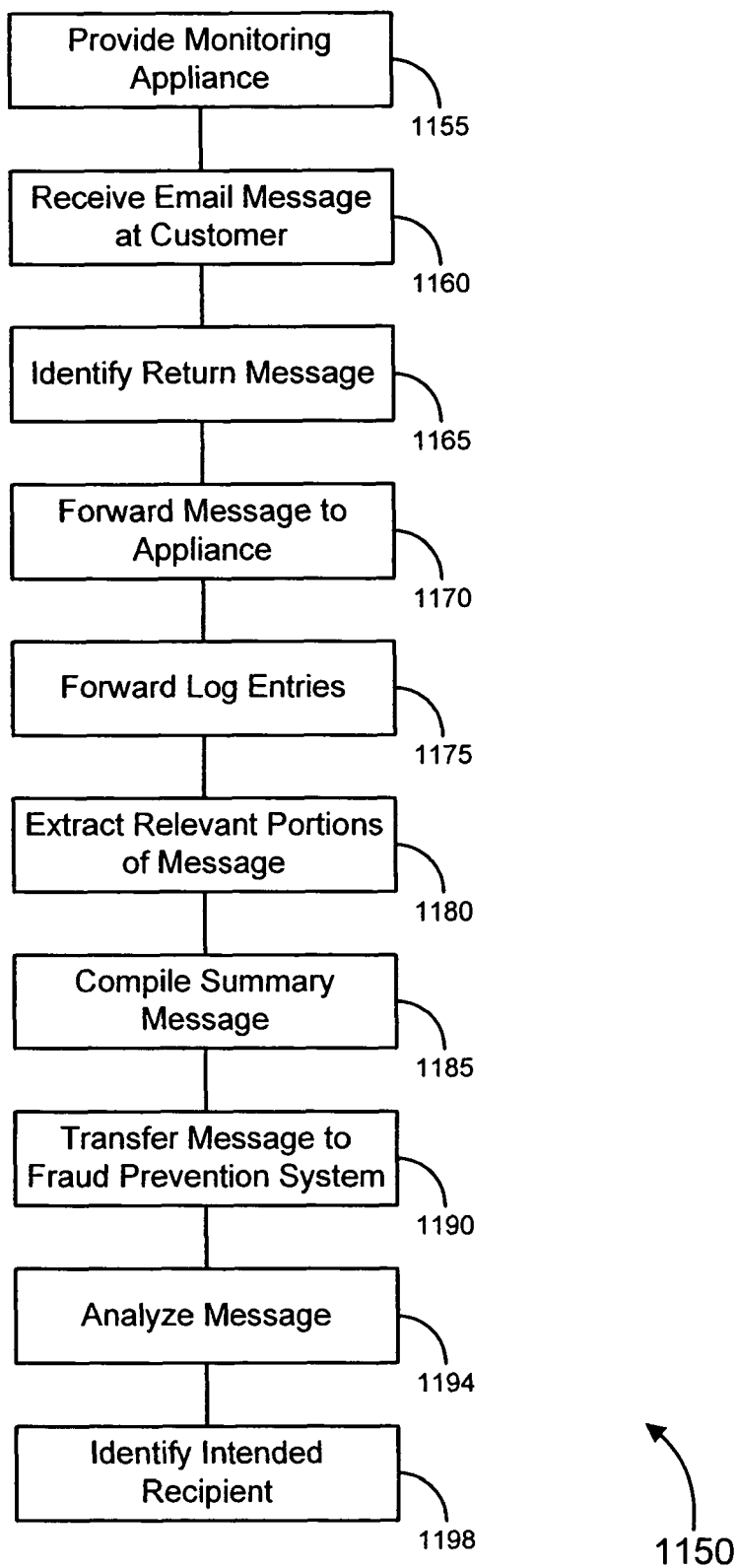
FIG. 11B is a process flow diagram illustrating a method of identifying an improper use of a customer's online identity, in accordance with various embodiments of the invention.

FIG. 11B illustrates a method 1150 of identifying an illegitimate use of a customer's online identity (such as for example, in a phishing scam based on email messages appearing to be sent from the customer). The method 1150 may be implemented on a system such as the system 1100 of FIG. 11A, although it should be appreciated that the method 1150, like other methods described herein, may be implemented in any suitable fashion and is not limited to a particular structure. The method 1150 can include providing a monitoring appliance (block 1155), such as the monitoring appliances described above. Providing the monitoring appliance can include, in some embodiments, situating the monitoring appliance at a customer location and/or, in other embodiments, providing a correlation engine (described above) or similar functionality in the monitoring appliance. (In other embodiments, as noted above, the monitoring appliance may be situated elsewhere, and in fact may be incorporated within a fraud prevention system, as described above, or components of such a system, such as a correlation engine.) Providing the monitoring appliance may also include providing communication between the monitoring appliance and the customer's email system.

At block 1160, the customer's email system receives an email message, in the customary fashion. In accordance with some embodiments, the customer's email system may identify the message as a return message (such as a "bounce" message, as described above) (block 1165). At block 1170, the message may be forwarded to the monitoring appliance (and/or the message may be otherwise accessed by the monitoring appliance). As described above, in some cases, only messages identified as bounce messages are forwarded to the monitoring appliance. In other cases, the customer's email system may be configured to forward all messages (or a subset of messages, such as all messages from unknown senders, etc.). In yet other embodiments, the monitoring appliance may be configured to access the customer's email system directly (by accessing a mail store, a particular email account, an email system log, etc.), such that it may not be necessary for the email system to forward messages to the monitoring appliance. Similarly, the email system may be configured to forward relevant entries from a log (such as a firewall log, an email system log, etc.) to the monitoring appliance (block 1175), or, alternatively, to forward all log entries (in which case, the monitoring appliance may be configured to parse the log entries for relevant entries). Relevant entries may include any entries that relate to bounce messages, etc. In other embodiments, as noted above, the monitoring appliance may be configured to access such logs directly, such that forwarding log entries may be unnecessary.

In some cases, it may be more efficient to extract relevant portions of messages (and, in particular, bounce messages) (block 1180), for instance in the manner described above. Relevant portions can include (without limitation) any portions of a message that can be used to identify the original message (to which the bounce message is a response) as a phish message, any portions of a message that can be used to identify the original sender of the message, and/or any portions of a message that can be used to identify the intended recipient of the message (who may in fact be the target of a phishing scam). Merely by way of example, the headers of the message, any URLs contained in the message and/or any relevant text from the body of the message (including, in particular, any relevant portion of the original message reproduced in the body of the bounce message).

Likewise, in some cases, it may be desirable to compile a summary message for analysis (block 1185). A summary message can comprise any consolidated message that includes the information necessary to analyze a group of messages. The use of a summary message (as opposed to the messages and/or message portions themselves) can, in some case, provide efficiencies in bandwidth used for transmitting messages for analysis, processing cycles and/or time used in analyzing messages, etc. The use of summary messages can be particularly advantageous, for example in cases in which the email system receives a plurality of bounce messages related to a single mass-mailing (which could be indicated by the fact that each of the plurality of bounce messages each indicates that the respective original message has a similar "RETURN PATH:" or "FROM:" header, and/or the fact that the respective body portion of each of the plurality of bounce messages reproduces a similar portion of an original message. Various methods for comparing such a plurality of messages, such as checksumming, hashing, etc. all and/or part of messages and comparing the checksums, hashes, etc. may be used. Other techniques for comparing messages may be used as well.

In accordance with some embodiments, one or more email messages, portions of messages and/or summary messages (as appropriate) may be transferred to a fraud detection and/or prevention system for analysis (block 1190). Similarly, log entries (or summaries of such entries) may be transferred. The transfer can be performed by any suitable method, such as FTP, NFS mount, database transaction (e.g., SQL statement), etc. In some cases, messages, logs and/or log entries (and/or portions or summaries thereof) may be stored local to the monitoring appliance before transfer (in order to, for example, allow for batch transfers on a particular schedule and/or upon receipt of a certain number of messages, etc.). In particular embodiments, storing the messages may comprise storing the messages in a database (perhaps with fields corresponding to various header fields and/or body text, etc.), such that transferring the messages can comprise a database synchronization. Alternatively, the messages may be stored as text files, etc. and/or the transfer to the fraud prevention system for analysis can comprise importing such files into an appropriate import transaction (or series of transactions) for a database at the fraud prevention system. As another example, the fraud prevention system may be configured to perform the methods described above, and/or transferring the messages (or portions, summaries, etc.) can comprise transferring the messages in (and/or converting the messages into) a format suitable for analysis using such methods, as discussed above. For instance, the messages may be transferred to a honey pot, and processing of the messages might therefore proceed as described above.

Hence, the method 1150 can further comprise analyzing the message(s), log(s) and/or log entries (block 1194). As noted, the analysis of the messages may comprise analysis using methods described above. (Similarly, if analysis of the messages, logs or log entries indicates a likely online fraud, the response strategies and/or methods described above may also be implemented.) Analysis may be performed by the fraud prevention system (if, for example, the messages were transferred to the fraud prevention system) and/or a component thereof, such as a correlation engine.

As noted, however, in accordance with other embodiments, the monitoring appliance might comprise a correlation engine, and/or analysis of the messages, etc. (using similar methods) could be performed at the monitoring appliance. In such cases, the results of the analysis could be forwarded to an event manager and/or a dilution engine (or similar component), which might be incorporated within a fraud prevention system and/or might be incorporated within the monitoring appliance, for further action, as appropriate.

In particular embodiments, the analysis of the messages, etc. can include identifying the intended recipient of the messages (block 1198). This information could be used, for example, to generate new bait email addresses corresponding to the intended recipient. (Additionally, the new bait email address could be planted in various locations, as described above, if desired.) Of course, based on this disclosure, one skilled in the art will appreciate that it might be necessary to obtain a domain name associated with the address and/or to create an account with the provider responsible for that domain name, such that the security provider would receive all mail addressed to that address. This could be beneficial because, by virtue of that address' status as an intended recipient of the phish message, it is apparent that the address already is target for at least one scammer. Presumably, obtaining this recipient email address would not create a conflict with an actual user, because the fact that the phish message was undeliverable indicates that the address is not currently a valid address.

in the foregoing description, for the purposes of illustration, various methods were described in a particular order. It should be appreciated that in alternate embodiments, the methods may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices. Alternatively, the methods may be performed by a combination of hardware and software.

In conclusion, the present invention provides novel solutions for dealing with online fraud. While detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. A method of inciting unsolicited email messages, the method comprising:
    planting a bait email address at a location on a computer network, the location being a likely target for a third party attempting to harvest email addresses, wherein the bait email address is a first bait email address;
    receiving an email message addressed to the bait email address;
    tracking the bait email address, along with the location at which the bait email address was planted;
    correlating the received email message with the tracked bait email address and location;
    analyzing with a computer system the received email message to determine whether the received email message is an unsolicited email message; and
    in response to determining the received email message is an unsolicited message, indicating with the computer system that the location is a likely source for unsolicited email messages, prioritizing the location for additional planting operations, and planting at least one additional bait email address at the location on the Internet at which the first bait email address was planted.

2. A method of inciting unsolicited email messages as recited in claim 1, the method further comprising:
    searching a listing of domain registration records for a domain registration record associated with a candidate domain that would be suitable for attracting unsolicited email messages;
    monitoring the listing of domain registration records for an expiration of the domain registration record; and
    registering the candidate domain.

3. A method of inciting unsolicited email messages as recited in claim 1, further comprising:
    generating with the computer system a userid component; and
    combining the userid component with a domain name associated with the registered candidate domain to generate the bait email address for planting.

4. A method of inciting unsolicited email messages as recited in claim 1, the method further comprising:
    generating the bait email address for planting.

5. A method of inciting unsolicited email messages as recited in claim 4, wherein generating the bait email address for planting comprises:
    generating with the computer system a userid component;
    selecting with the computer system a domain component; and
    combining the userid component and the domain component to generate the bait email address.

6. A method of inciting unsolicited email messages as recited in claim 5, wherein generating a userid component comprises:
    selecting a first userid element from a first list;
    selecting a second userid element from a second list; and
    wherein the userid component comprises the first userid element and the second userid element.

7. A method of inciting unsolicited email messages as recited in claim 1, the method further comprising:
    forwarding the received email message to a correlation engine for analysis.

8. A method of inciting unsolicited email messages as recited in claim 1, wherein the received email message includes a uniform resource locator ("URL") configured to direct a recipient of the received email message to a web site referenced by the URL, wherein determining that the received email message is a fraudulent email message comprises:
   analyzing the received email message;
   based on an analysis of the received email message, categorizing the received email message as a possibly fraudulent email message; and
   investigating the URL included with the received email message to determine information about a server hosting the web site referenced by the URL.

9. A method of inciting unsolicited email messages as recited in claim 8, the method further comprising:
   preparing a report comprising at least some of the information about the server hosting the web site referenced by the uniform resource locator.

10. A method of inciting unsolicited email messages as recited in claim 9, the method further comprising:
   analyzing the report to determine whether the server is likely engaged in a fraudulent activity.

11. A method of inciting unsolicited email messages as recited in claim 10, the method further comprising:
   allowing a technician to initiate an action in response to the fraudulent activity.

12. A method of inciting unsolicited email messages as recited in claim 10, the method further comprising:
   pursuing an action in response to the fraudulent activity 13. A method of inciting unsolicited email messages as recited in claim 8, wherein analyzing the received email message comprises:
   parsing the received email message to identify a header portion of the received email message, a body portion of the received email message, and a uniform resource locator portion of the received email message;
   analyzing the header portion of the received email message;
   analyzing the body portion of the received email message; and
   analyzing the uniform resource locator portion of the received email message.

14. A computer system for inciting unsolicited email messages, the computer system comprising a processor and a computer readable medium having instructions executable by the processor to:
   plant at least one bait email address at a location on a computer network, the location being a likely target for a third party attempting to harvest email addresses, wherein the bait email address is a first bait email address;
   receive an email message addressed to the bait email address;
   track the bait email address, along with the location at which the bait email address was planted;
   correlate the received email message with the tracked bait email address and location;
   analyze the received email message to determine whether the received email message is an unsolicited email message; and
   in response to determining the received email message is an unsolicited message, indicating with the computer system that the planting location is a likely source for unsolicited email messages, prioritizing the planting location for additional planting operations, and planting at least one additional bait email address at the location on the Internet at which the first bait email address was planted.

15. A computer system for inciting unsolicited email messages, as recited in claim 14, the computer readable medium having further instructions executable by the processor to:
   search a listing of domain registration records for a domain registration record associated with a candidate domain that would be suitable for attracting unsolicited email messages;
   monitor the listing of domain registration records for an expiration of the domain registration record; and
   register the candidate domain;
   wherein the bait email address comprises a userid component and a domain component, and wherein the domain component is associated with a domain name of the candidate domain.

16. A computer program embodied on a computer readable storage medium, the computer program comprising instructions executable by one or more computers to:
   plant at least one bait email address at a location on a computer network, the location being a likely target for a third party attempting to harvest email addresses, wherein the bait email address is a first bait email address;
   receive an email message addressed to the bait email address;
   track the bait email address, along with the location at which the bait email address was planted;
   correlate the received email message with the tracked bait email address and location;
   analyze the received email message to determine whether the received email message is an unsolicited email message; and
   in response to determining the received email message is an unsolicited message, indicating with the computer system that the planting location is a likely source for unsolicited email messages, prioritizing the planting location for additional planting operations, and planting at least one additional bait email address at the location on the Internet at which the first bait email address was planted.

17. A computer program embodied on a computer readable storage medium, as recited in claim 16, the computer program comprising further instructions executable by one or more computers to:
   search a listing of domain registration records for a domain registration record associated with a candidate domain that would be suitable for attracting unsolicited email messages;
   monitor the listing of domain registration records for an expiration of the domain registration record; and
   register the candidate domain;
   wherein the bait email address comprises a userid component and a domain component, and wherein the domain component is associated with a domain name of the candidate domain.

18. A computer-implemented method of inciting unsolicited email messages, the method comprising:
   planting a bait email address at a location on the Internet;
   correlating the bait email address with the location at which it was planted;
   receiving an email message addressed to the bait email address;
   tracking the bait email address, along with the location at which the bait email address was planted;
   correlating the received email message with the tracked bait email address and location; and determining, based on the received email message, that the location is likely to generate additional unsolicited email messages;

prioritizing the location for additional planting operations; and planting at least one additional bail email address at the location based on said prioritizing.

19. A computer-implemented method of inciting unsolicited email messages as recited in claim 18, the method further comprising:

searching a listing of domain registration records for a domain registration record associated with a candidate domain that would be suitable for attracting unsolicited email messages;

monitoring the listing of domain registration records for an expiration of the domain registration record; and registering the candidate domain;

wherein the bait email address comprises a userid component and a domain component, and wherein the domain component is associated with a domain name of the candidate domain.

20. A computer system for inciting unsolicited email messages, the computer system comprising a processor and a computer readable medium having instructions executable by the processor to:

plant a bait email address at a location on the Internet;

correlate the bait email address with the location at which it was planted;

receive an email message addressed to the bait email address;

track the bait email address, along with the location at which the bait email address was planted;

correlate the received email message with the tracked bait email address and location;

determine, based on the received email message, that the location is likely to generate additional unsolicited email messages;

prioritizing the location for additional planting operations; and planting at least one additional bait email address at the location based on said prioritizing.

21. A computer program embodied on a computer readable storage medium, the computer program comprising instructions executable by one or more computers to:

plant a bait email address at a location on the Internet;

correlate the bait email address with the location at which it was planted;

receive an email message addressed to the bait email address;

track the bait email address, along with the location at which the bait email address was planted;

correlate the received email message with the tracked bait email address and location;

determine, based on the received email message, that the location is likely to generate additional unsolicited email messages;

prioritizing the location for additional planting operations; and planting at least one additional bait email address at the location based on said prioritizing.

* * * * *